(12) United States Patent
Debray et al.

(10) Patent No.: US 9,607,017 B2
(45) Date of Patent: Mar. 28, 2017

(54) METHODS OF MICRO-SPECIALIZATION IN DATABASE MANAGEMENT SYSTEMS

(71) Applicant: The Arizona Board of Regents on Behalf of the University of Arizona, Tucson, AZ (US)

(72) Inventors: Saumya K. Debray, Tucson, AZ (US); Richard T. Snodgrass, Tucson, AZ (US); Rui Zhang, Torrance, CA (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 190 days.

(21) Appl. No.: 14/368,265

(22) PCT Filed: Dec. 21, 2012

(86) PCT No.: PCT/US2012/071468
§ 371 (c)(1),
(2) Date: Jun. 23, 2014

(87) PCT Pub. No.: WO2013/096894
PCT Pub. Date: Jun. 27, 2013

(65) Prior Publication Data
US 2014/0365533 A1 Dec. 11, 2014

Related U.S. Application Data

(60) Provisional application No. 61/630,993, filed on Dec. 23, 2011.

(51) Int. Cl.
*G06F 7/00* (2006.01)
*G06F 17/30* (2006.01)

(52) U.S. Cl.
CPC .. *G06F 17/30289* (2013.01); *G06F 17/30321* (2013.01); *G06F 17/30383* (2013.01); *G06F 17/30474* (2013.01)

(58) Field of Classification Search
CPC ......... G06F 17/30321; G06F 17/30474; G06F 17/30383; G06F 17/30289
See application file for complete search history.

(56) References Cited

U.S. PATENT DOCUMENTS 5,493,675 A * 2/1996 Faiman, Jr. ............. G06F 8/433
717/144
5,787,418 A * 7/1998 Hibbetts ........... G06F 17/30392
(Continued)

FOREIGN PATENT DOCUMENTS

| JP | 9-91148 | 4/1997 | ............... G06F 9/45 |
| JP | 2000-315160 | 11/2000 | ............... G06F 9/45 |

OTHER PUBLICATIONS

International Search Report issued in corresponding application No. PCT/US2012/071468, dated Apr. 19, 2013 (3 pgs).
(Continued)

*Primary Examiner* — Daniel Kuddus
(74) *Attorney, Agent, or Firm* — Hayes Soloway P.C.

(57) ABSTRACT

Systems and methods for utilizing relation- and query-specific information to specialize DBMS code at runtime based on identifying runtime locally invariant variables. Runtime invariant is often of the form of variables in code that hold values that are constant during a portion of code execution. Micro-specialization is applied to eliminate from the original program unnecessary code such as branching statements that reference local invariant(s) in branch-condition evaluation. The resulting specialized code reduces the code complexity as well as significantly improves the runtime efficiency during code execution.

47 Claims, 22 Drawing Sheets

(56) References Cited

U.S. PATENT DOCUMENTS

| | | | |
|---|---|---|---|
| 5,842,022 A | 11/1998 | Nakahira et al. ............ 395/709 | |
| 5,842,209 A * | 11/1998 | Mocek .............. G06F 17/30392 | |
| 6,622,300 B1 | 9/2003 | Krishnaswamy et al. .... 717/130 | |
| 7,131,119 B2 * | 10/2006 | Kumar .................. G06F 8/4441 | |
| | | | 717/150 |
| 7,254,810 B2 | 8/2007 | Barsness et al. ............. 717/160 | |
| 8,032,509 B2 * | 10/2011 | Piedmonte ........ G06F 17/30404 | |
| | | | 707/708 |
| 8,640,107 B2 * | 1/2014 | Jaeger ........................ G06F 8/51 | |
| | | | 717/126 |
| 9,122,523 B2 * | 9/2015 | Pienaar ................. G06F 9/4887 | |
| 2003/0126151 A1 * | 7/2003 | Jung ................. G06F 17/30917 | |
| 2003/0200537 A1 * | 10/2003 | Barsness ................ G06F 8/443 | |
| | | | 717/151 |
| 2005/0192951 A1 * | 9/2005 | Day .................. G06F 17/30442 | |
| 2006/0026116 A1 * | 2/2006 | Day .................. G06F 17/30471 | |
| 2007/0239656 A1 * | 10/2007 | Santosuosso ..... G06F 17/30587 | |
| 2008/0189277 A1 * | 8/2008 | Meijer ................ G06F 17/3041 | |
| 2010/0231224 A1 * | 9/2010 | Lindqvist ............... G01V 3/083 | |
| | | | 324/365 |
| 2012/0317647 A1 | 12/2012 | Brumley et al. | |
| 2013/0054649 A1 * | 2/2013 | Potapov ............ G06F 17/30436 | |
| | | | 707/792 |
| 2013/0298130 A1 * | 11/2013 | Pienaar ................. G06F 9/4887 | |
| | | | 718/102 |
| 2014/0115001 A1 * | 4/2014 | Arroyo ............. G06F 17/30967 | |
| | | | 707/772 |
| 2014/0365533 A1 | 12/2014 | Debray et al. ................ 707/803 | |
| 2015/0134637 A1 * | 5/2015 | Pall ................... G06F 17/30958 | |
| | | | 707/718 |

OTHER PUBLICATIONS

International Preliminary Report on Patentability issued in corresponding application No. PCT/US2012/071468, dated Jun. 24, 2014 (6 pgs).
Bonwick et al., "The Slab Allocator: An Object-Caching Kernel Memory Allocator," Proceedings Usenix Technical Conference, pp. 87-98, Jun. 1994 (18 pgs).
Calder et al., "Value Profiling and Optimization," Journal of Instruction-Level Parallelism, vol. 1, Mar. 1999 (37 pgs).
Valgrind Developers, "Callgrind: a call-graph generating cache and branch prediction profiler," Valgrind User Manual, Release 3.10.0, Sep. 10, 2014 (19 pgs).
Eckstein, R., "Java SE Application Design With MVC," Oracle Technology Network, Mar. 2007 (8 pgs).
Elmasri et al., "Fundamentals of Database Systems," Addison Wesley Publishing Company, 6$^{th}$ Edition, Apr. 2010, book summary only (2 pgs).
Linux Foundation, "Executable and Linking Format (ELF) Specification," TIS Committee, May 1995 (106 pgs).
Linux Foundation, "System V Application Binary Interface," Edition 4.1, Mar. 1997 (271 pgs).
Free Software Foundation, Inc., "Optimize Options—Using the GNU Compiler Collection (GCC), Options That Control Optimization," downloaded from https://gcc.gnu.org/onlinedocs/gcc/Optimize-Options.html on Feb. 11, 2015 (52 pgs).
Krikellas et al., "Generating code for holistic query evaluation," Proceedings of the IEEE International Conference on Data Engineering (ICDE), 2010, pp. 613-614 (13 pgs).
Lussier, D., BenchmarkSQL project description and information, downloaded from http://pgfoundry.org/projects/benchmarksql/ on Feb. 11, 2015 (2 pgs).
Muth et al., "Code Specialization based on Value Profiles," Proceedings International Static Analysis Symposium (SAS), Jun. 2000 pp. 340-350 (20 pgs).
PostgreSQL Global Development Group, "18.4 Resource Consumption," PostgreSQL 8.4.22 Documentation, downloaded from http://www.postgresql.org/docs/8.4/static/index.html on Feb. 11, 2015 (9 pgs).
Transaction Processing Performance Council, "TPC Benchmark™-C," Revision 5.11, Feb. 2010 (132 pgs).
Transaction Processing Performance Council, "TPC Benchmark™-H," Revision 2.1.0 (150 pgs).
Supplemental European Search Report issued in application No. 12858918.1, dated Oct. 27, 2015 (9 pgs).
Consel et al., "A General Approach for Run-Time Specialization and its Application to C," Institut de Recherche en Informatique et Systémes Aléatoires, Jul. 1995 (24 pgs).
Consel et al., "A tour of Tempo: a program specializer for the C language," Science of Computer Programming, vol. 52, No. 1-3, Aug. 2004 (30 pgs).
Notification for Reasons for Refusal issued in corresponding Japanese Appln. Serial No. 2014-548980, dated Sep. 30, 2016, with English translation (26 pgs).
International Search Report and Written Opinion issued in application No. PCT/UCS2016/025295, dated Jul. 29, 2016 (11 pgs).
PCT Notice, Invitation to Pay additional Fees issued in related Application Serial No. PCT/US2016/066665, dated Jan. 30, 2017, 2 pages.

* cited by examiner

METHODS OF MICRO-SPECIALIZATION IN DATABASE MANAGEMENT SYSTEMS

CROSS REFERENCE TO RELATED APPLICATION(S)

This patent application is the United States national phase, under 35 U.S.C §371, of International Patent Application No. PCT/US2012/071468, filed 21 Dec. 2012 and entitled "METHODS OF MICRO-SPECIALIZATION IN DATABASE MANAGEMENT SYSTEMS," which claims the benefit of U.S. Provisional Application Serial No. 61/630,993, filed Dec. 23, 2011and entitled "MICRO-SPECIALIZATION OF INTERNAL DATA STRUCTURES," all of which are hereby incorporated by reference in their entirety.

STATEMENT REGARDING FEDERALLY SPONSORED RESEARCH

This invention was made with government support under Grant Nos. IIS0803229 CNS0938948 awarded by the National Science Foundation (NSF). The government has certain rights in the invention.

BACKGROUND OF THE INVENTION

Field of the Invention

The present invention is directed generally to systems and methods for database management, and more particularly, to systems and methods to improve the performance of database management systems (DBMSes).

Description of the Related Art

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

A database management system (DBMS) is a collection of software programs that manage the storage and access of data. As larger volumes of data are being generated nowadays and thus must be stored and efficiently accessed, DBMSes have been adopted across a wide range of application domains. Driven by such ubiquitous deployments over the last four decades, DBMSes have been designed and engineered based on a few data models that are generally applicable to those domains. The relational data model is the one most prevalently adopted by commercial and open-source DBMSes. A significant amount of effort has been devoted to efficiently support this data model.

Due to the generality of the relational data model, relational database management systems are themselves general, in that they can handle whatever schema the user specifies and whatever query or modification is presented to them. Relational operators work on essentially any relation and must contend with predicates specified on any attribute of the underlying relations. Through such innovations as effective indexing structures, innovative concurrency control mechanisms, and sophisticated query optimization strategies, the relational DBMSes available today are very efficient. Such generality and efficiency has enabled their proliferation and use in many domains.

DETAILED DESCRIPTION OF THE INVENTION

Figure 1:
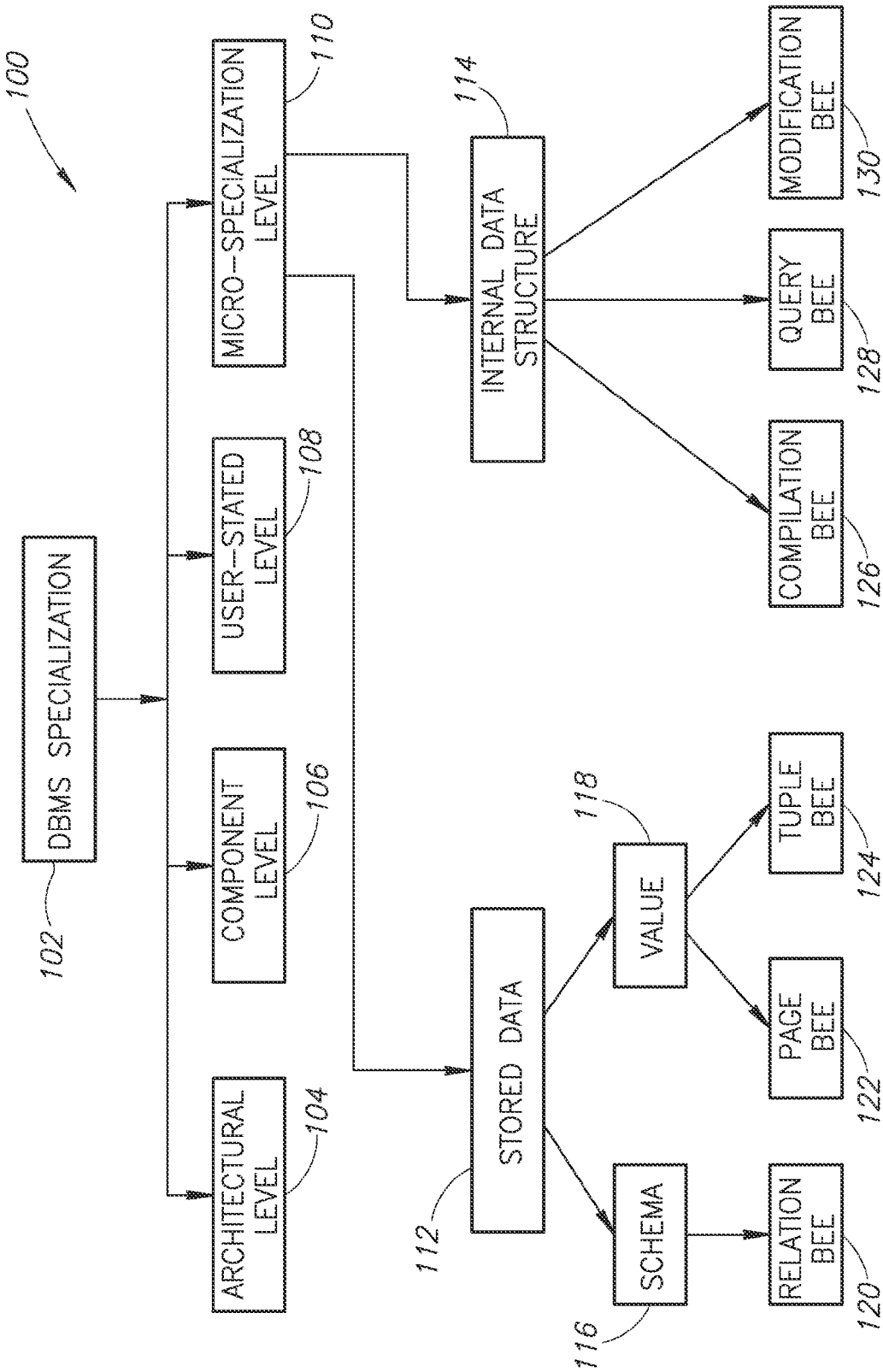
FIG. 1 is a taxonomy of where to apply micro-specialization in DBMSes.

Database management systems (DBMSes) form a cornerstone of modern IT infrastructure, and it is essential that they have excellent performance. In this disclosure, opportunities of applying dynamic code specialization to DBMSes is provided, in particular by focusing on runtime invariant present in DBMSes during query evaluation. Query evaluation involves extensive references to the relational schema, predicate values, and join types, which are all invariant during query evaluation, and thus are subject to dynamic value-based code specialization.

It is noted that DBMSes are general in the sense that they must contend with arbitrary schemas, queries, and modifications; this generality is implemented using runtime meta-data lookups and tests that ensure that control is channeled to the appropriate code in all cases. Unfortunately, these lookups and tests are carried out even when information is available that renders some of these operations superfluous, leading to unnecessary runtime overheads.

The present disclosure introduces "micro-specialization," an approach that uses relation- and query-specific information to specialize the DBMS code at runtime and thereby eliminate some of these overheads. A taxonomy of approaches and specialization times are provided, as well as a general architecture that isolates most of the creation and execution of the specialized code sequences in a separate DBMS-independent module. It is shown that this approach requires minimal changes to a DBMS and can improve the performance simultaneously across a wide range of queries, modifications, and bulk-loading, in terms of storage, CPU usage, and I/O time of the TPC-H and TPC-C bench-marks. An integrated development environment that helps DBMS developers apply micro-specializations to identified target code sequences is also provided.

Section 1: Introduction
1.1 The Problem

The following code snippet illustrates the structure of a typical DBMS query-evaluation algorithm:

```
/* construct database */
schemas := DefineRelationSchemas( );
rels := PopulateRelations(schemas);
/* iterate over queries */
loop {
    query := ReadQuery( );
    query plan := OptimizeQuery(query, schemas);
    /* process query: iterate over tuples */
    ans := Exec(query plan, rels, schemas);
    Output(ans);
}
```

A database is first constructed by defining a set of relation schemas and then populating the relations specified by these schemas. The schemas specify meta-data about each relation, such as the name of the relation, the number of attributes, their names, and types. This is followed by query evaluation: a query is read in, a query plan is generated by the query optimizer, this plan is executed by the SQL engine, and the answers so obtained are output. This process is repeated. The query optimizer uses meta-data about the relations in the database to make implementation-level decisions (e.g., a join operation in the query may be mapped to an implementation-level operations of hash-join or sort-merge join) and to determine an efficient execution plan for the query operations. The query plan produced by the optimizer is essentially a tree representation of the query where leaf nodes are database relations and internal nodes are operations. The query evaluation engine applies the operations specified in the query plan to the relations in the database, iterating over the tuples in the relations and using schema meta-data to parse the tuples to extract and process the attributes.

Nonetheless, the generality introduced by the data model presents challenges to further increases in performance. Consider accessing attributes of a tuple. Such access requires consulting metadata. The catalog, which contains the schema, must be accessed for each attribute value of the tuple in this relation extracted. Although this catalog lookup has been optimized, its overhead will still accumulate over large relations, representing significant overhead.

Careful examination of the runtime behavior of DBMSes reveals that the query-evaluation process described above involves repeated interpretation of a number of data structures that are locally invariant through the evaluation of each query. For example, the set of relations that have to be accessed is fixed for each query, which means that the information about attribute types and offsets for each such relation, obtained from its schema and used to parse its tuples, is invariant through the execution of the query. However, because relation schema information is not known when the DBMS code is compiled, this information cannot be propagated into the query evaluation code, but must be obtained by interpreting the schema data—an action that is repeated for each tuple that is processed. As another example, an expression for a select or join operation in a query is represented as a syntax tree, which has to be evaluated for each tuple. This syntax tree—which is fixed for a given query—cannot be compiled into code when the DBMS is compiled because it becomes known only once a query is presented to the DBMS. Since processing a query in a database of reasonable size may involve looking at many millions of tuples, these interpretation overheads can accumulate into substantial overheads, in terms of both instruction counts and instruction-cache and data-cache misses.

The functionality of dynamic specialization of DBMS code is aimed at reducing unnecessary runtime overhead as much as possible. This is done by identifying those portions of the DBMS's query evaluation loop that have a high number of references to runtime-invariant values such as those described above, dynamically generating code that has been specialized to the actual runtime-invariant values, and splicing in (a pointer to) this dynamically generated code into the DBMS's query evaluation loop. Given the fine granularity at which the specialization approach is applied, the approach is coined "micro-specialization."

1.2 DBMS Specialization Approaches

The database research community has investigated DBMS specialization approaches to improving the efficiency of DBMSes by providing a version customized in a way that avoids the inefficiencies resulting from the generality. Much of the existing work on improving DBMS performance can be characterized as specialization with various levels of granularity. At the architectural level, the overall architecture of the DBMS is adapted to better support a class of applications. Examples include column-oriented stores for online analytical processing (OLAP), H-store for online transaction processing (OLTP), and stream processing DBMSes. At the component level, a component oriented to a particular kind of data is added to the DBMS. Examples include new types of operators, indexes, and locking modes. At the user-stated level, users write triggers and user-defined functions to achieve specialization of functionalities and better performance. The drawbacks of these three levels of specialization are lack of general applicability for architectural specialization, greater complexity in query optimization, DBMS development, testing, and maintenance for component specialization, and the need for complex user involvement for user-stated specialization.

1.3 Query Compilation-Based Approaches

Another stream of research efforts focuses on compiling queries directly into executable code rather than evaluating queries in an interpretive manner. This type of approach enables many code optimization techniques to be employed by the query-compilation engine and applied at query compilation time. Query compilation can be considered as a form of JIT compilation technique which effects the specialization of the generated executable code by exploiting runtime characteristics of the queries, hence allowing code optimizations techniques to be aggressively utilized.

This query compilation-based approach can significantly benefit query performance especially given that nowadays, servers running DBMSes are often configured with memory large enough to retain very large tables. Thereafter, query evaluation can often be a CPU-bound task, instead of I/O-oriented as conventionally considered. In addition to the fact that the generated code is tailored to individual queries, resulting in much tighter code (with significantly smaller footprint) than the interpretive query-evaluation approach, another major advantage is that the generated code can be optimized to be tightly coupled with the architecture of a certain CPU by the compiler, significantly reducing instruction-cache misses.

Nonetheless, the query-compilation approach presents a challenge to the engineering of the query compiler. In particular, as more data types and operators are introduced, corresponding components need to be added into the compiler, resulting in increases in the complexity of the compiler. More importantly, JIT compilation restricts code specializations to be applied only at runtime by observing runtime characteristics of programs. In other words, compilation overhead is introduced at runtime, even though many runtime characteristics of particular DBMSes can be identified at compile time. For instance, once a relation schema is defined, the code in the DBMS which accesses this relation, can be specialized as early as schema-definition time, instead of postponing such specializations to query-evaluation time.

1.4 Micro-Specialization

The embodiments of the present invention take advantage of information specific to the particular environment of a DBMS by identifying variables whose values—typically, schema metadata or query-specific constants—are locally invariant within the query evaluation loop. Such variables are between statically-determined invariants and variables that change even faster. Rather, there is the notion of this query-evaluation loop, a notion particular to DBMSes, within which runtime invariant(s) reside. This particular characteristic about such invariants is utilized for fine-grained specialization that eliminates unnecessary operations along frequently-taken execution paths, leading to further optimized code that is both smaller and faster. Often this loop is evaluated for every tuple in the underlying relation(s), thereby offering the possibility of significant performance improvements. Since the invariants used for specialization are available only at runtime, such specialization cannot be carried out using static techniques, but has to be deferred to runtime. This implies that the specialization process itself has to be extremely lightweight.

In addition to specialization based on schema metadata and query-specific values, another opportunity has been identified for dynamic specialization: the values in the relations themselves. If such values are relatively few or relatively common, specializing on such values can be very effective. An innovation is to specialize DBMS code based on data associated with an individual relation or even within individual tuples.

Such fine-grained low-level dynamic specialization is referred to as DBMS micro-specialization, to distinguish it from other, higher-level specializations effected in DBMSes, as discussed in the previous section. Micro-specialization takes advantage of information specific to the particular environment of a DBMS by identifying variables within an individual component whose values—typically, schema metadata or query-specific constants—are invariant within the query evaluation loop, as mentioned in Section 1.1. This information is used for fine-grained specialization that eliminates unnecessary code along frequently-taken execution paths, leading to optimized code that is both smaller and more efficient. Often this loop is evaluated for every tuple in the underlying relation(s), thereby offering the possibility of significant performance improvements. However, since the invariants used for specialization are available only at runtime, such specialization cannot be carried out using traditional compiler techniques: micro-specialization applies at DBMS runtime. This implies that the specialization process itself has to be extremely lightweight, which raises a host of nontrivial technical challenges.

Micro-specialization incurs none of these disadvantages of the coarser-grained specializations. Since the DBMS architecture is not changed, it does not constrain the breadth of applications that can be supported. As micro-specialization adds no additional components, it does not increase DBMS complexity. Micro-specialization requires no user involvement. Moreover, micro-specialization has the potential of being applied in concert with the other three forms of specialization. For example, it can be applied directly to column-oriented DBMSes and main-memory-based DBMSes and to new kinds of operators.

1.5 Structure of this Disclosure

In this disclosure, a single micro-specialization case study that improves the performance of even simple queries is discussed in Section 2. In this case study, the specific code changes are examined and the performance improvement is predicted and validated. Sections 3 through 6 examine micro-specialization opportunities broadly with a taxonomy of three general classes of invariant value, which induce three types of micro-specialization. A runtime environment that supports the mechanisms required by micro-specialization is then introduced. The implementation of this runtime environment and its incorporation into PostgreSQL are discussed. It should be appreciated that other types of DBMSes may also be used with the present invention. In Section 8, through a comprehensive set of experiments on the TPC-H and the TPC-C benchmarks, the effectiveness and cost of micro-specialization is discussed. Section 9 provides discussion on the structure of a development environment for introducing micro-specializations into a complex DBMS. How to identify specialization targets, how to decide which specialization approach to apply, and how to insert calls to that API to effect the micro-specialization is discussed. Sections 10 and 11 place micro-specialization in the broader contexts of DBMS and compiler-based specializations.

Section 2: A Case Study

An example is initially provided to show how a micro-specialization opportunity is exploited from within low-level source code of PostgreSQL. A performance-benefit analysis of this particular micro-specialization is also provided.

As mentioned in the previous section, relation-schema catalog-lookup presents significant inefficiency to query evaluation. A single micro-specialization applied to a function containing complex branching statements that reference the schema-specific values is examined. It is shown that this micro-specialization improves the performance of even simple queries. In this case study, the specific code changes are discussed, the performance improvement is predicted, and then the prediction is validated with an experiment.

In a DBMS, there are many variables which can be locally invariant (constant) within the query evaluation loop. For instance, once the schema of a relation is defined, the number of attributes is a constant. Moreover, the type of each attribute, the length of each fixed-length attribute, as well as the offsets of some attributes (those not preceded by a variable-length attribute) are constants for this relation.

Listing 1 excerpts a function, slot_deform_tuple( ), from the source code of PostgreSQL. This function is executed whenever a tuple is fetched; it extracts values from a stored tuple into an array of long integers. The function relies on a loop (starting on line 11) to extract each attribute. For each attribute, a path in the code sequence (from line 12 to line 43) is executed to convert the attribute's value within the stored bytes of the tuple into a long integer (that is, bytes, shorts, and ints are cast to longs and strings are cast to pointers). The catalog information for each attribute is stored in a struct named thisatt. As Listing 1 shows, attribute length (atlen), attribute physical storage alignment (attalign), and attribute offset (attcacheoff) all participate in selecting a particular execution path.

Listing 1 The slot deform tuple( ) Function

```
1 void slot_deform_tuple(TupleTableSlot *slot, int natts) {
2  ...
3  if (attnum == 0) {
4      off = 0;
5      slow = false;
6  } else {
7      off = slot->tts_off;
8      slow = slot->tts_slow;
9  }
10 tp = (char*)tup + tup->t_hoff;
11 for (; attnum < natts; attnum++) {
12     Form_pg_attribute thisatt = att [attnum];
13     if (hasnulls && att_isnull(attnum, bp)) {
14         values[attnum] = (Datum) 0;
15         isnull[attnum] = true;
16         slow = true;
17         continue;
18     }
19     isnull[attnum] = false;
20     if (!slow && thisatt->attcacheoff >= 0) {
21         off = thisatt->attcacheoff;
22     } else if (thisatt->attlen == -1) {
23         if (!slow && off == att_align_nominal(off, thisatt->attalign)) {
24 thisatt->attcacheoff = off;
25     } else {
26         if (!slow && off == att_align_nominal(off, thisatt->attalign)) {
27             thisatt->attcacheoff = off;
28         } else {
29             off = att_align_pointer(off, thisatt->attalign, -1, tp + off);
30             slow = true;
31         }
32     } else {
33 off = att_align_nominal(off, thisatt->attalign);
```

Listing 1 The slot deform tuple( ) Function

```
34 if (!slow)
35     thisatt->attcacheoff = off;
36 }
37 values[attnum] = fetchatt(thisatt, tp + off);
38 off = att_addlength_pointer(off, thisatt->attlen, tp + off);
39 if (thisatt->attlen <= 0)
40     slow = true;
41 }
42 ...
43 }
44 }
```

Within a conventional DBMS implementation, these variables are evaluated in branch-condition checking because the values of these variables depend on the specific relation being queried. Such an implementation, which is necessary for supporting the generality of the DBMS, provides opportunities for performance improvement. Micro-specialization focuses on such variables; when they are constant within the query evaluation loop, the corresponding code sequence can be dramatically shortened.

The orders relation from the TPC-H benchmark is utilized as an example to illustrate the application of micro-specialization. To specialize the slot_deform_tuple( ) function for the orders relation, the variables that are constants are first identified. According to the schema, no null values are allowed for this relation. Therefore the null checking statements in lines 13 to 18 are not needed. Instead, the entire isnull array can be assigned to false at the beginning in the specialized code. Since each value of the isnullarray is a byte, the assignments can be collapsed with a few type casts. For instance, the eight assignments of isnull[0] to isnull[7] can be converted to a single, very efficient statement:

(long*)isnull=0;

As discussed earlier, some of the variables in Listing 1 are constant for any particular relation. For the orders relation, the value of the natts (number of attributes) variable is 9. Loop unrolling is applied to avoid the condition checking and the loop-counter increment instructions in the for statement. The resulting program simply has nine assignment statements.

```
values[0] = ...;
values[1] = ...;
...
values[8] = ...;
```

Focus next on the type-specific attribute extraction statements. The first attribute of the orders relation is a four-byte integer. Therefore, there is no need to consult the atlen variable with a condition statement. Instead, an integer value is directly assigned from the tuple with this statement.

values[0]=*(int*)(data);

Note that the data variable is a byte array in which the physical tuple is stored. Since the second attribute is also an integer, the same statement also applies. Given that the length of the first attribute is four bytes, four is added to data as the offset of the second attribute.

values[1]=*(int*)(data+4);

The resulting specialized code for the orders relation is presented in Listing 2. Note that the for loop in Listing 1 will be executed many times according to the number of attributes in the associated relations. As a result, the specialized code will execute many fewer instructions than the stock code.

Manual examination of the executable object code found that the for loop executes about 319 machine instructions (x86) for the orders relation in executing the following query.

SELECT o_shippriority FROM orders;

To execute the specialized code, a function call to the GetColumnsToLongs( ) function is inserted to replace the for loop, as shown in Listing 3. Note that in Listing 3, lines 6 through 11 represent the call to the GCLroutine. Starting from line 15, the code block is identical to the code block bounded by line 3 to line 43 shown in Listing 1. The GCL routine effectively substitutes the above code block. The specialized GCL routine executes only 64 instructions, for a reduction of approximately 255 (319-64) instructions.

Listing 2 The Micro-Specialized GetColumnsToLongs( ) Function

```
1   void GetColumnsToLongs(char* data, int* start_att, int* offset,
2                          bool* isnull, Datum* values) {
3     *(long*)isnull = 0;
4     isnull[8] = 0;
5     values[0] = *(int*)data;
6     values[1] = *(int*)(data + 4);
7     values[2] = (long)(address + bee_id * 32 + 1000);
8     *start_att = 3;
9     if (end_att < 4) return;
10    *offset = 8;
11    if (*offset != (((long)(*offset) + 3) & ~((long)3)))
12    if (!(*(char*)(data + *offset)))
13    *offset = (long)(*offset + 3) & ~(long)3;
14    values[3] = (long)(data + *offset);
15    *offset += VARSIZE_ANY(data + *offset);
16    *offset = ((long)(*offset) + 3) & ~((long)3);
17    values[4] = (*(long*)(data + *offset)) & 0xffffffff;
18    *offset += 4;
19    values[5] = (long)(address + bee_id * 32 + 1001);
20    *start_att = 6;
21    if (end_att < 7) return;
22    if (!(*(char*)(data + *offset)))
23    *offset = (long)(*offset + 3) & ~(long)3;
24    values[6] = (long)(data + *offset);
25    *offset += VARSIZE_ANY(data + *offset);
26    values[7] = *(int*)(address + bee_id * 32 + 1002);
27    if (!(*(char*)(data + *offset)))
28    *offset = (long)(*offset + 3) & ~(long)3;
29    values [8] = (long)(data + *offset);
30    *start_att = 9;
31  }
```

To determine the actual realized performance benefit, the above query was studied in detail. This query requests a sequential scan over the orders relation, which has 1.5M tuples (with the scale factor set to one for the TPC-H dataset). Given that the specialized code saves 255 instructions and the code is invoked 1.5M times (once per tuple within the query evaluation loop), the total number of instructions is expected to decrease by 382M.

Listing 3 Inserting a Call to Invoke the GCL Routine in the slot deform tuple Function

```
1  void slot_deform_tuple(TupleTableSlot *slot, int natts) {
2    ...
3    #ifdef USE_BEE
4    if (tupleDesc->bee_info && HeapHasBeeID(tup) &&
5        IsRelIDValid(tupleDesc->bee_info->
                      rel_info[0].relation_id)) {
6      ((GCL)(GetBee(tupleDesc->bee_info->rel_info[0].relation_id).
7         executable_routine.routines[GCL_ROUTINE_ID]))(
8           HeapGetBeeID(tup), (char*)tup + tup->t_Koff,
9           GetBee(tupleDesc->bee_info->
                   rel_info[0].relation_id).data_region,
10          &(slot->tts_nvalid), natts, hasnulls, bp,
```

-continued

Listing 3 Inserting a Call to Invoke the GCL Routine in the slot deform tuple Function

```
11            &(slot->tts_off), values, isnull);
12   } else {
13   #endif
14   ...
15     if (attnum == 0) {
16       off = 0;
17       slow = false;
18     } else {
19       off = slot->tts_off;
20       slow = slot->tts_slow;
21     }
22   #ifdef USE_BEE
23   }
24   #endif
25 }
```

CALLGRIND [3] was utilized to collect the execution profiles. The summary data produced by CALLGRIND states the total number of executed instructions, the number of instructions for each function, and other runtime information. The focus is first on the counts for the executed instructions.

The execution of this query was profiled with both a stock PostgreSQL and one with the shorter code replacing the for loop. (See Section 4). The detailed profile summaries for these two executions are provided in Listing 4 and Listing 5, respectively. Note that the notation Ir stands for the number of executed instructions.

As expected, the slot_deform_tuple function, which contributed the highest number of instructions (548M) in the stock PostgreSQL (as shown by Listing 4), executed many fewer instructions (84M) when the specialized GetColumnsToLongs routine is executed to substitute the for loop. This specialized routine is represented by its address (0x00000000043f53c0) shown in Listing 5 and requires 96M instructions.

Specifically, the total number of executed instructions of the stock PostgreSQL was 3.448B, which implies that this micro-specialization will produce an (estimated) reduction of about 11% (382M/3.448B). The total number of instructions actually executed by the specialized Postgre-SQL is 3.107B, a (measured) reduction of 341M instructions, or 10%, consistent with our estimate. The total running time of the query was measured on the stock PostgreSQL and the specialized version, at 652 milliseconds and 592 milliseconds, respectively. The over 9% running-time improvement is consistent with the profile analysis.

Listing 4 Query Execution Profile with a Stock PostgreSQL

| Ir | function |
| --- | --- |
| 3,448,224,837 | Total |
| 547,500,024 | slot_deform_tuple |
| 491,460,416 | memcpy |
| 226,000,431 | AllocSetAlloc |
| 194,357,331 | AllocSetFree |
| 139,691,426 | internal_putbytes |
| 126,000,000 | printtup |
| 117,001,066 | enlargeStringInfo |
| 105,910,877 | heapgettup_pagemode |
| 105,000,000 | ExecProject |
| 85,500,589 | appendBinaryStringInfo |
| 78,000,043 | ExecScan |
| 67,556,055 | MemoryContextAlloc |

| Listing 5 Query Execution Profile with a PostgreSQL that Invokes the Specialized Routine ||
| --- | --- |
| Ir | function |
| 3,107,192,217 | Total |
| 492,160,803 | memcpy |
| 226,000,425 | AllocSetAlloc |
| 194,357,155 | AllocSetFree |
| 139,691,101 | internal_putbytes |
| 126,000,000 | printtup |
| 117,001,066 | enlargeStringInfo |
| 105,759,169 | heapgettup_pagemode |
| 105,000,000 | ExecProject |
| 96,000,000 | 0x00000000043f53c0 (GetColumnsToLongs) |
| 85,500,589 | appendBinaryStringInfo |
| 84,000,000 | slot_deform_tuple |
| 78,000,043 | ExecScan |
| 67,555,995 | MemoryContextAlloc |

By specializing a single routine within the query evaluation loop, the generic slot_deform_tuple( ) function, on just a few variables, replacing 39 lines of code (out of PostgreSQL's 380,000 lines of code) with a specialized version, a 7.2% running time improvement on a simple query was achieved. This improvement suggests the feasibility and benefits of applying micro-specialization aggressively.

Each micro-specialization identifies one or more variables whose value will be constant within the query evaluation loop. The original code that references these variables is then replaced by multiple copies of the specialized code, each particular to a single value of each of those variables. In the example given above, the variables concerned the specific relation being scanned. Hence, a specialized version of GetColumnsToLongs( ) is needed for each relation.

Micro-specialization replaces generic code with highly specialized code. This dynamic code-specialization-based approach is closely related to other aggressive specialization techniques. For instance, Krikellas et al. investigated query-compilation based specialization approaches [8]. Since query compilation essentially specializes query-evaluation code to be specific to particular queries, the resulting specialized code can be highly optimized and hence very efficient. Such approaches provide a upper bound for the performance benefits that can be achieved by micro-specialization. As reported by Krikellas, the runtime speedup achieved for query3 in the TPC-H benchmark was over 10×. Studies of the general performance benefits realized by micro-specialization are provided in Section 8. With the current implementation, with just a few bee routines, over 10% performance improvement (or a 1.1× speedup) was realized for query3 by micro-specialization, and the most significant improvement is up to 38% (or a 1.6× speedup). As there is the opportunity for dozens of bee routines, the possibility exists for a several-times speedup when bees are more fully exploited.

Section 3: Approach

With the experience of applying one micro-specialization, as illustrated in the previous section, micro-specialization is now generalized with a taxonomy of its broad applicability within DBMSes. Moreover, a detailed rationale of when various kinds of micro-specializations can and should be applied is provided.

3.1 Terminology

The following terminology is introduced:

The specialized code, after being compiled and linked, is termed a "bee." This is because the specialized code is small in its size and efficient during execution. Potentially many instances of specialized code can be employed to evaluate queries. The specialized code resembles bees' characteristics. A bee that is associated with a particular relation, as discussed in the case study, is termed a "relation bee."

A bee can have multiple "bee routines," each produced by a particular micro-specialization at a certain place in the DBMS source code on one or more variables that have been identified as being locally invariant across the query evaluation loop.

When the source code of a bee is compiled, a "proto-bee" is generated. Proto-bees are not directly executable as they may contain "holes," which will be filled in with runtime values to form the actual executable bees. In other words, proto-bees serve as prototypes for actual bees. Moreover, there may be multiple versions of proto-bees, each representing a distinct code branch required by the tasks performed by the bee.

The management of bees at runtime, including bee construction, invocation, and supporting resource allocation and reclamation, are automatically handled by a "Hive Runtime Environment" (HRE), a DBMS-independent API (module) incorporated into the DBMSes which enables micro-specialization.

In the case study, micro-specialization is applied on values (attribute length, etc.) that are constant for each relation, and so a bee routine results. This particular bee routine is termed GCL, as shorthand for the specialized GetColumnsToLongs( ) routine. There will be a unique relation bee for every relation defined in a database.

Another PostgreSQL function named heap_fill_tuple is specialized that constructs a tuple to be stored from an long integer array, resulting in an additional bee routine namely SetColumnsFromLongs( ) (SCL) for each relation. So each relation bee now has two bee routines.

This general approach raises two central questions: where can micro-specialization be applied and when during the timeline from relation-schema definition to query evaluation can micro-specialization be done?

3.2 Where to Apply Micro-Specialization?

A taxonomy 100 of approaches to micro-specialization is presented in FIG. 1, based on two types of "variables" in a DBMS where micro-specialization can be applied to: stored data 112 and internal data structures 114. The taxonomy 100 also includes the other, coarser-grained specializations, including architectural level specialization 104, component level specialization 106, and user-stated level specialization 108.

Discussed above are two bee routines within relation bees 120. These specialize code based on various characteristics of individual relations; hence, the specialization is that of the relational schema 116. In this particular case, we specialize on each attribute's length, offset, alignment, and the presence of nullable attributes, as well as on the number of attributes in the relation.

The application of micro-specialization can be extended down to an individual tuple by introducing tuple bees 124, in which specialization focuses on the values of particular attributes within a tuple. Consider an attribute with a few distinct values 118, such as "gender." When the value extraction routine requests the value of this attribute, instead of computing the length, offset, and alignment of the attribute, a single assignment such as values[x]='M'; can properly fulfill the value extraction of this attribute. This occurs within a tuple bee associated with that tuple; this is done by including in such tuples a short index identifying the appropriate tuple bee, termed a "beeID." So, for example, there might just be two tuple bees, one for each gender, or we might also specialize on other attributes, as long as there aren't too many tuple bees generated, so that a small number of tuple bees are generated for all the tuples in the relation. The selection of the quantity of tuple bees is discussed in Section 4 with specific implementation considerations.

The last type of bee specializes on internal data structure 114 issued during query evaluation, for which some of the values in the data structure are constant during the evaluation loop of a query. For example, a query that involves predicates will utilize a FuncExprState data structure (a struct) to encode the predicate. For the predicate "age <=45", this predicate data structure contains the ID of attribute age, the <=operator, and the constant 45. Specialization can be applied on these variables once the predicate from the query is known. The bees resulting from specializing such query-related data structures are thus termed "query bees" 128.

Moreover, incorporated into this taxonomy is the concept of "page bee" 122 "modification bee" 130 and "compilation bee" 126. Specifically, page bees 122 can take advantage of information stored within particular pages, such as the a page is full or empty and the number of tuples within a page. Modification bees 130 can be tailored to specific types of transactions that perform deletions or updates. Finally, it is recognized that conventional DBMSes, such as PostgreSQL, utilize function pointers, which are for instance, pre-compiled type-specific comparison functions, at query evaluation time to avoid an otherwise switch-case based inefficient implementation. These pre-compiled type-specific functions present significant resemblance to bees except for the fact that these functions are compiled at DBMS-compilation time. Hence these are termed "compilation bees" 126.

This taxonomy characterizes six different kinds of bees, depending on the kind of variable specialized on to create the bee. By identifying values used by oft-executed code within the query evaluation loop, many bee routines can be created. Each bee routine will independently speed up a subset of queries and modifications.

3.3 How can Micro-Specialization be Applied?

Micro-specialization can be applied to many places within a DBMS. Due to the fact that micro-specialization is applied on particular values present in the query-evaluation loop rather than specific to the actual DBMS components these values belong to, the variety in applying micro-specialization does not incur significant complexity.

Generally, applications of micro-specialization utilize the following sequence of five tasks. A brief description of these tasks is provided here. These tasks are further explained in later sections.

Bee design relies on both dynamic and static program analysis to identify the query evaluation loop and the variables that are runtime-invariant present within this loop. Then specialized versions of the source code are composed, usually in the form of code snippets corresponding to individual code branches, according to the values of these identified invariants.

Bee source-code creation creates the bee source code by combining the appropriate code snippets.

Proto-bee generation compiles the source code produced from the previous task to form executable code, resulting in proto-bees. Note that since the C compiler is invoked in this step, which incurs a non-trivial overhead, care should be taken as to when this particular task is performed.

Bee instantiation updates the executable code with runtime information, such as the values of certain constants present in the proto-bees. Bee instantiation essentially plays the role of a (dynamic) linker and produces the final executable bees. Note that for some bees, such as relation bees that contain no such constants whose values can only be determined at runtime, bee instantiation requires no modification to the proto-bees.

Bee invocation invokes the instantiated bees by the DBMS at runtime.

One mechanism of bee instantiation is object-code manipulation on proto-bees. A proto-bee is essentially object code with placeholders, each represented as a magic number hardcoded in the bee source code, which can be easily identified when the source code is compiled into object code. One example of the usage of placeholders is function addresses. When the bee source code is designed, function calls, which require dynamic linking to manage, cannot be directly utilized. Instead, each function call from within a bee is represented as a dummy function address. At bee-instantiation time, these magic numbers will be substituted with the actual function addresses that are invoked by the bee.

3.4 When can Micro-Specialization be Applied?

Table 3.1 summarizes when for each kind of bee, each of the five tasks should be performed, on the timeline from DBMS compilation to query evaluation. The timeline begins with "DBMS development," the time when the DBMS is designed and implemented. "DBMS compilation" represents the time point when the DBMS source code is compiled into executable program. When the DBMS executable is installed by users and when the DBMS server starts, databases can be created. This time point is termed "database creation." Within a created database, relations can be created according to the specified data-definition language (DDL) statements. This stage is termed "schema definition." When queries are presented to the DBMS, the "query preparation stage" will be invoked first to compute the query plans. Subsequently, actual query evaluation and tuple access/modification can be carried out. Note that each successive task must occur after the completion of the previous task. Another overarching issue is that bee generation is slow, in that it requires invoking the compiler. Hence bee generation should be avoided during query-evaluation time, if possible.

As mentioned earlier, examples of compilation bees are the pre-compiled type-specific comparison functions implemented in PostgreSQL. The source code for these functions is implemented along with the DBMS source code. The generation of the executable code of these functions is performed when the DBMS is compiled. Instantiation of the produced code is done directly by the compiler and linker.

In fact for all kinds of bees, the design needs to happen at the same time when the DBMS source code is developed. This is because the design of bees primarily depends on the code execution paths present in the host DBMS. To ensure that bees perform in the same way as these substituted execution paths at runtime, directly utilizing existing source code to compose the bee source-code snippets is sufficient.

Compilation bees can be invoked at both query-evaluation time and tuple-access or modification time.

For a relation bee, its source code snippets are attribute type-specific. For each type of attribute (INT, CHAR, or NUMERIC), the corresponding attribute value is extracted from a tuple with different code branches. Once the schema of a relation is defined, all the attribute types are known. Hence the corresponding code snippets can be selected to form the relation bee for the particular relation. Since relation definition is not a performance-critical task, once a relation is defined, the resulting bee source code can be compiled to create the relation proto-bee. Furthermore, given that each relation bee is entirely dependent on the schema definition and the existence of particular relations, the relation proto-bees can then be instantiated at schema definition.

mation is only available when the plan for a query is generated, query-bee instantiation can only be done at query-preparation time.

Query bees can be invoked during query evaluation and modifications.

TABLE 3.1

When Each Task for Each Kind of Bee is Carried Out

|  |  | DBMS development | DBMS compilation | database creation | schema definition | query preparation | query evaluation | tuple access/ modification |
|---|---|---|---|---|---|---|---|---|
| Compilation bee | design | ✓ |  |  |  |  |  |  |
|  | creation | ✓ |  |  |  |  |  |  |
|  | generation |  |  | ✓ |  |  |  |  |
|  | instantiation |  |  | ✓ |  |  |  |  |
|  | invocation |  |  |  |  |  | ✓ | ✓ |
| Relation bee | design | ✓ |  |  |  |  |  |  |
|  | creation |  |  |  | ✓ |  |  |  |
|  | generation |  |  |  | ✓ |  |  |  |
|  | instantiation |  |  |  | ✓ |  |  |  |
|  | invocation |  |  |  |  |  | ✓ | ✓ |
| Tuple bee | design | ✓ |  |  |  |  |  |  |
|  | creation |  |  |  | ✓ |  |  |  |
|  | generation |  |  |  | ✓ |  |  |  |
|  | instantiation |  |  |  |  |  |  | V |
|  | invocation |  |  |  |  |  | ✓ | ✓ |
| Query bee | design | ✓ |  |  |  |  |  |  |
|  | creation |  | ✓ |  |  |  |  |  |
|  | generation |  | ✓ | ✓ |  |  |  |  |
|  | instantiation |  |  |  |  | ✓ |  |  |
|  | invocation |  |  |  |  |  | ✓ | ✓ |
| Modification bee | design | ✓ |  |  |  |  |  |  |
|  | creation |  |  |  | ✓ |  |  |  |
|  | generation |  |  |  | V |  |  |  |
|  | instantiation |  |  |  |  |  |  | ✓ |
|  | invocation |  |  |  |  |  |  | ✓ |
| Page bee | design | ✓ |  |  |  |  |  |  |
|  | creation |  |  | ✓ | ✓ |  |  |  |
|  | generation |  |  | ✓ | ✓ |  |  |  |
|  | instantiation |  |  |  |  |  |  | ✓ |
|  | invocation |  |  |  |  |  | ✓ | ✓ |

Tuple bees are very similar to relation bees as they both are relation schema-specific, as discussed depth below in Section 5, hence the creation of tuple bee source code is also performed at schema-definition time. Nevertheless, the time for performing tuple-bee generation is later than for relation bees. In addition to being schema-specific, tuple bees are also attribute value-specific. Thereafter, the generation of new tuple bees can only be carried out during modifications, in particular, during inserts and updates. After tuple bees are generated, they are instantiated along with the modifications.

Both relation bees and tuple bees can be invoked during query evaluation and tuple access or modification. Note that bees can only be invoked after they are instantiated, in that instantiation modifies the object code of bees to incorporate runtime information necessary for the execution of bees. Although as shown in Table 3.1, tuple bees are invoked during query evaluation, which occurs before modification, only the tuple bees that have been instantiated during modification, such as tuple insertion, can be invoked during query evaluation.

The source code for query bees is created at DBMS compilation time in that query bees are essentially specialized (small) portions of query-evaluation algorithms, which are designed along with the DBMS. There are two choices for performing query-bee generation, either at DBMS-compilation time or at database-creation time. In the implementation of the embodiments disclosed herein, query bees are created during database creation. Since query-specific infor- For modification bee, since the insert, update, and delete operations are schema-dependent, modification-bee creation may happen during schema definition. Generation of modification bees can be scheduled also at schema definition. During actual modifications, modification bees can be instantiated with the proper runtime values.

Modification bees should only be invoked during modification.

Finally, page-bee creation should happen at database-creation time in that important information, such as size of pages and kinds of pages (in-memory and on-disk), are normally configured during database creation. Page bees can also be created during schema definition in that schema information can be utilized to further specialize page-access code. For instance, if all the attributes are of fixed length, the offset of each tuple within a page can be efficiently computed by the page bee without reading the page header. Page bees can be generated during database creation and schema definition. For in-memory pages that serve in the DBMS buffer-pool, they can be generated during database creation. For on-disk pages where tuples are stored, schema-related information needs to be taken into account for corresponding page bees. Therefore, on-disk page bees should be generated at schema definition. Given that pages are allocated and reclaimed along with queries and modifications, page-bee instantiation should be scheduled during query evaluation and modification.

Page bees can be invoked during both query-evaluation time and tuple-access or modification time. Similar to tuple bees, only the page bees that have been instantiated during modification can be invoked at query-evaluation time.

It may seem that by creating and generating individual bees, additional code—including the specialized code itself and the code that creates the bee source code—is being added to the DBMS. In fact, the introduced specialized code replaces the original code. Hence the size of the DBMS executable is reduced. Concerning the code that performs bee source-code creation, such code is shared among the same kind of bees, e.g., the creation of all the relation bees utilizes the same function. Thereafter, just a small number of lines of source code is required for performing bee source-code creation. At run time a significant number of instructions can be reduced by the specialized code, as illustrated in the case study. Therefore the footprint of the query-evaluation code in memory is actually reduced with each additional bee, which also reduces instruction-cache misses (though the HRE increases the footprint slightly, by a fixed amount). More comprehensive studies of the performance benefits of micro-specialization are provided in Section 8.

Section 4: Incorporating the Hive Runtime Environment Into a DBMS

In this section the Hive Runtime Environment (HRE) is introduced, which is a DBMS-independent module that performs many of the underlying management tasks associated with creating bees and executing bee routines on behalf of the DBMS. HRE provides an API to the DBMS, thereby making it easy for micro-specialization to be applied to DBMSes while minimizing necessary modifications to the existing DBMSes.

4.1 Architecture of the HIVE Runtime Environment

Figure 2:
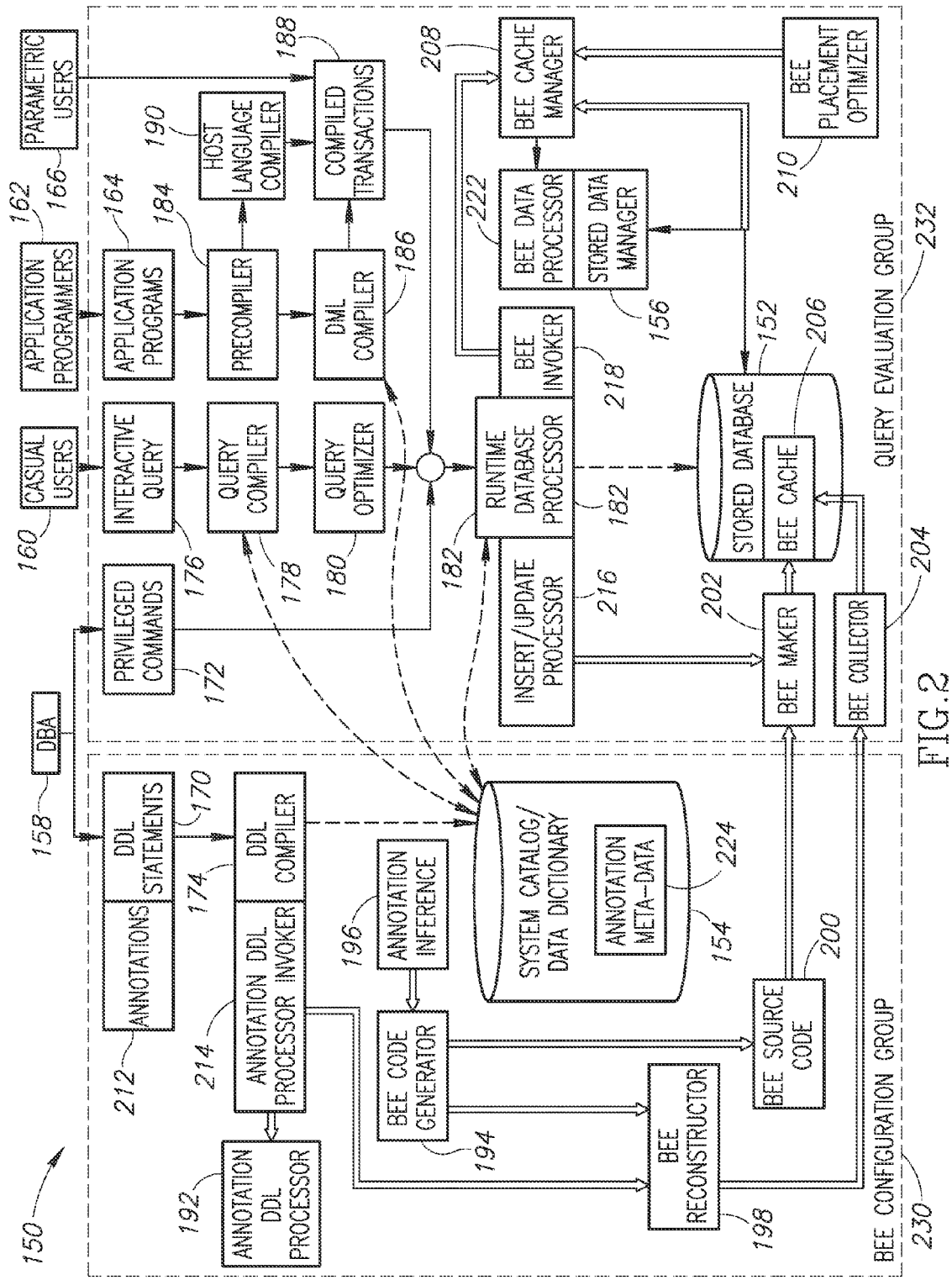
FIG. 2 illustrates an architecture of a bee-enabled DBMS.

FIG. 2 depicts a conventional architecture [5] for a DBMS system 150 modified to implement the HRE. Initially, a description of the conventional DBMS architecture components are described, followed by the modifications.

The system 150 includes a database 152 and a system catalog 154 that may be stored on a data storage module (e.g. disk), and accessed by an operating system. The system 150 may also include a high level stored data manager module 156 that is configured to controls access to DBMS information that is stored as part of the database 152 or the catalog 154. The system 150 includes interfaces for database administrator (DBA) staff 158, casual users 160 that form queries, application programmers 162 who create programs 164 using programming languages, and parametric users 166. The DBA staff 158 may define the database 152 and tune it by making changes to its definition using DDL statements 170 and other privileged commands 172.

A DDL compiler 174 processes schema definitions, specified in the DDL statements 170, and stores descriptions of the schemas in the DBMS catalog 154.

Casual users 160 with occasional need for information from the database may utilize an interactive query interface 176 to interact with the system 150. The queries may be compiled by a query compiler 178 that compiles them into an internal form. This internal query may be optimized by a query optimizer 180. The query optimizer 180 may access the system catalog 154 information about the stored data and generates executable code that performs the necessary operations for the query and makes calls on a runtime database processor 182.

Application programmers 162 write programs 164 (e.g., in Java, C, or C++) that are sent to a precompiler 184. The precompiler 184 extracts DML commands and sends them to a DML compiler 186 for compilation into compiled transactions 188 for database 152 access. The rest of the program 164 is sent to a host language compiler 190. The object codes for the DML commands and the rest of the program are linked, forming the compiled transaction 188 which may be executed by the runtime database processor 182.

The components of the HRE comprise an annotation DDL processor 192, a bee code generator 194, an annotation interference module 196, a bee reconstructor 198, a bee source code repository 200, a bee maker 202, a bee collector 204, bee cache 206, a bee cache manager 208, and a bee placement optimizer 210. The HRE provides the bee configuration, bee generation, and bee invocation functionality in a largely DBMS-independent fashion.

Code added to the DBMS to invoke methods provided by the HRE API and other changes required to existing code within DBMS, include annotations module 212, annotation DDL processor invoker 214, insert/update processor 216, bee invoker 218, bee data processor 222, and annotation meta-data 224. To fully support all the bee types in the taxonomy of FIG. 1, three existing DBMS components (the DDL Compiler 174, the Runtime Database Processor 182, and the Stored Data Manager 156), two repositories (the System Catalog/Data Dictionary 154 and the Stored Database 152), and the schema (the DDL Statements 170) need to be augmented with added code. The thicker lines denote calls to a component of the HRE and the dotted lines depict either storage of or access to schema information.

The developer applying micro-specialization, i.e., replacing some generic DBMS code with calls to specialized bee routines, should decide i) what bee routines to be designed, ii) how to create the corresponding source code, iii) how to generate the proto-bees, iv) how to instantiate the proto-bees, and v) how to effect the execution of bee routines. The associated tasks are discussed in Section 9 below. The changes required to the architecture of a conventional DBMS to accommodate bees can correspondingly be classified into two groups, termed a "Bee Configuration Group" 230 and a "Query Evaluation Group" 232, respectively. The components within each group are now examined.

4.1.1 The Bee Configuration Group

The bee configuration group 230 performs bee source code creation and proto-bee generation. The developer designs source code snippets corresponding to various code branches and the bee configuration group at runtime creates bee routines source code by stitching together the proper snippets. The selection of the snippets is tailored to the specific values of the invariants on which micro-specialization is applied. The details of the creation and generation of tuple bees and query bees, in particular on how the components in this group are involved in these two tasks, are discussed in Section 5 and Section 6, respectively.

4.1.2 The Query Evaluation Group

The query evaluation group 232 is a collection of eight components that perform tasks to ensure that bees are properly managed, coupled with actions within the DBMS itself.

First, after the source code for a particular bee is composed, the Bee Maker is invoked to perform two tasks. First, proto-bees are generated by compiling the bee source-code. Second, the proto-bees are instantiated with correct runtime values, which substitute the placeholders, if present, in the proto-bees. This object-code instantiation task produces the actual executable bees. The bee maker relies on GCC to compile the source code for bees. The resulting object file, namely Executable and Linkable Format (ELF) [6] contains a collection of information including headers, tables, variables, and function bodies, which are all useful when the ELF file is linked and loaded into memory for execution, in its conventional usage. However, to assemble a bee, only the function bodies corresponding to the bee routines are needed. So the bee maker extracts the function bodies and uses them to create the individual bees.

The Bee Cache Manager component manages the bees when they are in main memory. When the bee source code is compiled into object code, the bees are formed and stored in a designated executable memory region managed by the bee cache manager. The in-memory bee storage needs to be stored on disk. This on-disk storage of bees is termed the "Bee Cache." A simple policy is implemented that when a database connection is terminated, the bees created from this connection are pushed to disk files by the bee cache manager. Currently the bee cache is not guaranteed to survive across power failures or disk crashes, though a stable bee cache could be realized through the Undo/Redo logic associated with the log. When the DBMS server starts, all the bees (or perhaps only the ones that are needed) are loaded into the executable memory region so that bees can be directly invoked.

When a query is evaluated, the Bee Caller acquires the proper arguments. As an example, the GCL routine requires a pointer to the tuple (the data argument shown in Listing 2). The bee caller passes the needed arguments to the bee cache manager, and the bee cache manager invokes the proper bee routine with these arguments. The bees are placed at designated locations in memory by the Bee Placement Optimizer 210, such that the instruction-cache misses caused by executing the bees are minimized. Detailed discussions on how to select such memory locations are provided in Section 7.

Finally, the Bee Collector garbage collects dead bees (e.g., those not used anymore due to relation deletion), from those in both the bee cache manager (those bees in main memory) and in the bee cache on disk.

In summary, the components shown in FIG. 2 provide a fully-elaborated HRE. The HRE consists of six thousand source lines of code (SLOC). As mentioned, the HRE incurs minimal changes to the existing DBMS. In our implementation, the changes to PostgreSQL, as represented by the darkly-shaded boxes in FIG. 2, are about 600 SLOC. The changes contain argument preparation, memory allocation, resource reclamation, and bee invocation statements that are only necessary to effect bees. The changes made to the DBMS are minimal, compared to the 380K SLOC PostgreSQL DBMS.

In general, the advantage of this micro-specialization approach is that bees are generated outside the DBMS and invoked on the fly, hence the changes to the existing DBMS include only a minimal set of supporting statements, such as assigning function pointers, initializing parameters, and reclaiming resources, which effectively enables the HRE to be DBMS-independent and thus can be deployed in other DBMS without extensive refactoring.

4.2 Technical Considerations

Here the focus is on three technical challenges present during the design and implementation of the HRE, and solutions adopted for those challenges 4.2.1 Enabling Code Sharing in Tuple Bees As introduced in Section 4.1.2, the bee cache is an on-disk storage where bees are located. Specifically, a bee cache consists of two sections, namely the bee-routine section and the data section. Technically, each bee consists of a dedicated a routine section and a data section. The routines inside the routine section access the data section at runtime. The shortcoming of such a configuration is that the overall storage requirement for all the bees can grow rapidly, especially as new bees and new bee routines are added. Given that all the tuple bees of the same relation in fact share the same functionalities, that of extracting values from tuples and constructing tuples from raw values, these tuple bees can therefore effectively utilize the same set of bee routines. Thereafter, a global routine section is constructed in the bee cache for all the tuple bees that are instantiated from the same proto-bee version for a particular relation.

The advantage for tuple-bee routine-code sharing is that it minimizes the storage requirement for storing tuple bees on disk and in memory. In particular, this code-sharing strategy effectively minimizes the pressure on the Level-2 cache, which is 256 KB on the experiment machine. In addition, Level-1 instruction cache performance is also improved in that even though many different tuple bees are invoked, the same set of instructions that belong to a particular bee routine will retain in the instruction cache without otherwise being evicted, if each tuple bee requires a distinct routine section.

4.2.2 Executing Dynamically Generated Code

Bee source code is compiled using GCC. The result is an object file containing various headers and code sections [6]. These components contain critical information when the object file is executed or linked in its conventional usage. Among these components, the .text section, which stores the actual executable machine code, is converted into bees. A technical concern is raised when the .rela.text[6] section is also present. This particular section contains data for the linker to perform object-code relocation. Specifically, if the source code includes hardcoded strings or switch-case statements, the .rela.text section will be generated. Incorporating the .rela.text section into bee invocation and execution mechanisms introduces runtime overhead and technical complications. To keep the bees small (by avoiding this additional code section in the bee code) and to avoid implementing a sophisticated linker for the bee code, the relocation operation is bypassed by ensuring that the bee source code does not contain constructs that will be converted into the .rela.text section after compilation. To achieve this goal, the following two rules were relied upon in composing bee source code.

Instead of directly hardcoding strings into source code, store the strings separately in the data section. To access the correct data section at runtime, the beeID is employed to compute the offset of particular data sections. Hence in the source code, the strings stored in the data section are accessed directly by referencing memory addresses.

To avoid switch-case statements, if-else statements are used as an equivalent alternative.

At runtime, the bees, which essentially are executable code, are loaded into main memory for execution. This bee-loading operation is carried out by a collection of OS API functions. Specifically, an executable region of main memory needs to be allocated first. This is done by the posix_memalign( ) function. To allow bees to be loaded into and executed inside this allocated memory, function mprotect( ) needs to be called to set the readable, writable, and executable flags to this memory region. The function is called with the following convention:

mprotect(memory_address, memory_size, PROT_READ|PROT_WRITE|PROT_EXEC);

Note that when a bee is loaded into this allocated memory region, this entire memory chunk should be re-protected by the following function call.

mprotect(memory_address, memory_size, PROT_READ|PROT_EXEC);

By eliminating the PROT WRITE flag, the content stored in this memory chunk can no longer be modified. When the DBMS server terminates, all the allocated memory pages are freed.

4.2.3 Bee Placement

As introduced in Section 4.1.2, bees are placed in main memory by the "Bee Placement Optimizer" 210 to reduce instruction-cache misses. For each bee, three main memory pages (4 KB each) are needed for placing and storing the bee. This is because in the experiment machine, each core on the CPU is configured with a 32 KB 4-way set-associative level-1 instruction cache, with each cache line being 64 bytes wide. This instruction cache maps to a total of 8 KB of main memory space, which is equivalent to two memory pages. In other words, 8 KB of main memory covers all 128 unique cache slots. For instance, the first cache slot is mapped at the first 64 bytes of the allocated 8 KB of memory and the 128th cache slot is mapped to the last 64 bytes in this allocated memory region. To allow the entire bee, which may extend beyond the 64 bytes of the last cache line, to be stored in memory properly, an additional memory page is hence required.

4.3 The HIVE Runtime Environment API

An API was designed to allow the HRE to be incorporated into a DBMS. This API is designed to be DBMS-independent such that HRE can be used by many DBMSes. The details of this API are illustrated with a static call graph 250 of the API shown in FIG. 3.

Figure 3:
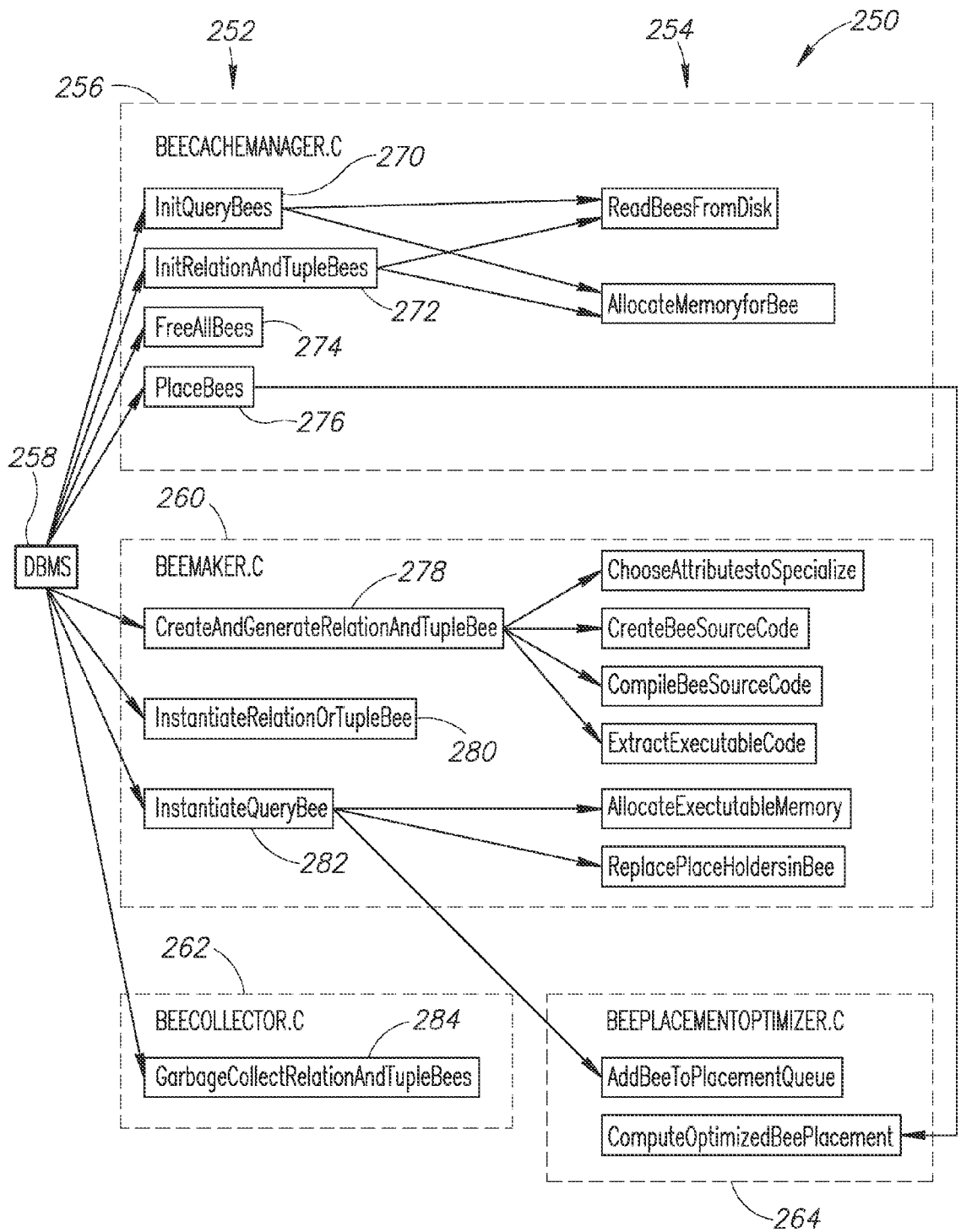
FIG. 3 illustrates a Hive Runtime Environment call graph.

In FIG. 3, the eight functions 252 listed on the left are invoked directly by a DBMS 258. These eight functions 252 in concert form the API. The ten functions 254 listed on the right are auxiliary functions invoked internally within the HRE. The DBMS 258 does not directly invoke these ten functions 254. A comprehensive description for each of the eight functions 252 present in this API is now provided.

4.3.1 Applying Micro-Specialization with the HRE API

Figure 4:
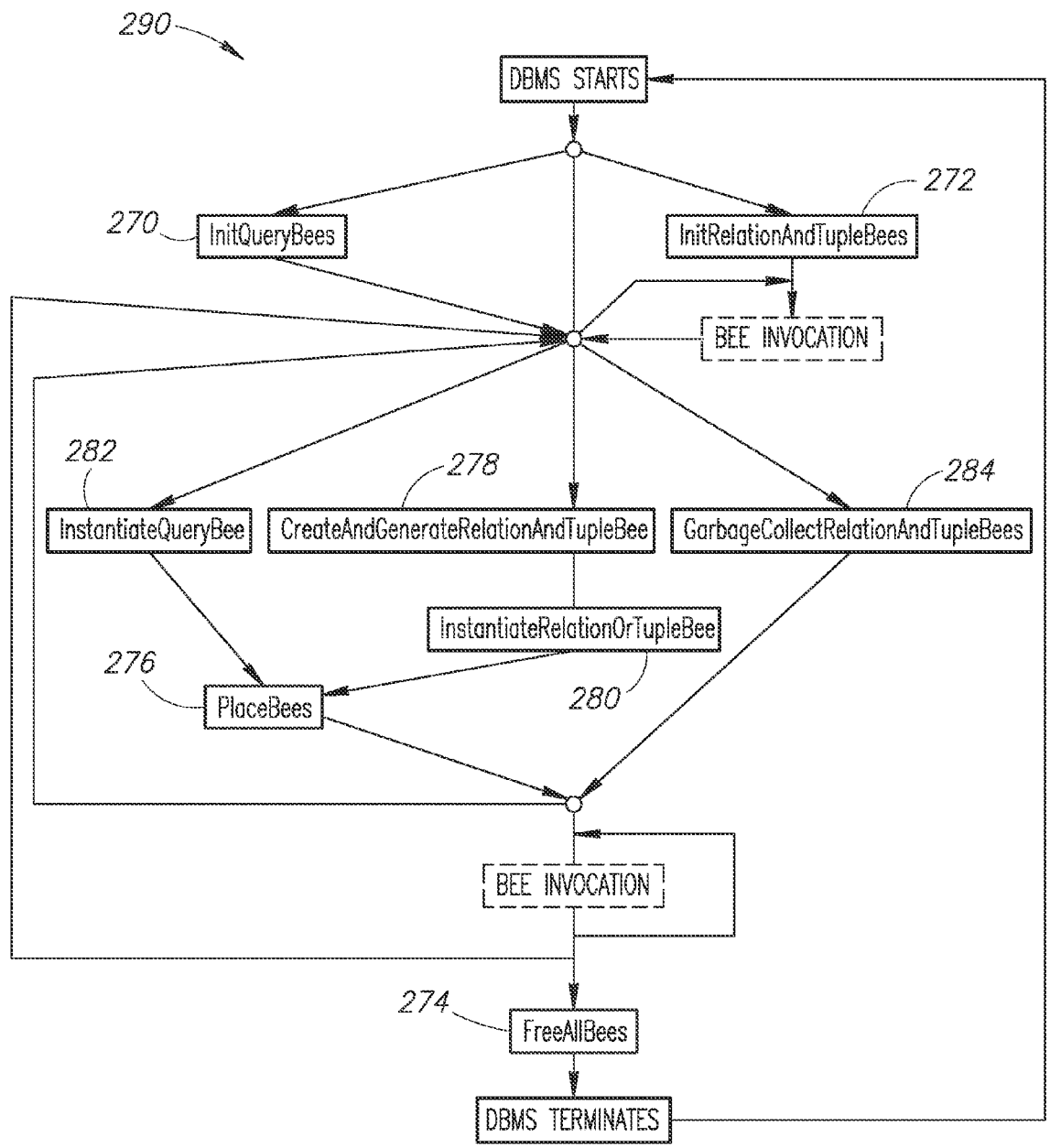
FIG. 4 illustrates when each HRE-API function gets invoked.

Five sequential tasks required for applying micro-specialization were discussed above in Section 3.3. These are, for each bee, (a) design, (b) create, (c) generate proto-bees, (d) instantiate, and subsequently (e) invocation, as exemplified in Listing 3. The discussion of the API functions is now summarized within the context of performing these tasks. FIG. 4 depicts a flowchart 290 illustrating when each API function is invoked.

Before the DBMS 258 is compiled, all the bees are designed. No API function is needed for this task. For query bees, the source code is created along with the DBMS source code during DBMS development. The generation of query proto-bees is performed during DBMS compilation.

The DBMS 258 initializes the interaction with HRE by calling the InitQueryBees 270 and InitRelationAndTupleBees 272 functions.

The CreateAndGenerateRelationAndTupleBees 278 function is invoked by the DBMS 58 when new relations are defined. This function 278 performs the bee source-code creation and proto-bee generation tasks for relation and tuple bees. As just mentioned, the HRE API need not provide any function to create query-bee source code.

When relations are dropped, the GarbageCollectRelationAndTupleBees 284 function will be invoked by the DBMS 258.

At query-preparation time, the DBMS 258 invokes the InstantiateQueryBee 282 function, which performs the bee instantiation task of query bees. The instantiations of relation and tuple bees, which are performed by the Instantia-teRelationOrTupleBee 280 function, are carried out after relation and tuple bees are generated.

After bee instantiation, the PlaceBees 276 function is invoked by the DBMS 258. As discussed in detail in Section 2, bee invocation is performed by function calls inserted into the DBMS 258, hence no HRE-API function is utilized to invoke bees.

Finally, when the DBMS server terminates, the FreeAllBees 274 function is called to release allocated resources.

4.3.2 Data Structure Definitions

```
struct RelationDefinition {
    int database_id;
    int relation_id;
    int num_attributes;
    bool no_nullable_attribute;
    AttributeDefinition* attributes;
}
```

The creation of relation and tuple bees relies on relation schemas. While different DBMSes manage schema internally in various ways, the pieces of information that are required for relation and tuple bee creation were extracted and the RelationDefinition data structure to be utilized by the HRE was designed. The fields database_id and relation_id uniquely identifies a database and this relation, respectively, by the DBMS. These two variables are discussed later along with their involvement in the invocations to the HRE API. Note that these two fields in the RelationDefinition struct are used by the HRE to match the database catalog managed by the DBMS, such that HRE does not require additional identification of relations and databases.

The num_attributes specifies the number of attributes in the current relation. The no_nullable_attribute flag indicates whether the current relation allows nullable attribute(s). This flag is utilized during relation- and tuple-bee creation. As mentioned in Section 2, when the relation does not allow nullable attributes, the code for checking null values can be eliminated.

Finally, HRE defines the AttributeDefinitionstruct to store attribute-specific information needed for relation- and tuple-bee creation.

```
struct AttributeDefinition {
    int attribute_num;
    int attribute_type;
    int attribute_maxlength;
    int domain_cardinality;
    bool attribute_specialized;
}
```

In the AttributeDefinition struct, the attribute_num field is a zero-based index for each attribute. The attribute_type field describes the type of the current attribute with an integer, which is internally supported by the HRE. Note that the DBMS developers will need to provide a DBMS-dependent mapping between this integer field and the attribute definition supported by each DBMS. For instance, attribute_type long is represented by 20 in PostgreSQL. In the HRE, the long attribute_type is indicated by value 5.

The attribute_maxlength field specifies the length of the attribute. Note that for a variable-length attribute, this is the maximal length specified in the DDL. For instance, according to VARCHAR(128), the attribute_maxlength is 128. Capturing the maximal length of an attribute is particularly important for tuple-bee creation. To effect data-section access by offsets computed based on the beeID, which we will elaborate in detail in Section 5, all the data sections that are associated with a relation are required to have the same length. The specified maximally-allowed length for each attribute ensures that all the data sections are of the same length.

The domain_cardinality field stores the number of distinct values for an attribute. The domain_cardinality is utilized during tuple-bee creation to determine which attribute(s) to specialized. A specialized attribute is indicated by setting the attribute_specialized flag to TRUE. For those attributes that are not specialized, a default value of 0 is assigned to the domain_cardinality field.

4.3.3 beecachemanager.c

A beecachemanager.c component 256 (see FIG. 3) provides bee-cache management. Four functions are available to the host DBMS.

int InitQueryBees( )

This function loads the query bees into memory. This function is invoked by the DBMS during the DBMS server process starts up. This function returns 0 upon success or a return code if an error occurs. The return codes and causes are described in Table 4.1. Note that since all these API functions perform critical tasks, on any error that occurs during the execution of these functions the DBMS server process should terminate.

TABLE 4.1

Return Codes and Causes for the InitQueryBees Function

| return code | cause |
|---|---|
| 1 | loading query bees from disk unsuccessful |
| 2 | memory allocation unsuccessful | int InitRelationAndTupleBees(int database_id)

This function loads only the relation and tuple bees, which belong to the database indicated by the database_id parameter, from disk into memory. This function can be directly invoked by the DBMS-server main process as well as by DBMS backend processes that compute statistics for relations, such as the ANALYZE facility provided by PostgreSQL. Such facilities are run in the backend for a short period of time and only operate on particular relations. Thereafter, instead of initializing the entire HRE for such a process, only the relevant relation bees and tuple bees are required.

This function returns 0 upon success or a return code if an error occurs. Table 4.2 lists the error codes and the causes.

TABLE 4.2

Return Codes and Causes for the InitRelationAndTupleBees Function

| return code | cause |
|---|---|
| 1 | loading bees from disk unsuccessful |
| 2 | memory allocation unsuccessful |
| 3 | database_id is invalid | void FreeAllBees( )

This function frees all the memory regions allocated by the bee cache. FreeAllBees is invoked by the DBMS during the per-database server process shut-down.

int PlaceBees( )

This function performs bee placement according to the optimization done by the bee placement optimizer 210 (see also beeplacementoptimizer.c function 264 in FIG. 3). PlaceBees is invoked after a relation is defined or after the query plan is generated for a particular query by the DBMS, at which time all the bees associated with the query have been instantiated.

This function returns 0 upon success or an return code if an error occurs. Table 4.3 summarizes the return codes and causes associated with the PlaceBees function.

TABLE 4.3

Return Codes and Causes for the PlaceBees Function

| return code | cause |
|---|---|
| 1 | executable memory allocation and configuration unsuccessful |
| 2 | bee-placement optimizer malfunction |

4.3.4 beemaker.c

A beemaker.c file 260 (see FIG. 3) contains four functions which are available to the DBMS.

int CreateAndGenerateRelationAndTupleBee(const RelationDefinition relation_definition)

This function is invoked during the execution of a CREATE TABLE DDL statement. CreateAndGenerateRelationAndBee uses the specified relation schema to create the corresponding relation and tuple bee source code. This function invokes the compiler to compile the produced source code.

This function takes one input parameter namely relation definition, which was discussed earlier. The DBMS code must first initialize this data structure from information contained in the relation schema, using the mapping previously discussed, for DBMS attribute-types.

This function stitches together code snippets based on the types of attributes into a relation or tuple proto-bee. In complex cases, this code-construction mechanism may need to be provided by the DBMS developers in the form of source-code translation. Potentially, there might be multiple kinds of bees that require source-code creation at runtime. The corresponding bee-code creation function needs to be implemented for each kind of bee. These implemented functions should be organized as function pointers such that the HRE can invoke the proper function according to the kind of bee being created.

This function returns 0 upon success or an return code if an error occurs. Table 4.4 lists the return codes and causes associated with the CreateAndGenerateRelationAndBee function.

This function also needs to retain the mapping from relation to relation_id in stable storage.

TABLE 4.4

Return Codes and Causes for the CreateAndGenerateRelationAndBee Function

| return code | cause |
|---|---|
| 1 | data type not supported by HRE |
| 2 | writing source code to file unsuccessful |
| 3 | compiling source code unsuccessful |
| 4 | extracting bee code from compiled object code unsuccessful |
| 5 | relation_definition is invalid | int InstantiateRelationOrTupleBee(int relation_id, unsigned long* placeholder_list)

This function is invoked after a relation bee is generated at schema-definition time or a tuple bee is generated during modification. The first parameter relation_id indicates the relation with which the instantiated relation or tuple bee is associated. As shown in Listing 3, the relation_id is also utilized to invoke a particular bee. The second parameter, namely placeholder_list, represents a list of values to be inserted to replace the placeholders in the bee code, as discussed in Section 3.3. This information is known at the time the DBMS source code is modified to add this call.

This function returns 0 upon success or an return code if an error occurs. Table 4.5 provides the return codes and causes associated with the InstantiateRelationOrTupleBee function.

TABLE 4.5

Return Codes and Causes for the InstantiateRelationOrTupleBee Function

| return code | cause |
|---|---|
| 1 | relation_id is invalid |
| 2 | allocating memory for instantiated bee unsuccessful | int InstantiateQueryBee(int protobee_id, unsigned long* placeholder_list, long* call_addresses, int cost_estimate)

This function is invoked by the functions that perform initialization tasks for each plan node.

The function instantiates a bee that is associated with the involved plan node. InstantiateQueryBee takes four parameters as input. The first is the ID of the proto-bee corresponding to a particular query-plan node. These IDs are assigned when the query proto-bees are generated. The second parameter represents a list of values to be inserted to replace the placeholders in the instantiated bee. The call_addresses parameter provides the addresses of the bees that will be invoked from within this current bee. This array of addresses also includes the auxiliary functions, such as standard C library functions, which are only known after the DBMS is compiled; hence the instantiated query bees can directly invoke these functions without invoking a linker to link the bee code and the library code at runtime. (See the discussion on invoking query bees in Section 6.4.) The cost_estimate parameter represents the value of the cost-model estimate of the plan node whose bee is being instantiated. Specifically, the higher this value is, the more frequently the DBMS functions associated with this plan node will be executed. This parameter provides runtime execution-frequencies of the DBMS code and thus will be utilized by the bee-placement optimizer to determine an optimal cache placement for the instantiated bees.

This function returns 0 upon success or a return code if an error occurs. Table 4.6 provides the return codes and causes associated with the InstantiateQueryBee function.

TABLE 4.6

Return Codes and Causes for the InstantiateQueryBee Function

| return code | cause |
|---|---|
| 1 | protobee_id is invalid |
| 2 | reading the associated proto-bee unsuccessful |
| 3 | allocating memory for instantiated bee unsuccessful |
| 4 | adding instantiated bee for placement unsuccessful |
| 5 | negative cost_estimate |

4.3.5 beecollector.c
int GarbageCollectRelationAndTupleBees(int relation_id)

A beecollector.c function 262 (see FIG. 3) performs garbage collection of relation and tuple bees that are no longer needed due to relation deletion. Specifically, the affected relation bee will be removed from both in-memory and on-disk bee caches. A call to the GarbageCollectRelationAndTupleBees function is triggered by a DROP TABLE DDL statement.

This function takes a relation_id as parameter, which identifies the relation that is dropped. GarbageCollectRelationAndTupleBeesreturns 0 upon success or an return code if an error occurs. Table 4.7 provides the return codes and causes associated with this function.

TABLE 4.7

Return Codes and Causes for the GarbageCollectRelationAndTupleBees Function

| return code | causes |
|---|---|
| 1 | relation_id is invalid |
| 2 | relation bee and tuple bee(s) that are associated with the relation_id do not exist |
| 3 | memory reclamation for removed bees unsuccessful |

Section 5: Relation and Tuple Bees in Depth

As introduced in the previous section, relation bees and tuple bees are associated with particular schemas and values stored within the relations, respectively. In addition, a relation/tuple bee routine namely GCL has been examined which is specialized based on the attribute-value extraction function in PostgreSQL. The focus is now shifted to discuss how relation and tuple bees are engineered and utilized during query evaluation. Given that relation and tuple bees share certain commonalities during query evaluation (discussed shortly), while tuple bees provide more interesting design insights, the discussion focuses solely on tuple bees.

5.1 Executing a Query with Relation and Tuple Bees

Figure 5:
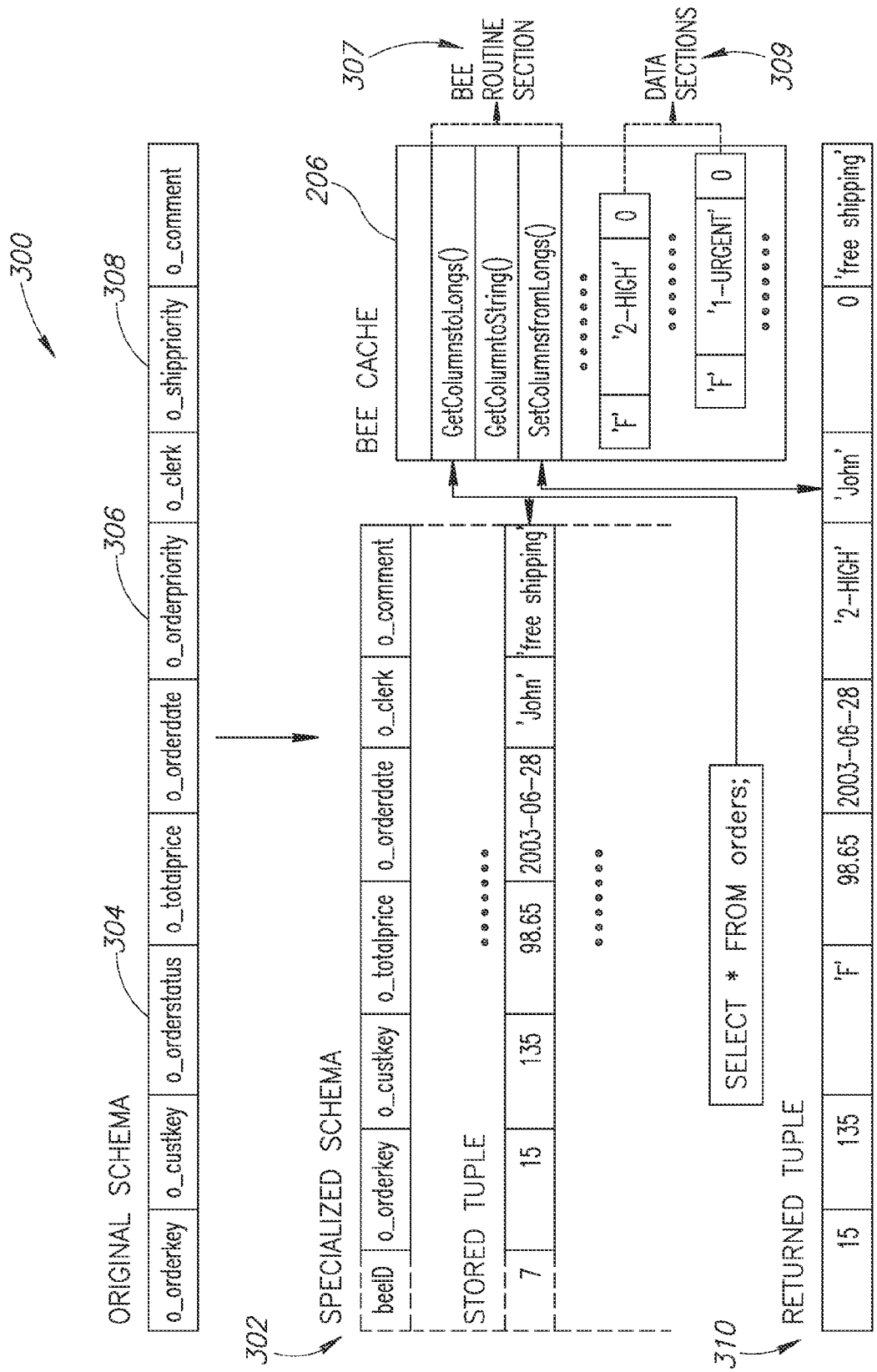
FIG. 5 illustrates the role of relation and tuple bees in evaluating a query.

An example is illustrated in FIG. 5 to provide an understanding of the specialized role of a tuple bee in evaluating this following simple query.

SELECT * FROM Orders;

FIG. 5 presents a conversion from an original relational schema 300 and a corresponding specialized schema 302 with the presence of tuple bees. This conversion is shown by an arrow from the "Original schema" 300 to the "Specialized schema" 302. The "Bee cache" 206 (see FIG. 2) depicts a storage space in memory at runtime, where all the associated tuple bees for this relation are located. When the specified query is evaluated, the tuple bees in the bee cache 206 will be invoked. To return a particular tuple, shown as a "Returned tuple" 310, the corresponding tuple bee fetches from the relation (abiding the specialized schema 302) related attribute values and constructs the returned tuple 310 with these values and the specialized values stored within the tuple bee.

In FIG. 5, the "Original schema" 300 is from the orders relation in the TPC-H benchmark. Three attributes in this schema 300, namely o_orderstatus 304, o_orderpriority 306, and o_shippriority 308, have limited discrete value domains. These values are thus specialized and stored within the tuple bees. A detailed discussion is provided in Section 5.3 on how to choose attribute(s) for specialization. After specialization, the relation no longer contains these three attributes, as indicated by the "Specialized schema" 302. Instead, the values of these attributes are stored in the "Data sections" inside the "Bee Cache" 206. Conceptually, each bee consists of a routine section 307 and a data section 309. Note that in this example, the tuple bees and the relation bee for the orders relation share the same set of bee routines, that is the GCL and SCL routines, discussed in the case study in Section 3. Hence at runtime, only the tuple bees will be invoked. On the other hand, if a relation does not contain any specialized attributes, hence there are no tuple-specific data to be stored in tuple bees, the relation and tuple bee for this particular relation are one and the same.

In this example, the routine section 307 is shared by all the tuple bees for the orders relation (See the associated technical details in Section 4.2.1); each data section 309 is referenced via a beeID. A beeID is a virtual attribute that is stored in the tuple header (indicated by the dotted box in the "Stored data"). The beeID is one byte long and can hence be carefully engineered to be hidden in the tuple header so that no additional storage space is needed. Being one byte beeID limits the maximally allowed number of tuple bees to 256. Note that each relation allows up to 256 distinct tuple bees. It has been found that 256 is a sufficient number for all the relations in the TPC-H benchmark. A small number of bees reduces the overall storage requirement for storing the bees.

When the above given query is being evaluated, a relation scan operation is first performed (assuming the absence of index) to locate the "Stored tuple." In this example, say, the first tuple is associated with a beeID 7. When this tuple is fetched from the relation, this beeID is forwarded along with the "Stored tuple" to the GCL routine. This routine locates the seventh data section using beeID 7 and fetches the hardcoded values. This routine also computes the offsets and extracts the values for the non-hardcoded attributes, without looking up the catalogs. Finally, routine GCL assembles an array, of which the type is internally defined by the host DBMS, and puts the hardcoded values as well as the values extracted from the input tuple into their corresponding slots in this array. This array is then passed to routine GetColumnToString to be converted to the "Returned tuple," in which the hardcoded values are highlighted.

Note that even with tuple bees involved, query evaluation is still done in the same way as the traditional approach. This means there is no need to change the architecture of any part of the DBMS, nor is there a need to alter the query language to suit micro-specialization.

A tuple bee is so effective because it can exploit specifics of a particular tuple, such as whether it has attribute(s) with null value(s), the type of each attribute, the number of attributes, and the location of the value of each attribute within the tuple.

The process of replacing generic code in the DBMS with specialized code that is tailored to invariants present in schema or even in tuples is analogous to a compiler optimization that uses knowledge about the value of a variable to render more specialized, and thus more efficient, code [2, 10]. Micro-specialization allows highly aggressive specialization and constant-folding by associating bees with run-time invariants.

5.2 Creating Relation Bees

The creation of the source code a particular relation bee is discussed above in Section 2. Here a more general discussion is presented on how to convert generic code blocks into specialized code snippets, which are utilized to create the bee source-code.

In Listing 1 above, the code block from line 20 to 41 is specialized according to the type of an attribute and converted into an assignment statement, such as on line 6, in Listing 2. Note that this conversion is performed in two steps for this particular example. In the first step, the code block from line 20 to line 36 in Listing 1, which essentially examines whether the offset of the current attribute has been cached and computes the offset otherwise, is converted to an actual value that corresponds to the offset of the current attribute in the specialized code, as shown by the +4 on line 6, in Listing 2. In the second step, the code statement on line 37 in Listing 1, which fetches the attribute value from a tuple, is converted into the attribute_type-specific code snippet. In this case, the four-byte integer attribute is fetched by the int*cast statement on line 6 in Listing 2.

In this particular case study, the multiple steps in converting generic code blocks into specialized code snippets are merged with manual analysis of the logic and structure of the source code, to minimize the size of the resulting code complexity and also maximize the performance of the executable code that will be generated. However, in a more general case, especially when the conversions are performed in a more systematic fashion, manual analysis might not be present. Instead, source-code translation mechanisms can be employed to transform the original code to generate the specialized snippets, as discussed in Section 4.3.4. Optimizations can then be applied to the mapped code snippets as a separate step.

5.3 Creating Tuple Bees

In the case study described in Section 2, we utilized the orders relation to present an attribute_type-specific bee routine installation. Note that in this relation, we discovered that the o_orderstatus, o_orderpriority, and o_shippriority attributes all have a small domain of distinct values, hence allowing tuple bees to be applied. To facilitate the application of tuple bees, we annotate the DDL statements for creating the orders relation with a syntax extension, as shown by the CARDINALITY keyword utilized in Listing 6.

Listing 6 SQL DDL Syntax Extension to Enable Tuple Bees

```
CREATE TABLE orders (
    o_orderkey INTEGER NOT NULL,
    o_custkey INTEGER NOT NULL,
    o_orderstatus CHAR(1) CARDINALITY 3 NOT NULL,
    o_totalprice DECIMAL(15,2) NOT NULL,
    o_orderdate DATE NOT NULL,
    o_orderpriority CHAR(15) CARDINALITY 5 NOT NULL,
    o_clerk CHAR(15) NOT NULL,
    o_shippriority INTEGER CARDINALITY 1 NOT NULL,
    o_comment VARCHAR(79) NOT NULL);
```

The usage of CARDINALITY is termed an "annotation." The effect of such an annotation is that it specifies the domain size, i.e., the number of all the distinct values of the annotated attribute. In the above example, the domain sizes of attributes o_orderstatus, o_orderpriority, and o_shippriority are three, five, and one, respectively. The set of annotated attributes are considered candidates for attribute_specialization. In our current implementation, we support INT, CHAR, and VARCHAR types for specialization.

Annotations are used in the creation of tuple bees, to specify the attributes, such as "gender," that have small cardinalities Annotations can be specified explicitly by the DBA or can be inferred (such as from SQL domains). The remaining component of the bee configuration group is bee reconstruction, triggered by changes in the schema of a relation.

The current implementation uses a greedy algorithm to perform automated attribute_specialization based on the domain_cardinalities of the candidate attributes. To decide which attribute(s) to specialize, the algorithm (see Algorithm 1) first sorts the candidate attributes by their specified cardinalities in ascending order. The counter prod_card is used to keep track of the product of the cardinalities of the selected attributes, when iterating through the sorted candidate list. When the value of prod_card reaches max_num_bees, which is the maximally supported number of bees, the algorithm terminates and produces the final selected set of attribute(s) into result, to be specialized. This algorithm maximizes the number of attributes for specialization, because attribute_specialization is able to achieve both I/O and CPU efficiency simultaneously. A detailed benefit analyses of attribute_specialization is presented in Section 8. While sufficient, the utilized algorithm should be extended to take into account various other factors, such as attribute_type and size, rather than merely considering an attribute's domain size.

The data structure of the system catalogs in PostgreSQL were modified by adding a flag which specifies whether an attribute is specialized. This flag is referenced when bees are created, to determine which attribute(s) need code snippets for handling specialized attribute-values. Discussion is provided in the next section on a SQL DDL syntax-extension, which declaratively manipulates the configurations of the attributes to be specialized.

---
Algorithm 1 Attribute Selection for Specialization
---
SelectAttributesToSpecialize(candidate attributes,
                            max__num__bees):
  prod__card ←
  result ← Nil
  Sort(candidate attributes) /* on cardinality */
  for i = 1 to |candidate__attributes| do
    prod__card ←
      prod__card __ candidate__attributes[i]:cardinality
    if prod__card > max__num__bees then
      break
    end if
      result ← result ∪ candidate attributes[i]
  end for
  return result

---

In addition to the values of the attributes, the offsets of the attributes within a tuple, especially those attributes located after variable-length attributes, can be utilized as invariants on which to apply micro-specialization. Specifically, if a variable-length attribute appears before other attributes, the offsets for those attributes that come after the variable-length attribute depend on the length of the actual value of this attribute for each individual tuple. Nevertheless, if the variable-length attribute has a maximum length of 128 bytes by definition, there are a maximum of 128 possible offsets for the rest of the attributes. If more variable-length attributes are present, the total number of possibilities of offsets for the attributes located after the variable-length attributes is the product of the length of all the preceding variable-length attributes. Such specialization can further reduce the code size of the resulting tuple bees and improve their efficiency. However, the total number of required tuple bees can grow rapidly. Moreover, comparing attribute-value specialization and offset specialization, the former not only improves CPU time, but also reduces I/O overhead by eliminating the specialized attributes from the relations. Hence attribute-value specialization should be considered prior to offset specialization.

Other specialization opportunities for tuples include whether particular tuples require encryption, or which kind of encryption is employed, or whether some or all the attributes are compressed.

The number of maximally allowed tuple bees per relation were limited to 256 based on engineering considerations. Nonetheless, many kinds of values can be utilized to apply micro-specialization on. In general, the number of possible bees is determined by the occurrences of such variables that are runtime invariant. One challenge in applying micro-specialization is to identify these invariants. A discussion on how to systematically identify such runtime invariants is provided in Section 9.

5.4 Instantiating a Tuple Bee

As discussed in Section 3.2, many tuples can share the same tuple bee. Moreover, all the tuples can in fact share the same relation bee routines such as GCL. The difference among various tuple bees is the data values. A clustered storage is created for all the distinct data values. This storage area is termed the "data section." Each data section, containing a few attribute values, is small. When data sections are frequently created during, for instance bulk-loading, the overhead of invoking memory allocation can be expensive. A slab-allocation [1] technique is applied to handle memory allocation ahead of data section creation. In the present implementation, when the bee routines are created, three memory pages are allocated to store the bee cache, in which the bee routines are sequentially stored. Data sections are then created and stored after the routine section when a new tuple bee is generated. To decide whether a new tuple be is needed, the values of the attributes that are specialized will be examined against all the existing data sections in a sequential manner. Such sequential checking is of low efficiency. Nonetheless, given that a maximal of 256 tuple bees are allowed for each relation due to the design of the beeID, examining all the existing data sections is not a significant overhead. A summary of the sizes of the bee cache for the TPC-H benchmark is provided in Section 8.1.5. As more data sections are being created, if the size of the bee cache exceeds 8 KB (two pages), a new page is allocated. Again, due to the small size of the data sections and the low number of tuple bees in total, only two memory pages are sufficient to hold all the bees for each relation in the TPC-H benchmark, hence the additional memory allocation is not needed. To quantify the tuple-bee creation overhead, detailed execution-profile analysis is provided in Section 8.1.5.

To access the data section so that the tuple bees can respond with proper values to queries for particular tuples, the relation bee routines are modified to have "holes" for the specialized attributes, as shown in Listing 2, lines 7, 19, and 26. The bee_id argument is used to identify which data section a tuple bee is associated with. Therefore, it is necessary to store a beeID along with each tuple. Given that the tuple header implemented in PostgreSQL has a one-byte free space, the beeID can be hidden in the header of each tuple, thus incurring no additional space requirement at all. The beeID is sufficient in that only the attributes with limited value domain should be specialized. Based on the inventors' experience with the TPC-H benchmark, the largest number of tuple bees needed by a relation is 28 among the eight relations. The magic numbers 1000, 1001, and 1002 shown in Listing 2 are used as identifying placeholders such that the correct data section addresses can be instantiated for a particular tuple bee.

5.5 Costs and Benefits of Relation and Tuple Bees

Relation and tuple bees are created and generated when relations are defined. Though the overhead of invoking the compiler is introduced at DBMS runtime, relation creation is an interactive task performed by DBMS users. Therefore, the relation creation is not considered as a performance-critical task and the compilation overhead of generating relation and tuple bees can be tolerated.

Relation and tuple bees are invoked at query-evaluation time directly by the DBMS, hence no additional overhead for managing such bees is introduced at query-evaluation time. Regarding tuple bees, their instantiation occurs at modification time, such as bulk-loading, as discussed earlier. Over a large relation, the overhead of tuple-bee instantiation can in fact be compensated by both CPU and I/O savings realized by tuple bees. Nevertheless, for a relation containing just a few tuples, the overhead of instantiating tuple bees can exceed the savings. But in bulk-loading a small relation with a few tuples, the execution time will not be significant in the first place. The overhead of instantiating tuple bees is therefore negligible.

Section 6: Query Bees in Depth

The principle of applying micro-specialization is similar across relation bees, tuple bees, and query bees, which is to first identify runtime invariants within the query evaluation loop and then eliminate the unnecessary references to these invariants. However, due to the differences in the types and origins of the invariants, query bees are applied in a distinct manner to relation and tuple bees. To illustrate in detail the mechanism of applying query bees, another case study of query14 from the TPC-H benchmark is provided as an example, shown in Listing 7.

| Listing 7 Query14 from the TPC-H Benchmark (with Modification) |
| --- |
| SELECT l_extendedprice * (1 − l_discount)<br>FROM lineitem, part<br>WHERE l_partkey = p_partkey<br>AND l_shipdate >= date '1995-04-01'<br>AND l_shipdate <<br>date '1995-04-01' + interval '1' month |

Figure 6:
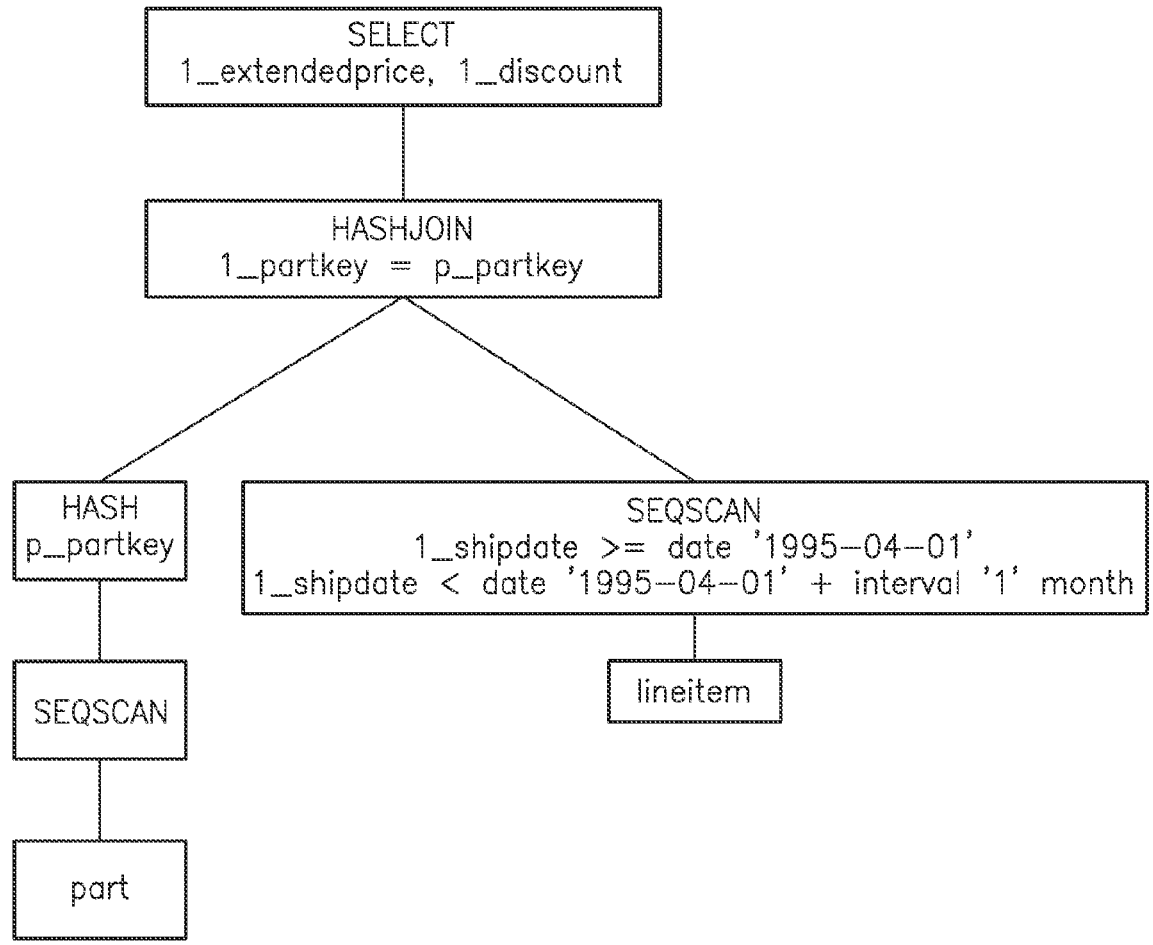
FIG. 6 illustrates a query plan produced by PostgreSQL for the example query.

The original query14 contains a complex SELECT clause containing aggregations. Given that micro-specialization with aggregation functions as not yet been investigated, the SELECT statement is converted into a simple attribute projection. A graphical query plan 312 is presented in FIG. 6. As shown by the plan 312, the inner relation part is hashed into memory first. For each tuple fetched from the outer relation lineitem that satisfies the given predicates, hashjoin is performed against the inner hash table. If the join keys from both the inner and outer tuples match, the projected attributes are returned by the SELECT statement.

In applying query bees for this query, each plan operator requires a particular query bee that specializes that operator. For instance, a scan contains several runtime invariants, which include the scan direction and the presence of scan keys. Micro-specialization is applied on these values to produce multiple versions of the specialized scan operator (function), with each version handling a particular direction as well as the existence (or non-existence) of scan keys. Similarly, micro-specialization is applied across this query plan to produce specialized code for each operator.

This query was run in both a stock PostgreSQL and a bee-enabled PostgreSQL. When running the query, it was ensured that the query plans generated by both DBMSes were identical. The running time (with a warm cache) was 1220 milliseconds for the former PostgreSQL and 961 milliseconds for the latter DBMS, respectively. The performance was improved by 21%.

6.1 Kinds of Query Bees: A Case Study

The details of how micro-specialization is applied on each plan operator for this query is now discussed.

6.1.1 Scan Query Bee

As mentioned earlier, the generic implementation of the relation scan operator relies on branching statements to handle multiple possible cases. First, the direction of the scan, including forward, backward, and no movement, requires three code branches. Second, when a relation scan is executed, a scan key is present when there is a predicate that is associated with one of the attributes in the scanned relation. Hence two code branches are needed. Moreover, depending on whether a relation is empty, two code branches are implemented such that when the relation is empty, a direct return statement will be executed.

During the evaluation of an individual query, it was found that the execution path is always unique. This means that these variables that are included in the branching statements are in fact invariants. For instance, the direction of a scan operation is not changed during the execution of a query; also, the presence of predicates determines whether the relevant scan-key processing is ever needed. In general, only a small portion of the generic code in the relation scan operator is executed for every query.

Based on these observations, all the scan query proto-bees were constructed, each corresponding to a particular case. Given the number of code branches for each variable discussed earlier, a total of 12 (3×2×2) versions of the proto-bees are needed. Note that when a relation is empty, there is no need to handle the scan direction and scan keys. This indicates that the total number of required proto-bee versions is seven, which includes six proto-bees for handling non-empty relations and one proto-bee for empty relations.

Removing these superfluous branching statements and the code branches themselves simultaneously decreases the code size and improves the execution efficiency of the code.

6.1.2 Hash Query Bee

When a hash operator is executed, it first extracts a physical tuple from the child plan node under this hash operator. Depending on the type of child plan node, this tuple can be directly fetched from a scan operator, returned as an inner tuple, or returned as an outer tuple. Concerning a specific hash operator in a query plan, the kind of its child plan node and hence the source of the associated tuples are invariants during the evaluation of the query. Furthermore, the number of attributes to be hashed from each tuple is also a constant which can be incorporated into the query plan.

The tuple fetching code in the hash operator utilizes a switch statement to direct the tuples to be retrieved from the correct source. The switch statement was eliminated and three distinct versions of the hash query proto-bee were constructed.

Another specialization opportunity resides in hash computation. Hashing various types of values demands various computation algorithms. For instance, hashing a string and hashing an integer number requires different approaches. An optimization already present in PostgreSQL for type-specific operations is to utilize function pointers. A function that performs string hashing can be associated with a hash operator in the form of a pointer during query plan generation. This approach eliminates the necessity of a rather inefficient switch statement that directs the execution to the appropriate code branch at runtime. Nevertheless, a function pointer can only be invoked by indirect function calls, which can become a significant overhead when accumulated in the query evaluation loop.

Instead of utilizing function pointers, each such indirect invocation statement was converted into a direct CALL instruction with a dummy target address associated. The dummy addresses are unique integer numbers that can be easily identified from the object code. At runtime, these magic numbers were substituted with the actual addresses of the functions. Indirect calls were therefore replaced with direct function calls during bee instantiation, which turns proto-bees into final executable bees.

6.1.3 Hashjoin Query Bee

For a hashjoin operator, many scenarios need to be handled in the generic implementation. First, various types of joins, such as left-join, semi-join, and anti join take different execution paths at runtime. Second, a hash join operator takes two tuples from the inner sub-plan and the outer sub-plan nodes, respectively. Each such node may require a different routine to fetch the associated tuples. For instance, an outer sub-plan can be either a hash operator or a scan operator. The type of sub-plan node is identified by a variable named type provided by the PlanState data structure in PostgreSQL. A dispatcher, which is essentially a complex switch statement, recognizes the sub-plan node and invokes the corresponding tuple fetching function. Furthermore, join-key comparison is another type-specific computation that involves the invocation of function pointers.

The type of join is determined by the query plan; the kinds of both inner and outer sub-plans are also invariants once the query plan is computed. Given that PostgreSQL defines eight types of joins, eight versions of the hashjoin query proto-bee were constructed. The dispatchers were eliminated by again utilizing magic numbers which will be replaced by the addresses of the proper tuple-processing functions at runtime. Finally, the invocations of the join-key comparison functions were converted into direct function calls. The resulting join-evaluation query-bee routine is termed "EvaluateJoin" (EVJ).

6.1.4 Predicate Query Bee

A predicate evaluation is similar to the join key comparison in that a predicate also involves type-specific comparison. The same technique is thus applied to produce the predicate query proto-bee with the comparison function's address as a placeholder. In addition, it was found that a dispatcher is utilized to extract the constant operand, such as '1995-04-01', in the predicates each time a tuple is fetched from the lineitem relation. Instead of extracting this value every time, each predicate query bee is tailored to be specific to a single predicate operand by removing the value fetching code. Instead, for each predicate query bee, we substitute in the object code another magic number that represents the operand with the actual value. This new magic number is specified in the source code of the predicate query proto-bee as one of the input arguments to the predicate comparison function. The resulting code is effectively equivalent to that in which the value had been hardcoded in the predicate-evaluation code. The predicate-evaluation query-bee routine is termed "EvaluatePredicate" (EVP).

6.1.5 Other Opportunities for Query Bees

Identifying query bees requires finding the runtime invariants that are present during the evaluation of queries. Such invariants are usually located within data structures. In fact, all the invariants on which micro-specialization is applied in the form of query bees discussed so far reside in the internal data structures implemented in PostgreSQL. Over 70 such data structures were found within PostgreSQL. Each of these data structures is utilized by one or many particular query-plan operators. Query bees can essentially be created on all these data structures to maximize the performance improvement of micro-specialization across a wide variety of queries.

6.2 Creating and Generating Query Bees

The opportunities for applying micro-specialization to query plan operators were introduced in Section 6.1. Here, a focus on the specific mechanisms associated with installing query bees is provided.

If an invariant appears in a control construct and if this invariant is known to be associated with just a few values, such branching statements and the associated branches can be removed from the specialized code.

Recall that in Section 3.4, for a query bee, such as a join-operator query bee, the code branches corresponding to the various join types are pre-compiled into proto-bees, such that at query evaluation time, no source-code compilation is required.

Three join algorithms are usually adopted in DBMSes, including nested-loop join, sort-merge join, and hash join. In PostgreSQL, the join type is a common invariant across all three kinds of joins. The type includes inner join, outer join, semi join, and anti join. The difference among these types of joins, in terms of implementation, is that each type relies on a distinct code path to deal with various matching requirements. For instance, to handle anti joins and semi joins (the former results in all tuples in the outer relation that have no matching tuples from the inner relation; the latter results in all tuples in the outer relation, with each tuple having a matched tuple from the inner relation), PostgreSQL utilizes the implementation (snippet) presented in Listing 8.

Listing 8 The Code Snippet of a
Join Function with Handling of Semi- and Anti-Joins

```
...
for (;;) {
    ...
    if (node->js.jointype == JOIN_ANTI) {
        node->hj_NeedNewOuter = true;
        break;
    }
    if (node->js.jointype == JOIN_SEMI)
        node->hj_NeedNewOuter = true;
    ...
}
...
```

The evaluations of the js.jointype variable and the associated branches that do not correspond to the currently involved type of join can be eliminated via constant folding when the kind of join is known in the query plan. Similarly, two other such invariant variables utilized in the join algorithms, which are the presence of the join quals, which are qualification conditions that come from JOIN/ON or JOIN/USING, and the presence of other quals, which are implicitly-ANDed qualification conditions that come from the WHERE clause. Both presence flags, each allowing two distinct values (0 and 1), are utilized for applying micro-specialization on. Consequently, each join algorithm requires 16 distinct proto-bees (as introduced in Section 6.1), each corresponding to a single possible combination of the values of these invariants. Instead of creating sixteen versions of source code for the proto-bees, a generic version of the proto-bees' source code (for each join algorithm) is compiled, as shown in Listing 9, with sixteen value combinations by utilizing the –D option when invoking the compiler. Note that as an example, if the code shown in Listing 9 is compiled with option –D JOINTYPE=JOIN-_ANTI, the if statement on line four will be eliminated. Moreover, the if statement along with its associated branch, shown on line eight and nine, will also be eliminated. Essentially, the –D option enables the compiler to eliminate unnecessary condition checking and the associated basic blocks, resulting in highly-optimized proto-bees. The proto-bees are stored consecutively in the bee cache. To locate a particular proto-bee, the values for the invariants are utilized, which for each proto-bee, there is a unique combination of the values, as indices. For instance, if a join is of type JOIN_ANTI, which is represented internally by a value 3, and if this join contains join quals, indicated by a value 1, but no other quals, indicated by 0, the index for this particular join is 14, which is calculated by 3×4+1×2+0×2. Note that 4 is the number of possible join types. Likewise, the 2's represent the numbers of possible cases for the presence of join quals and other quals, respectively.

Listing 9 The Source Code Snippet of a Join Bee Routine with Handling of Semi- and Anti-Joins

```
1   ...
2   for (;;) {
3       ...
4       if (JOINTYPE == JOIN_ANTI) {
5           node->hj_NeedNewOuter = true;
6           break;
7       }
8       if (JOINTYPE == JOIN_SEMI)
9           node->hj_NeedNewOuter = true;
10      ...
11  }
12  ...
```

Compilation bees were introduced in Section 3.2. Such bees, which include essentially type-specific comparison functions, are invoked at runtime by query bees via direct function calls. In fact, compilation bees can be incorporated into query bees by inlining the object code of compilation bees Inlining compilation bees eliminates the overhead of function calls, which can further improve the efficiency of query bees.

6.3 Evaluating Queries with Query Bees

So far many places (operators) have been seen where micro-specialization is applicable. The mechanism of instantiating and then combining several query bees to perform a particular query evaluation is now discussed.

During query evaluation, once a query plan is determined, all its nodes will be invariant for the query evaluation. Query bees are instantiated based on the selected proto-bees. A query bee is instantiated simply by first selecting the correct version of the proto-bee and loading the proto-bee into an executable memory region. All the versions of each proto-bee are stored in a pointer array, with each pointer referencing the start address of each version of the proto-bee code. To select the proper hashjoin proto-bee, the join type is utilized, which is an integer value ranging from 0 to 7 to index the corresponding versions.

The next step of instantiation requires object-code manipulation. Take the hashjoin operator presented in FIG. 6 as an example. Once the proto-bee is selected, the magic numbers, as mentioned earlier, will be replaced with the correct addresses of the target functions. An actual query bee is thus instantiated. The instantiation step is in fact very similar to dynamic linking. If a particular operator, such as a hashjoin operator, appears multiple times in a query plan, the hashjoin proto-bee needs to be instantiated several times, with each resulting bee associated with a distinct plan node.

The resulting query bees are stitched together to form the executable code for a query plan. The conventional implementation relies on a complex dispatcher to locate and invoke the proper plan operators in evaluating the entire query plan. Instead, the constructed plan operator-specific query bees are stitched together again by instantiating the bees with their desired child query-bees. An example of a snippet of a query bee's source code is provided to help explain this stitching mechanism, as the following.

```
((FunctionCallInfo)predicate->xprstate.join_info->
    fcinfo_evj)->arg[OUTERARGNUM] =
        ((Datum(*)(TupleTableSlot*, int, bool*))0x440044)(
            econtext->ecxt_outertuple,
            0x101,
            &((FunctionCallInfo)predicate->xprstate.join_info->
                fcinfo_evj)->argnull[OUTERARGNUM]);
```

Note that this particular function-invocation statement (to the dummy address 0x440044) will actually invoke the query bee that corresponds to a child-plan node, which fetches a tuple from the outer sub-plan. At runtime, the magic number 0x440044 will be substituted with the actual child bee's address.

Given that the instantiation of all the query bees require just a few memory copies and several in-place memory updates, query bee instantiation is thus very efficient and incurs minimal overhead.

6.4 Invoking Query Bees

In Listing 10, a code snippet taken from the ExecEvalOperfunction is presented, which invokes a query bee. During query evaluation, this particular function is called once to initialize the required information for executing an plan operator. This function in particular initializes the evalfunc field in the fcache->xprstate struct, shown on line 7. The function address passed to the evalfunc field will then be invoked by subsequent calls on a per-tuple basis. This function is called for processing the first tuple on line 12, returning the value computed by the actual evaluator function.

Listing 10 Invoking a Query Bee

```
1   static Datum ExecEvalOper(FuncExprState *fcache,
2                             ExprContext *econtext,
3                             bool *isNull,
4                             ExprDoneCond *isDone) {
5       ...
6       if (IS_EVPROUTINE_ENABLED &&
            fcache->xprstate.predicate_info) {
7           fcache->xprstate.evalfunc =
8               fcache->xprstate.predicate_info->query_bee->
9                   evaluate_predicate_routine;
10          return ((unsigned long(*)(
11              FuncExprState*, ExprContext*,
12              bool*, ExprDoneCond*))fcache->xprstate.evalfunc)(
13                  fcache, econtext, isNull, isDone);
14      }
15      ...
16  }
```

The evaluator function is substituted with a query bee, as shown by line 8. In this example, the query bee is for evaluating a particular predicate. At query-preparation stage, the instantiated query bee's address is stored in the query plan-associated data structure, that of xprstate, such that each query-plan node can be substituted by a specific query bee, if present. Note that it is ensured that the bee routine has the same function-call signature as the stock function invocation to minimize the changes to the original DBMS code.

6.5 Hot-Swapping Bees

To this point, the focus has been on applying micro-specialization on invariants: a variable that takes on a constant value during query evaluation. The discussion is now generalized to variables that each take on a deterministic set of values during query evaluation.

As an example, let's examine the scan operator, in particular, the two code branches shown in Listing 11. The rs_inited variable indicates whether the scan operator has been initialized. In other words, the variable represents if the current tuple is the first one being fetched from the scanned relation within a query. This variable is then assigned to true for the rest of the query. By definition, this variable is strictly not an invariant. Nonetheless, due to the fact that this variable is known to be a constant right after the first tuple is fetched, evaluating the condition statement is redundant for the rest of the tuples.

Listing 11 Two Branches in the Relation Scan Operator

```
if (!scan->rs_inited) {
    ...
    scan->rs_inited = true;
} else {
    ...
}
```

Hence, two additional versions of the scan query proto-bees are produced. The first version contains the first code branch in the above code and the second version contains code from the other code branch. Given that there are already six versions of the scan query proto-bee for handling non-empty relations, a total of 13 (6×2+1, including the version that handles empty relations) versions are now needed.

Figure 7:
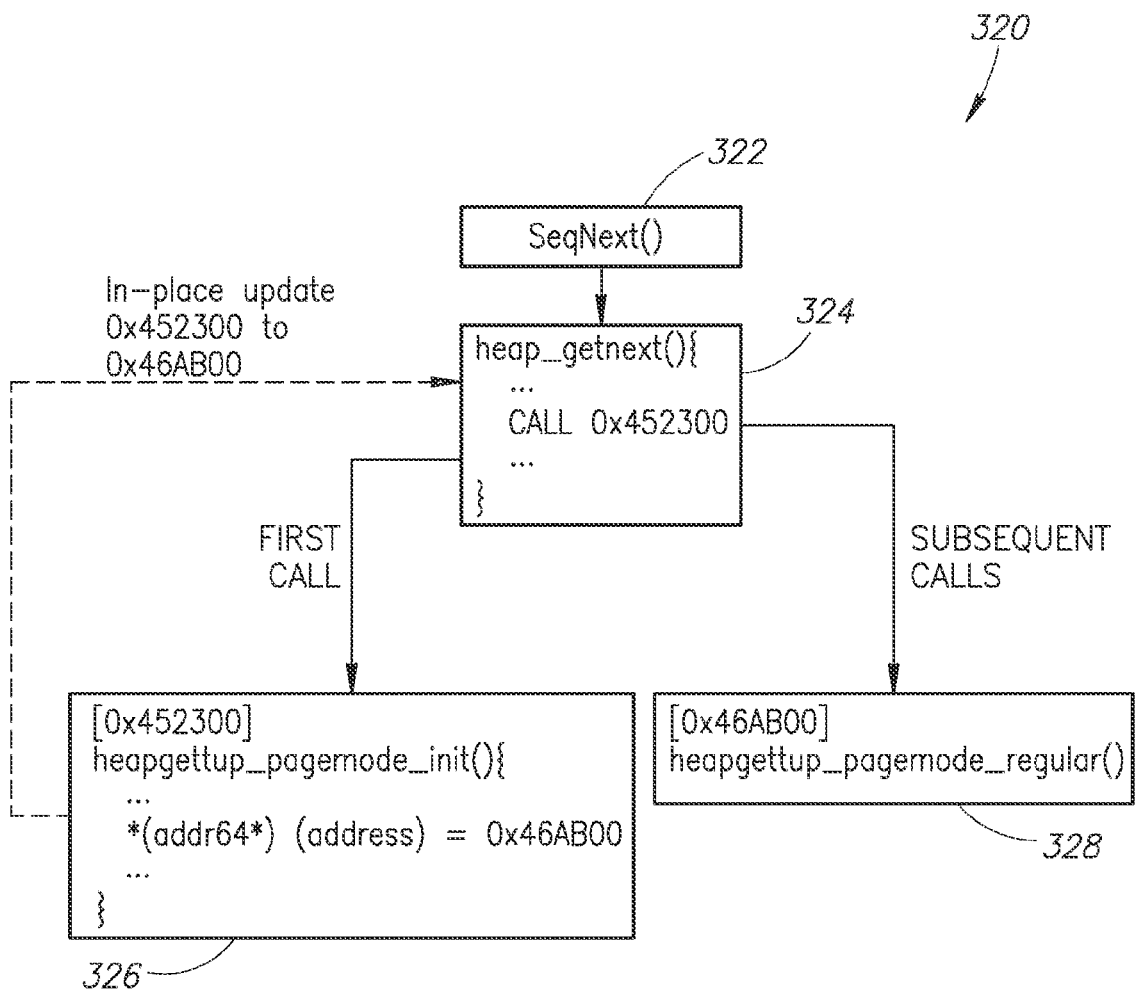
FIG. 7 is an illustration of object code hot-swapping.

Unlike the other bees whose object code is fixed after instantiation, an instantiated scan query bee is subject to self-modification. Such mechanism is illustrated with a call graph 320 shown in FIG. 7. In this figure, bees 324, 326, and 328 are represented as rectangles. In the stock implementation, the function SeqNext 322 calls function heap_getnext 324 to fetch the next tuple in the heap file. Function heap_getnext then calls a function namely heapgettup_pagemode to retrieve the actual tuple located on the currently scanned page. If it is the first time that heap_getnext is called, some initialization needs to be done. In FIG. 7, heapgettup_pagemode_init is a bee 326 representing the specialized version of heapgettup_pagemode with just the initialization code branch included. Similarly, heapgettup_pagemode_regular contains only the other code branch. During the execution of heapgettup_pagemode_init, the object code of the heap_getnext bee 324 will be modified such that the original call to the _init version will be hot-swapped to the _regular version. Hot-swapping is simply done by an in-place update of a function call address, in this case, changing the call of the _init bee 326 to a call to the _regular bee 328. From then on, the latter bee 328 will be called. For a sequence of values, there will be multiple hot-swaps, each swapping-in a call to the next specialized version. Hot-swapping requires that the caller to the bees that are swapped-in to also be a bee, so that this caller bee can be modified. That said, the caller bee need not be an entire function, as large bees can introduce instruction cache pressure. Instead, a bee routine can be as small as just the function call statement that invokes the hot-swapping bees.

A more detailed study of the PostgreSQL source code revealed that the sort merge join operator can also benefit from such specialization. The sort merge join algorithm involves several states, each associated with a distinct code branch in a generic function. The execution of the sort merge algorithm switches among these states with each state being followed by a unique state.

Two simple rules indicating in what situation such specialization should be applied are suggested. First of all, there should only be a few distinct values associated with a variable that is used in branching statements. Second, this variable should be referenced in branching statements such that the execution-path selection is dependent on the value of this variable.

Note that in general, there is no limit to the number of query bees that can be created and generated, as just the necessary query bees will be instantiated and invoked at runtime. Hence, query-evaluation performance is not impacted by the total number of available query bees and there is no trade off in determining what query bees to create. An algorithm that is similar to Algorithm 1, which optimizes the selection of invariants for applying micro-specialization, is not required by query bees.

Dynamic object code manipulation raises a concern in a multi-threaded query execution environment: when a hot-swapping bee is invoked by multiple threads to update the object code of the bee, synchronization needs to be carefully handled. Nonetheless, as PostgreSQL employs just one process to execute each query, such consideration does not arise in our implementation. Moreover, given that each query evaluation requires a distinct instantiation of the query bees, code reentrancy is preserved even the object code is dynamically modified at runtime, because each thread will utilize its own bees.

The performance benefits of the query bees using runtime profiles collected by CALLGRIND is now examined. First of all, it is worth noticing that the overhead of invoking the compiler is not included in the performance analysis. This is because the compiler is never invoked at runtime during query evaluation. Instead, the proto-bees are compiled before query evaluation and hence at runtime, the overhead of dynamically instantiating and invoking the executable bees is trivial. The runtime profiles collected by CALLGRIND do not even include the records for instantiating bees, due to the sampling-based mechanism employed by the profiling tool.

Presented in Listing 12 and Listing 13 are excerpts of the profile output of executing the example query on the stock DBMS and the bee-enabled PostgreSQL, respectively. Note that the notation Ir represents the number of executed instructions. As shown by the profile result, the stock DBMS executed a total of 7429M instructions. The bee-enabled DBMS on the other hand executed 4940M instructions, or a reduction of 34% in the number of executed instructions.

Listing 12 Profile Result Excerpt of the Stock PostgreSQL

| Ir | function |
|---|---|
| 7,429,490,994 | Total |
| 2,603,135,278 | slot_deform_tuple |
| 944,852,915 | ExecMakeFunctionResultNoSets |
| 438,256,918 | heapgettup_pagemode |
| 8,273,670 | ExecProcNode(2) |
| 2,273,640 | ExecProcNode |

Next the instruction counts for specific functions are reviewed to explain the performance improvement. The most significant improvement is from the slot_deform_tuple function. This function transforms a physical tuple into an array of long integers. Note that this function is invoked for each tuple in both relations referenced in the query. Therefore, specializing this function achieves the most significant benefit. As Listing 13 shows, the slot_deform_tuple is highly specialized by invoking the two relation bees, represented as their in-memory locations at 0x441b3c0 and 0x442e7c0, respectively. As a result of such specialization, 20% instructions are reduced in total when the query was executed.

Listing 13 Profile Result Excerpt of the Bee-Eanbled PostgreSQL

| Ir | function |
|---|---|
| 4,940,361,293 | Total |
| 738,149,445 | 0x000000000441b3c0 (relation bee -- lineitem) |
| 362,774,120 | slot_deform_tuple |
| 300,357,772 | heapgettup_pagemode_bee |
| 294,059,535 | 0x0000000004425fc0 (predicate bee1) |
| 156,870,266 | 0x000000000442d3c0 (predicate bee2) |
| 8,000,000 | 0x000000000442e7c0 (relation bee -- part) |

The presence of the predicates provides another opportunity for applying micro-specialization. The ExecMakeFunctionResultNoSets function in the stock DBMS performs predicate evaluation. By contrast, the two predicates presented in the query were evaluated by two predicate bees, as shown in Listing 13 as their addresses in memory. The two predicate query bees alone reduced about 7% total executed instructions.

While each micro-specialization improves performance, some micro-specialization may have less significant impact. The heapgettup_pagemode function is responsible for scanning a relation. The implementation of this function was discussed in Section 6.5. In the stock implementation, this function needs to examine the direction of the scan and check the existence of predicates. As the profile result shows, by applying micro-specialization on these invariants, approximately 32% of the instructions of that function itself are reduced. The reduction of 138M instructions translates to around two percent within the total improvement. The dispatcher utilized by the stock implementation, ExecProcNode (in the profile there are two such instances) contributes a total of 11M instructions. In the bee-enabled PostgreSQL, this overhead is completely eliminated. In total, when micro-specialization applied aggressively across multiple operators, another approximately 7% of instructions were reduced by the query bees that have relatively less performance benefit.

Note that instantiating bees at runtime requires additional instructions to be executed. However, CALLGRIND was not able to collect such data, as this additional overhead is too small even to be counted.

To summarize, query bees are utilized by first identifying the invariants during the query evaluation loop. The associated proto-bees are then dynamically instantiated as the executable query bees. By applying several optimizations, such as eliminating unused code branches and turning indirect function calls into direct calls, significant performance benefits can be achieved.

6.6 Cost and Benefits of Query Bees

As discussed in Section 3.4, the creation and generation of query bees are performed when the DBMS is compiled. In other words, the overhead introduced by these two tasks is at compile time.

At runtime, the overhead of instantiating query bees is introduced. Therefore, the performance benefits achieved by invoking query bees during query evaluation is largely dependent on the size of the query, i.e., how many times each query bee is executed during the evaluation of a query. If the query is over a small relation, the overhead of instantiating all the query bees may exceed the actual performance gain that these bees can realize. Hence, a mechanism, such as a predictive model, is needed for making the choice of whether query bees should be utilized during query evaluation, based on factors such as the sizes of the queried relations and the selectivity of the predicates in the queries.

Section 7: Mitigating Cache Pressure

During the execution of a program, each instruction executed is first fetched into the CPU cache. The slot in the cache (whether the L1-cache or the L2-cache or the I-cache), where an instruction is located, namely a cache line, is determined by the instruction's address in the virtual memory space. When multiple instructions sharing the same cache line are executed, cache conflicts occur, resulting in expensive cache-miss penalties (cache-line eviction and instruction fetching from lower levels in the memory hierarchy).

For DBMSes, query evaluation usually involve a significant amount of instructions to be executed over many iterations. This large footprint of query-evaluation code can potentially lead to performance degradation due to high instruction-miss penalty. While compilers such as GCC apply basic-block reordering techniques to improve code locality thus reducing instruction cache misses, the bee code does not benefit from this optimization in that bees do not exist when the DBMS is compiled. Hence, three effective approaches to address this challenge are provided.

Figure 8:
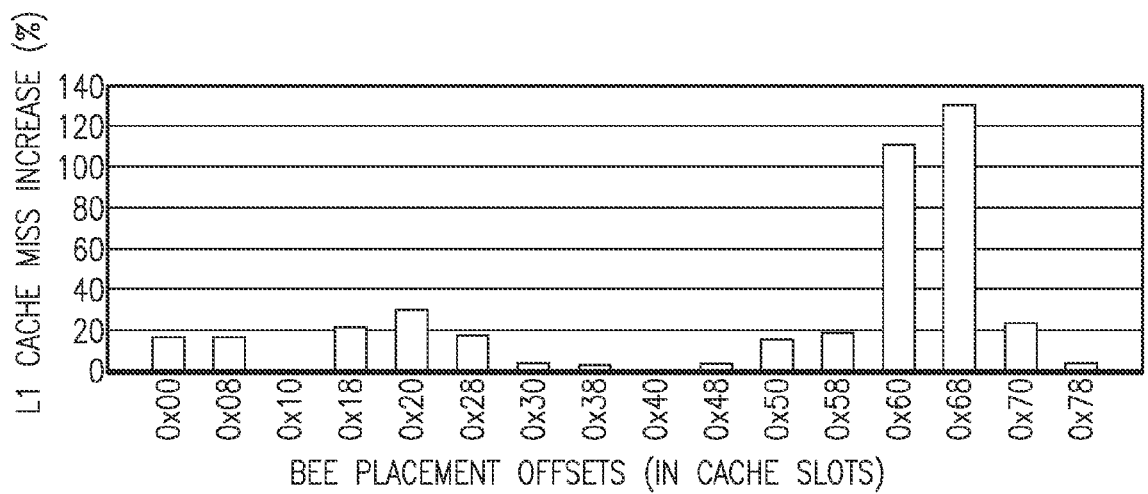
FIG. 8 is a graph depicting percentage increase of L1 of query22 with various bee placements.

To illustrate the cache effects of executing a bee during query evaluation, FIG. 8 illustrates a study of the relationship between various placement (shown by the x axis) of a bee and the percentage increase in I1 cache misses (shown by the y axis), during the evaluation of a query. As described in Section 8, the experiment machine is equipped with a 32K I1 cache. Given that each cache line is 64 bytes wide and the cache is four-way set associative, there are a total of 128 cache slots, each consisting of four cache lines. 16 placements are sampled uniformly across all 128 possible cache slots. In other words, the same query is evaluated 16 times, each time with a different placement of the bee executed during each query evaluation. As indicated by the figure, when the bee is placed at cache slots addressed at 0x10 and 0x40, respectively, the I1 cache-miss rate is minimized. However, if the bee is placed at 0x68, an over 130% increase in cache misses is observed. In general, the overall instruction-cache performance is very sensitive to the placement of the bee.

Figure 9:
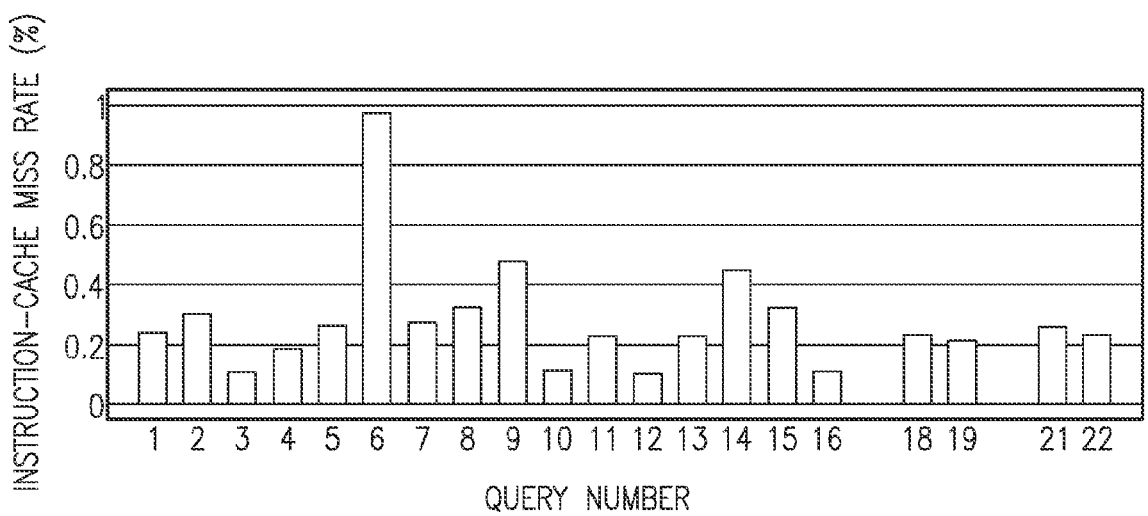
FIG. 9 is a graph depicting I1-cache miss rate for all TPC-H queries (except for query17 and query20), scale factor=1.

Although cache-miss rate can be significantly increased with a non-optimal bee placement, the actual runtime degradation is trivial for this particular query. This is because the overall I1 cache-miss rate for most of the TPC-H queries is around 0.3%, as shown by FIG. 9. Even a 130% increase to such a small cache-miss rate has no significant impact on the actual execution time of queries.

However, when many bees are utilized in query evaluation, especially within a more complex query or a more sophisticated DBMS that involves more runtime instructions, unwise placement of the bees may significantly impact the actual runtime performance. In fact, it was observed that for one particular query (query6) among the 22 TPC-H queries, the I1 cache-miss rate was around 1%, with 4.8B executed instructions and 47M I1-cache misses. As discussed in Section 7.3, with appropriate bee placement, the I1 cache-miss rate was reduced down to just 0.1%. This reduction translated into over 15% execution time improvement due to the expensive cache-miss penalty. Therefore, the cache pressure is considered a critical issue that directly impacts runtime performance. Three approaches are provided to computing proper bee placements.

7.1 Local Next-to-Caller Placement

To reduce the instruction-cache miss rate when executing a program, a typical compiler optimization technique applied at code generation time is to reorder the basic blocks and functions in the generated executable code. This code-layout optimization is achieved by first identifying the static call graph, and then placing a caller and its callees next to each other in the produced code. The idea is that when a function calls another function, placing them sequentially will result in these two functions to be mapped to consecutive cache lines that do not overlap with each other, assuming these two functions are sufficiently small to not occupy the entire cache. This approach can effectively reduce the probability that instructions from the two functions are mapped to the same cache line.

GCC may be used to compile the PostgreSQL DBMS and the bee code. GCC performs function layout optimization by placing the callees in front of their caller. The same strategy was adopted for placing bees. The bee callers can be easily identified from the PostgreSQL executable. Hence the addresses of these bee callers can be determined at DBMS compilation time. When placing a bee, memory address was chosen, which by mapping to a cache line, is a few slots earlier in front of the bee's caller. The number of slots is determined by the size of the bee.

With this placement, the I1-cache misses were reduced for query6 from the original 47M down to 19M, or a 60% cache-miss reduction. Now the I1-cache miss rate for query6 is 0.4% (19M/4.8B).

Despite its simplicity and effectiveness, this approach has a drawback. The code in the inner loop executed by query evaluation usually presents a large footprint in the cache. Thereafter, placing bees in a cache region by only considering its caller may end up overlapping the bees with some other frequently executed functions, resulting in significant cache performance degradation. This concern indicates that the above approach is not generally applicable. Technically, such a placement of bees is only local to the bee callers regardless of other DBMS functions in general. This approach is termed the "localized approach." However, given its simplicity, it is still considered an alternative approach to bee placement.

Pseudo code for Local Next-to-Caller Placement is provided below:

```
PlaceBees(executable_file)
    bees_to_place = InstantiateBees( );
    foreach bee in bees_to_place
        do
            bee_caller = FindBeeCaller(bee, executable_file);
            memory_offset = BeginAddress(bee_caller) −
                SizeofBee(bee);
            cache_line = TranslateMemoryAddress(memory_offset);
            PlaceBeeatCacheLine(bee, cache_line);
        end for
```

7.2 Global Function Scoring-Based Placement

Figure 10:
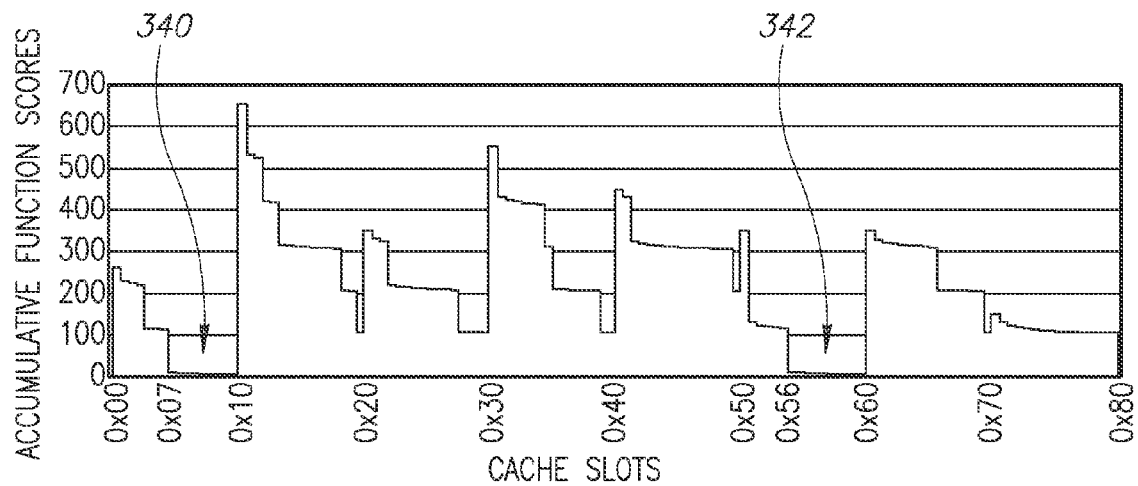
FIG. 10 is a graph depicting a cumulative cache-line reference histogram.

To avoid the shortcoming of the previous approach, we take into account all the functions in a DBMS as a global view for bee placement. Specifically, the entire executable code is mapped to all 128 cache slots. FIG. 10 shows a cumulative cache-slot reference histogram. The x axis represents all the cache slots. The y axis shows the number of functions, which are mapped to each individual cache slot.

As shown by FIG. 10, two cache regions 340 and 342, which are located from 0x07 to 0x10 and from 0x56 to 0x60, respectively contain the least number of functions. Such cache regions 340 and 342 are termed the "valleys." An intuitive solution is to place the bees only in these valleys 340 and 342.

However, the limitation of such a placement strategy is that there is no guarantee that valleys are always available given a particular executable program, in which case there will be no feasible placements for bees. Furthermore, another shortcoming of this static placement approach is that during query evaluation, not all the functions in the DBMS are invoked; in addition, among the invoked instructions, not all of them are of equal importance in terms of impact to runtime performance. For instance, an instruction invoked by a SQL parsing function has lower importance than one from a join function in that the later will be executed more often than the latter during DBMS operation. As shown by FIG. 10, although at cache slot 0x10, most number of functions are observed, FIG. 8 suggests that on the contrary, the least I1 cache misses occur at runtime at that very point.

Given that bees are frequently invoked inside the query-evaluation inner loop, bee placement must in particular avoid conflicting with the instructions from those functions that are also in the inner loop. Such functions are termed "hotspot" functions. To find those hotspot functions, VALGRIND was utilized to profile the query evaluation. In evaluating queries, different set of functions in the DBMS could be invoked. For instance, in evaluating a simple scan query, only the table scan functions are needed. But for a query with joins, not only the table scan functions, but the functions for the involved join algorithms are required as well. To capture a comprehensive set of functions in the inner loop, a set of few queries is composed with distinct characteristics as training samples.

With the hotspot functions identified, the score scheme is altered to integrate the higher priority of those functions. The importance of the hotspot functions are simply represented by a higher unit score. For a regular instruction (that is not from the hotspots), a score of 0.5 (which is a small number chosen arbitrarily) is assigned; for the instructions from the hotspots, each instruction is assigned a score of 100. The significant gap between these two score values can result in the significant distinctions between the peaks and valleys, making the valleys easy to be identified.

This placement approach was applied to evaluate query6 again. A further 5M reduction in the I1-cache misses was observed. The I1-cache miss rate is now 0.3%, with over 14M I1-cache misses.

Pseudo code for Global Function Scoring-Based Placement is provided below:

```
ComputeFunctionScoreHistogram(executable_file, query_loop)
    histogram = NIL
    foreach cache_line in cache_lines
        do
            histogram[cache_line] = 0
        end for
    foreach function in GetAllFunctions(executable_file)
        do
            if function in query_loop
            then
```

```
            histogram[BeginAddress(function) ..
            EndAddress(function)] =
                histogram[BeginAddress(function) ..
                EndAddress(function)] + 0.5
        else
            histogram[BeginAddress(function) ..
            EndAddress(function)] =
                histogram[BeginAddress(function) ..
                EndAddress(function)] + 100
        end if
    end for
    return histogram
PlaceBees(executable_file)
    bees_to_place = InstantiateBees( );
    query_loop = ExtractQueryLoop(executable_file);
    histogram = ComputeFunctionScoreHistogram(executable_file,
    query_loop);
    foreach bee in bees_to_place
        do
            cache_line = FindValleyCacheLine(histogram)
            if cache_line is valid
            then
                PlaceBeeatCacheLine(bee, cache_line)
            else
                PlaceBeeatCacheLine(bee, 0)
            end if
    end for
```

7.3 Profile Analysis and Inner-Loop Identification-Based Global Placement

The above two approaches have benefits and shortcomings. The first approach may be too localized to be generally applicable. Without considering other functions but the bee callers, the cache effect is likely to be even amplified by the conflicts of existing hotspots and the inappropriately placed bees.

The primary advantage of the second approach is that it takes into account the entire PostgreSQL executable, making the analysis complete. However, the static instruction mapping includes a huge amount of unimportant instructions. This drawback makes the analysis inaccurate and difficult. Even with the hotspot function prioritized, the scoring scheme is still too coarse to identify valleys accurately.

Hence, a third approach is provided, named the Profile Analysis and Inner-Loop Identification-Based Global Placement (PAILIGP), to identify more accurately the runtime valleys by focusing on just the instructions that are executed during query evaluation. This new approach consists of the following three steps.

First, the inner-loop needs to be systematically identified.
Second, the inner-loop needs to be combined with execution profiles to accurately reflect the runtime hotspots.
Finally, the cache slots are scored accordingly to reveal the valleys.

For the first step, all the query-plan operator-associated functions from PostgreSQL's executable code are located and their addresses and lengths are recorded. At query preparation time, an array of 128 numbers is constructed to keep track of the cache-slot references. The estimated cardinality embedded in each operator node is utilized as the number of times an operator is executed. Hence each time an operator is mapped to some particular cache slots, the values of the corresponding cache slots in the histogram are incremented by the value of the estimated cardinality. After the query plan is generated, the histogram is fully constructed and we identify valleys based on this histogram.

With the PAILIGP placement optimization, which combines both static and dynamic analyses, the number of I1-cache misses during the evaluation of query6 was further reduced to just over 7M. The I1-cache miss rate is now just over 0.1%. The running time is improvement by 15% over the original execution time when the I1-cache miss rate was 1%. It was predicted that with many more bees involved in evaluating very complex queries, instruction cache miss rate could grow rapidly and hence the bee placement optimization strategies will be of critical importance in improving runtime performance.

To summarize, three approaches to optimize bee placements are provided. These three approaches were compared by evaluating query6 from the TPC-H benchmark. With an unwise bee placement, the I1 cache-miss rate of evaluating query6 was at 1%. With the Local Next-to-Caller Placement, the I1 cache-miss rate was reduced to 0.4%. The Global Function Scoring-Based Placement reduced the I1 cache-miss rate to 0.3%. Finally, the Profile Analysis and Inner-Loop Identification-Based Global Placement reduced the I1 cache-miss rate to just 0.1%. In general, the PAILIGP approach is considered to be most effective in that it avoids the shortcomings present in the first two approaches.

Pseudo code for Profile Analysis and Inner-Loop Identification-Based Global Placement is provided below:

```
ComputeHotSpotHistogram(hotspot_functions)
    histogram = NIL
    foreach cache_line in cache_lines
        do
            histogram[cache_line] = 0
        end for
    foreach function in hotspot_functions
        do
            histogram[BeginAddress(function) ..
            EndAddress(function)] =
                histogram[BeginAddress(function) ..
                EndAddress(function)] + 1;
        end for
    return histogram
PlaceBees(executable_file, profile_result)
    bees_to_place = InstantiateBees( );
    query_loop = ExtractQueryLoop(executable_file)
    runtime_hotspot_functions =
        IdentifyHotspotFunctions(query_loop, profile_result);
    histogram =
    ComputeHotSpotHistogram(runtime_hotspot_functions);
      foreach bee in bees_to_place
        do
            cache_line = FindValleyCacheLine(histogram)
            if cache_line is valid
            then
                PlaceBeeatCacheLine(bee, cache_line)
            else
                PlaceBeeatCacheLine(bee, 0)
            end if
        end for
```

Section 8: Evaluation

Micro-specialization replaces generic code containing many branches with highly customized code that relies on identified values being invariant in the query evaluation loop. The result is fewer instructions executed on each bee invocation, which when summed across the often millions of times around the loop can result in significant increase in performance. Moreover, approaches to minimizing instruction-cache pressure introduced by executing bees have been investigated in the previous Section.

In this section, an empirical study of the performance impact of micro-specialization is provided for many contexts: simple select queries such as discussed in the case study, OLAP-style queries and high-throughput bulk-loading in the TPC-H benchmark [13], and OLTP-style queries and modifications in the TPC-C benchmark [12].

To generate the dataset in TPC-H, the DBGEN toolkit [13] was utilized. The scale factor for data generation was set to one, resulting in the data of size 1 GB. Performance study with the scale factor set to 5 and 10 was also conducted, effecting a 5 GB database and a 10 GB database, respectively. For TPC-C, the BENCHMARKSQL-2.3.2 toolkit [9] was used. The number of warehouses parameter was set to 10 when the initial dataset was created. Consequently, a total of 100 terminals were used (10 per warehouse, as specified in TPC-C's documentation) to simulate the workload. DDL annotations were also added to identify the handful of low-cardinality attributes in the TPC-H relations, as illustrated by Listing 6 in Section 5. Other than specifying the scale factor, the DDL annotations, and the number of warehouses, no changes were made to other parameters used in the TPC-C and TPC-H toolkits for preparing the experimental datasets.

All of the experiments were performed on a machine with a 2.8 GHz Intel i7 860 CPU, which contains four cores. Each core has a 64 KB Level-1 (L1) cache, which consists of a 32 KB instruction (I1) and a 32 KB data cache. The CPU is also configured with a 256 KB unified level-2 (L2) cache. The prototype implementation used PostgreSQL version 8.4.2, compiled using GCC version 4.4.3 with the default build parameters (where the optimization level, in particular, is –O2). The PAILIGP placement introduced in Section 7.3 was utilized to place bees.

8.1 The TPC-H Benchmark

Initially, the TPC-H benchmark is utilized to compare the performance of the bee-enabled PostgreSQL with the stock DBMS. The TPC-H benchmark creates a database resembling an industrial data warehouse. The queries used in the benchmark are complex analytic queries. Such a workload, featured with intensive joins, predicate evaluations, and aggregations, involves large amount of disk I/O and catalog lookup. In studying bulk-loading, he running time improvement in populating the same relations was quantified.

The TPC-H benchmark contains eight relations. The total size of the two relation bees (for supplier and partsupp) and the 85 tuple bees (for the other six relations, as discussed in Section 8.1.5 below) is 21 KB. The size of all the query bees is 59 KB. This added code is measured at just a fraction (0.5%) of the size of the bee-enabled PostgreSQL's executable, which is 16 MB. As mentioned in Section 3.4, HRE adds code into the bee-enabled PostgreSQL. Also, the functions that creates the relation and tuple bees, whose source code is required to be created at runtime, add an amount of code to the bee-enabled PostgreSQL. It was found that the HRE was composed of around 225 KB of object code. The relation- and tuple-bee creation function consists of just over 2 KB of binary code. This totals less than 300 KB. This additional code introduces merely less than 2% (out of 16 MB) in footprint to PostgreSQL at runtime.

Although the size (static) of bee-enabled PostgreSQL is larger than the stock PostgreSQL, during the evaluation of each query, only a portion of these bees will be invoked. With smaller bee routines substituting the generic code in the DBMS that has larger footprints in memory at runtime, the runtime instruction-cache performance is in fact improved.

8.1.1 Query-Evaluation Performance with Scale Factor=1

All 22 queries specified in TPC-H were evaluated in both the stock and bee-enabled PostgreSQL. The running time was measured as wall-clock time, under a warm-cache scenario. The warm-cache scenario is first addressed to study the CPU performance: keeping the data in memory effectively eliminated the disk I/O requests. The cold-cache scenario is then considered.

Each query was run twelve times. The highest and lowest measurements were considered outliers and were therefore dropped. The running time measurement for each query was taken as the average of the remaining ten runs. It was found that the standard deviation of the remaining ten runs of each of the 22 queries was less than 1%.

To ensure the validity and repeatability of the results, we tried to ensure that in evaluating these 22 queries, both the stock and the bee-enabled PostgreSQL were in fact using the same query plans. It was difficult to ensure that the two DBMSes would always choose the same plan, especially as the underlying relations had different characteristics under the two DBMSes through micro-specialization, e.g., the relation size, tuple size, and number of pages occupied by a relation. However, by setting the default_statistics_target parameter in the postgresql.conf file to 1000 (100 by default), it was possible to ensure 21 of the queries were using the same plan across the two DBMSes. The only query with different plans was query21.

Figure 11:
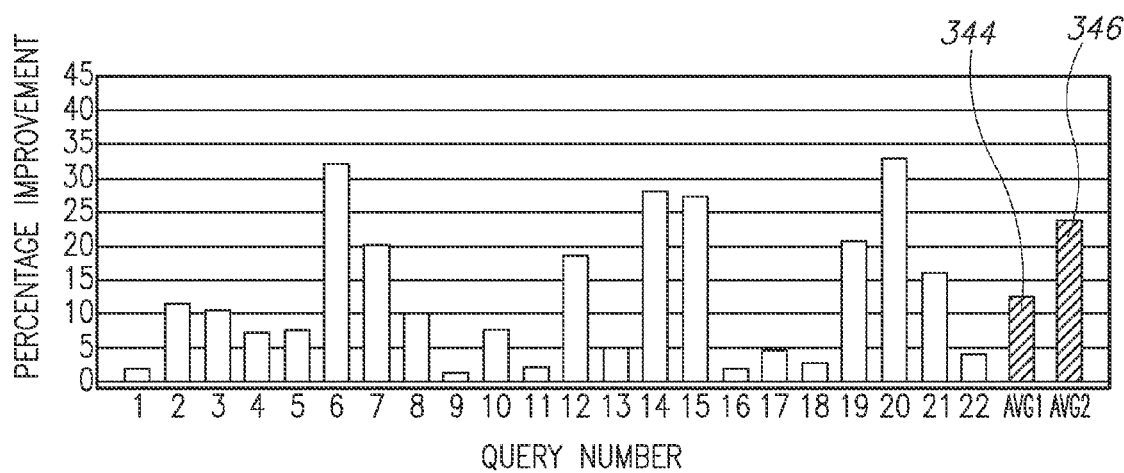
FIG. 11 is a graph depicting TPC-H run time improvement (warm cache, scale factor=1).

FIG. 11 presents the percentage performance improvements for each of the 22 queries with a warm cache, shown as bars 1-22. Two summary measurements are included, termed Avg1 344 and Avg2 346, shown as hatched bars. Avg1 344 is computed by averaging the percentage improvement over the 22 queries, such that each query is weighted equally. Avg2 346 is computed by comparing the sum of all the query evaluation times. Given that query17 and query20 took much longer to finish, about one hour and two hours, respectively, whereas the rest took from one to 23 seconds, Avg2 346 is highly biased towards these two queries. The range of the improvements is from 1.4% to 32.8%, with Avg1 344 and Avg2 346 being 12.4% and 23.7%, respectively. In this experiment, tuple bees, relation bees, and query bees were enabled, involving the GCL, EVP, and EVJ bee routines (see Sections 2 and 6 for discussion of these bee routines). As shown by FIG. 11, both Avg1 344 and Avg2 346 are large, indicating that the performance improvement achieved in the bee-enabled PostgreSQL with just a few bee routines is significant.

Figure 12:
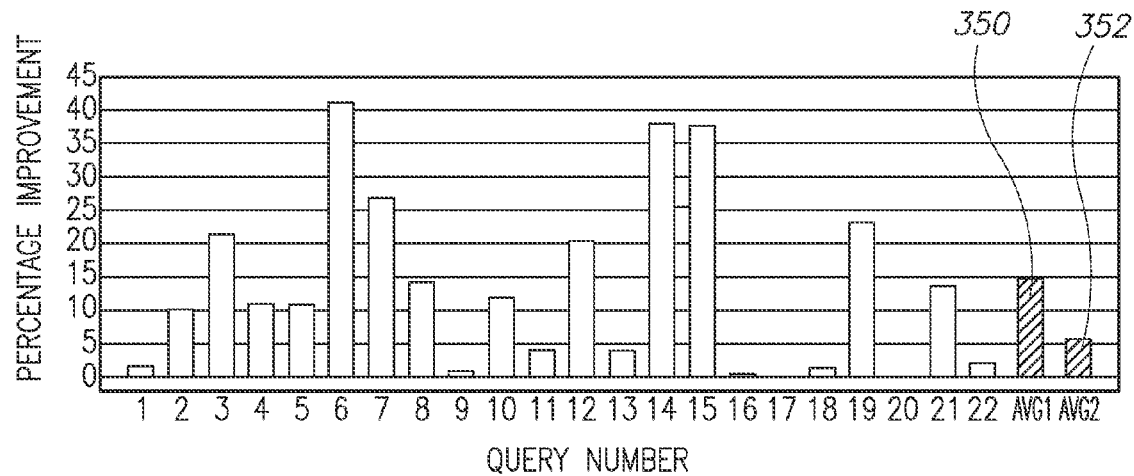
FIG. 12 is a graph depicting improvements in number of instructions executed (scale factor=1).

FIG. 12 plots the improvements in the number of instructions executed for each query. The reductions in dynamic instruction count range from 0.5% to 41%, with Avg 1 350 and Avg2 352 of 14.7% and 5.7%, respectively. Note that when profiling with CALLGRIND, program execution usually takes around two hundred times longer to finish. Thus the profile data was not collected for q17 and q20, and so he profile related results were omitted for these two queries. (This will be the case for other profile-based studies on the TPC-H queries presented in this section.) This plot indicates that the running time improvement is highly correlated with the reduction of instructions executed, further emphasizing that the benefit of micro-specialization stems from the reduced instruction executions.

Figure 13:
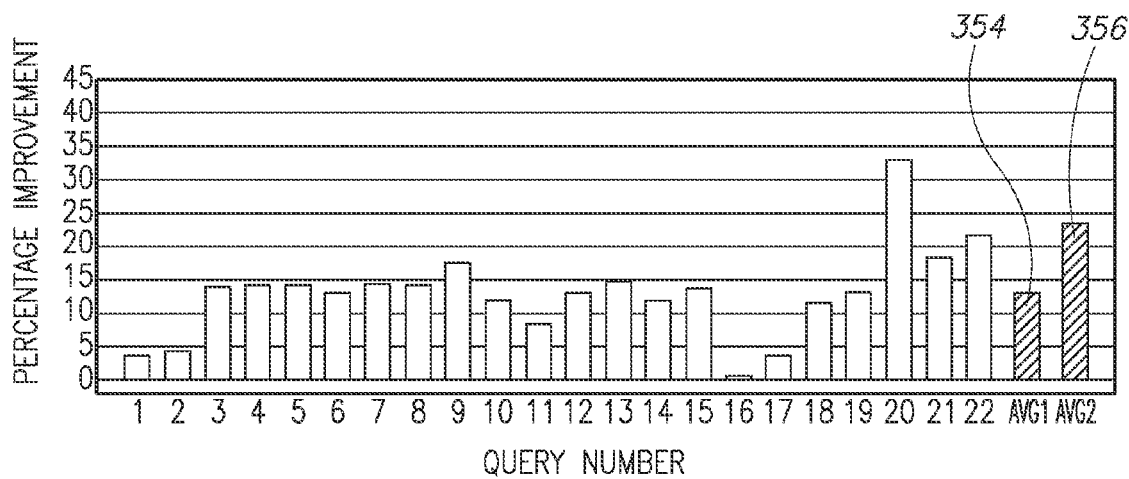
FIG. 13 is a graph depicting TPC-H run time improvement (cold cache, scale factor=1).

To ascertain the I/O improvement achieved by tuple bees, the run time of the 22 queries with a cold cache was examined, where the disk I/O time becomes a major component of the overall run time. FIG. 13 presents the run time improvement with a cold cache. The improvement ranges from 0.6% to 32.8%, with Avg1 354 being 12.9% and Avg2 356 being 22.3%. A significant difference between this figure and FIG. 11 is that the performance of q9 is significantly improved with a cold cache. The reason is that q9 has six relation scans. Tuple bees are enabled for the lineitem, orders, part, and nation relations. Therefore, scanning these relations, in particular the first two, benefits significantly from attribute-value specialization (reducing the number of disk reads), and thus the 17.4% improvement is achieved with a cold cache.

8.1.2 Query-Evaluation Performance with Scale Factor=5

To further examine the performance benefits with larger datasets, the scale factor of the TPC-H benchmark was increased to 5. With this larger scale factor, the default configurations for Postgre-SQL do not suffice. In particular, in the default configuration, the shared_buffer parameter and the work_mem parameters are set to just 24 MB and 1 MB, respectively. Such small settings resulted in frequent disk reading and writing during query evaluations. The shared_buffer parameter represents the size of the buffer-pool utilized by PostgreSQL. It is suggested that the shared_buffer should be configured as large as possible, up to a maximum of 40% of the size of main memory [11]. The sizes of five of the relations in the TPC-H benchmark are under 256 MB. The other three relations are about 700 MB, 900 MB, and 4 GB, respectively. The shared_buffer was set to 256 MB, which allows a few relations to be cached in memory while also forces other relations to be read from disk. In addition, for the work_mem parameter, PostgreSQL's reference manual states that this parameter "specifies the amount of memory to be used by internal sort operations and hash tables before switching to temporary disk files." [11] This parameter was set to 100 MB such that query evaluations still require a significant amount of I/O during hashing and sorting the large relations, instead of carrying out these operations entirely in memory.

Figure 14:
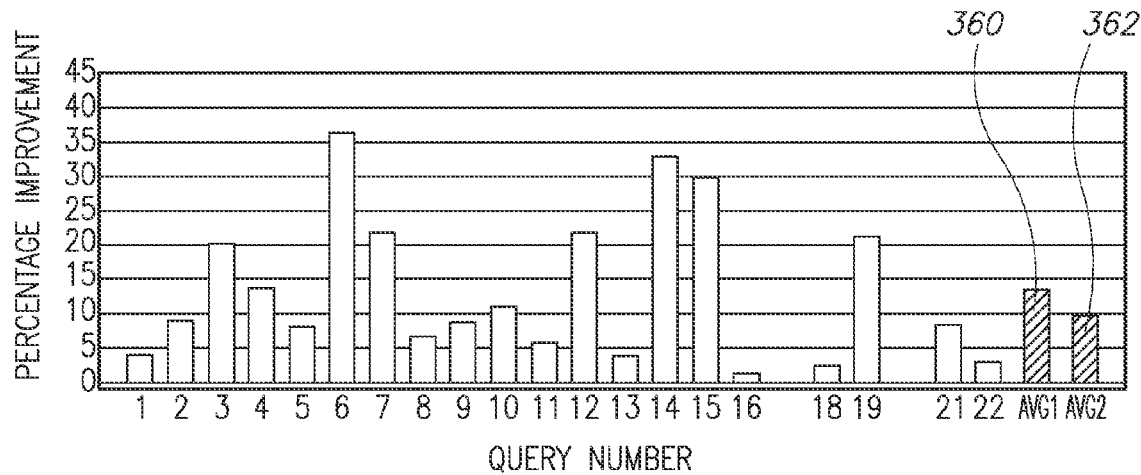
FIG. 14 is a graph depicting TPC-H run time improvement (warm cache, scale factor=5).

All TPC-H queries (except for query17 and query20) were run on both DBMSes with a warm cache. The performance improvements achieved by the bee-enabled PostgreSQL are reported in FIG. 14. As shown by this figure, the performance improvements of Avg 1 360 and Avg2 362 observed when scale factor is 5 are comparable with (even a few percentage points higher than) the performance improvements observed when scale factor is 1 as reported in FIG. 11. Note that because query17 and query20 are missing, Avg2 362 shown in FIG. 14 is lower than the Avg2 shown in FIG. 11.

Figure 15:
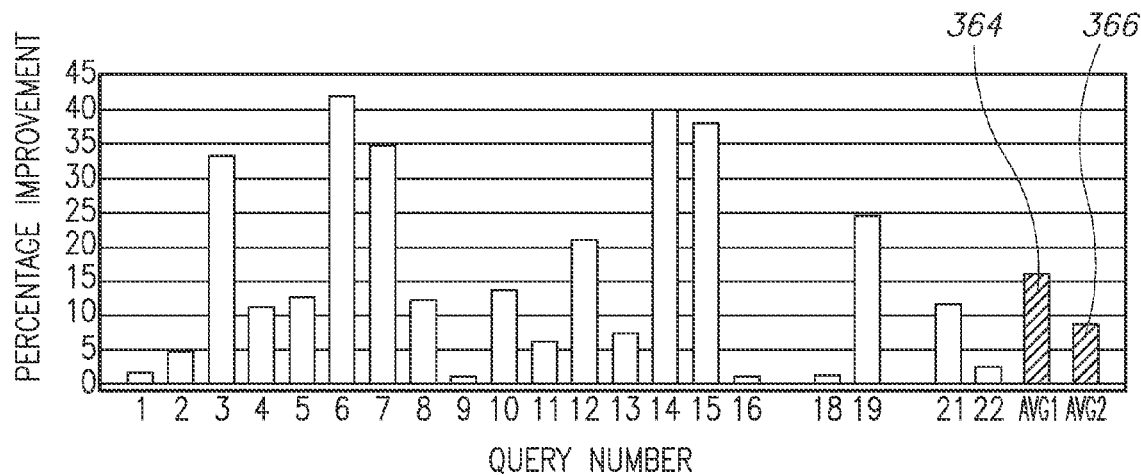
FIG. 15 is a graph depicting improvements in number of instructions executed (scale factor=5).

To investigate the origins of the performance gain, the execution profiles were collected during evaluating the TPC-H queries. The improvements in the number of executed instructions comparing the bee-enabled PostgreSQL and the stock PostgreSQL are shown in FIG. 15. Similar to the results collected when the scale factor was 1, a strong correlation between the improvements in query-evaluation time and the reduction in the numbers of executed instructions is observed. With scale factor set to 5, the achieved query-evaluation time improvements are up to 36%. The average improvements over the TPC-H queries is 14% and 10%, for Avg1 364 and Avg2 366, respectively.

8.1.3 Query-Evaluation Performance with Scale Factor=10

The focus is now shifted to experiments with an even larger dataset, produced by setting the scale factor to 10. In this case, the sizes of three relations are under 256 MB. The other relations vary from 300 MB to 10 GB, with three relations exceeding 1 GB in size. To configure PostgreSQL to appropriately suit this large dataset, such that extremely frequent disk I/O during query evaluation, especially during sorting and hashing, can be reduced, the shared_buffer is set to the maximally suggested 3.2 GB, given that the experimental machine has 8 GB of main memory. The work_mem parameter was set to 2 GB, which requires the two largest relations to be sorted and hashed with disk-based approaches.

Figure 16:
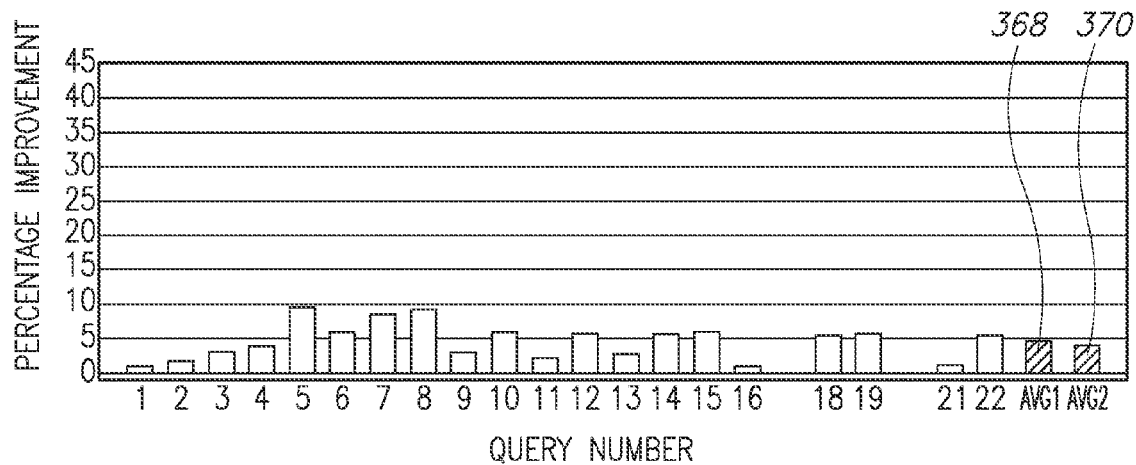
FIG. 16 is a graph depicting TPC-H run time improvement (warm cache, scale factor=10).

The TPC-H queries were run, and the improvements achieved by the bee-enabled PostgreSQL are presented in FIG. 16 (see Avg1 368 and Avg2 370).

Figure 17:
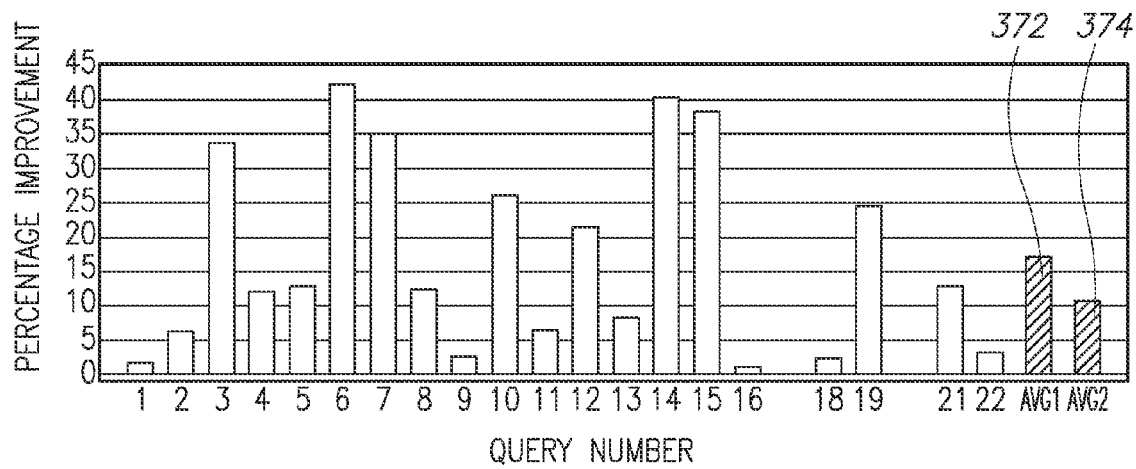
FIG. 17 is a graph depicting improvements in number of instructions executed (scale factor=10).

Unlike when scale factor was 1 and 5, the improvements in query-evaluation are no longer correlated with the reduction in the numbers of executed instructions, which are reported in FIG. 17 (see Avg1 372 and Avg2 374). This is because with this large dataset, disk I/O becomes the dominant bottleneck, even though PostgreSQL is configured to have a large buffer pool. Take query6 as an example. FIG. 17 suggests that the executed-instruction reduction is over 40%. However, the query-evaluation time improvement is just around 6%.

The query-evaluation time of query6 was investigated on both DBMSes. It was found that with the stock PostgreSQL, the total query-evaluation time was 98 seconds. The CPU time was 18 seconds.

Around 82% of the time was spent on disk I/O. With the bee-enabled PostgreSQL, the CPU time was reduced to 12 seconds, which is consistent with the 40% reduction in the executed instructions. Nonetheless, disk I/O still took up 87% of the overall query-evaluation time of 90 seconds. Hence the overall improvement was significantly affected.

Given that the experimental machine has limited memory, the performance improvements with various memory configurations could not be further investigated. Another machine was utilized that is configured with 96 GB of memory perform experiments with this large dataset.

Initially both PostgreSQL DBMSes were configured with large memories. Specifically, the shared_buffer parameter was set to 32 GB, which is the maximal suggested size (96 GB×40%). The work_mem parameter was set to 8 GB, allowing hashing and sorting of seven of the eight TPC-H relations to be operated within main memory. However, the lineitem relation, which is over 10 GB, still requires disk-based sorting and hashing.

Figure 18:
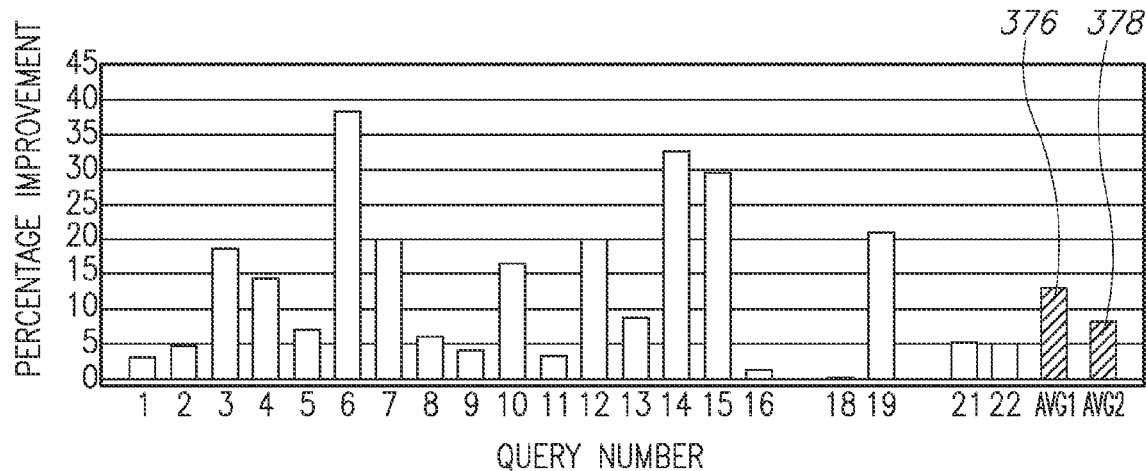
FIG. 18 is a graph depicting TPC-H run time improvement (warm cache, scale factor=10, shared_buffer=32 GB, work_mem=8 GB).
Figure 19:
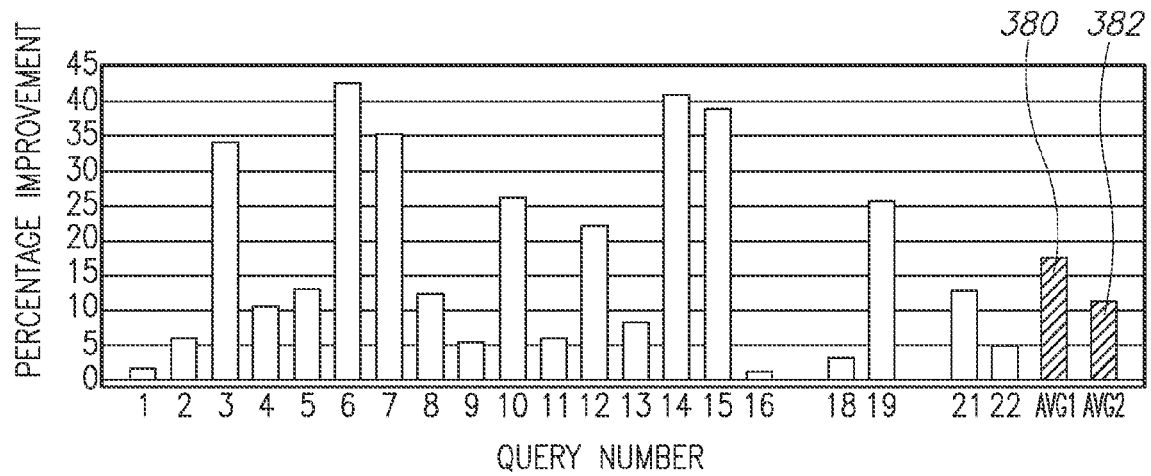
FIG. 19 is a graph depicting improvements in number of instructions executed (scale factor=10, shared_buffer=32 GB, work_mem=8 GB).

The query-evaluation time improvements and executed-instruction reductions are shown in FIG. 18 (see Avg1 376 and Avg2 378) and FIG. 19 (see Avg1 380 and Avg2 382), respectively. With large memory configuration, the query-evaluation time improvements are again consistent with the reductions in executed instructions. Moreover, the performance improvements achieved when scale factor is 10 is also comparable with the improvements achieved when scale factor is 5.

To further understand the I/O effects to query-evaluation time improvement, query7 was studied in detail by varying the memory-related configurations in PostgreSQL. This complex query contains joins of six relations. The query also involves five predicates, one aggregate function, and order by operators.

Figure 20:
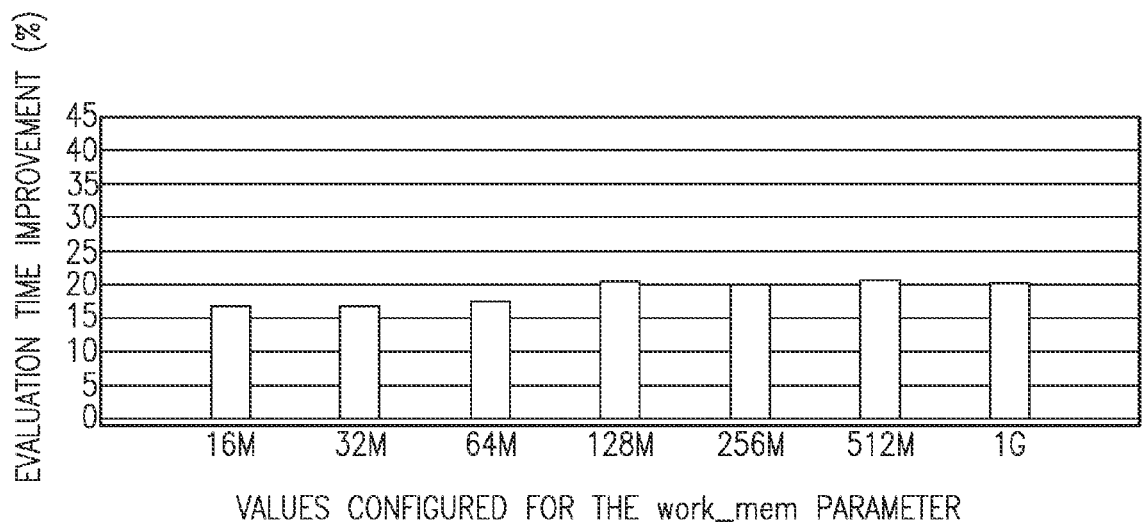
FIG. 20 is a graph depicting Query7 evaluation-time improvements with various configurations for the work_mem parameter (scale factor=10, shared_buffer=32 GB).

The work_mem parameter was analyzed to investigate the relationship between I/O overhead caused by disk-based hashing and sorting and query-evaluation time improvement achieved by micro-specialization. FIG. 20 presents query-evaluation time improvements achieved by the bee-enabled PostgreSQL at various values of the work_mem parameter. As the value of work_mem increases, the query-evaluation time improvement also increases. It was observed that for this particular query, a predicate significantly reduces the number of the projected tuples from lineitem relation, so that the join of the resulting intermediate relation does not require significant amount of memory. Therefore, the actual query-evaluation times for both versions of PostgreSQL with the work_mem parameter set at higher than 128 MB are do not vary. Thereafter, the query-evaluation time improvements achieved by the bee-enabled PostgreSQL are stabilized at 20%.

This study shows that even additional I/O overhead is involved during query evaluation due to sorting and hashing, micro-specialization is able to achieve significant performance improvement.

In a second study, the value of the work_mem parameter was fixed but the shared_buffer parameter was varied. This is to study the relationship between the I/O overhead of reading-in relations and the performance improvements achieved by micro-specialization. Note that for this study, query7 was evaluated with a cold cache. This is because the experimental machine is configured with 96 GB of main memory, which can cache all the TPC-H relations. Therefore, to require the relations to be read from disk, cold cache was utilized. Note also that only the operating-system cache was cleared. The shared memory managed by PostgreSQL is not cleared. The shared memory usually is occupied by relation tuples, intermediate query data, and various other data utilized by the DBMS. Setting the shared_buffer parameter to 1 GB will allow a maximal of 1 GB of data to be cached by PostgreSQL, which requires most of the relations to be read from disk during query evaluation. On the other hand, setting shared_buffer to 16 GB requires less I/O during query evaluation, in that portions of the TPC-H relations could be cached in the shared memory, even though the operating-system cache is cleared. When the shared_buffer is configured to 64 GB, all the relations in the benchmark can be sufficiently cached in memory.

One would expect that as more memory is configured for the DBMSes, less I/O is required for evaluating queries, hence the bee-enabled PostgreSQL should achieve more significant performance improvements. In other words, the performance improvements should monotonically increase with more memory being configured. Nevertheless, as presented in FIG. 21, the reality is more complex than this expectation.

Figure 21:
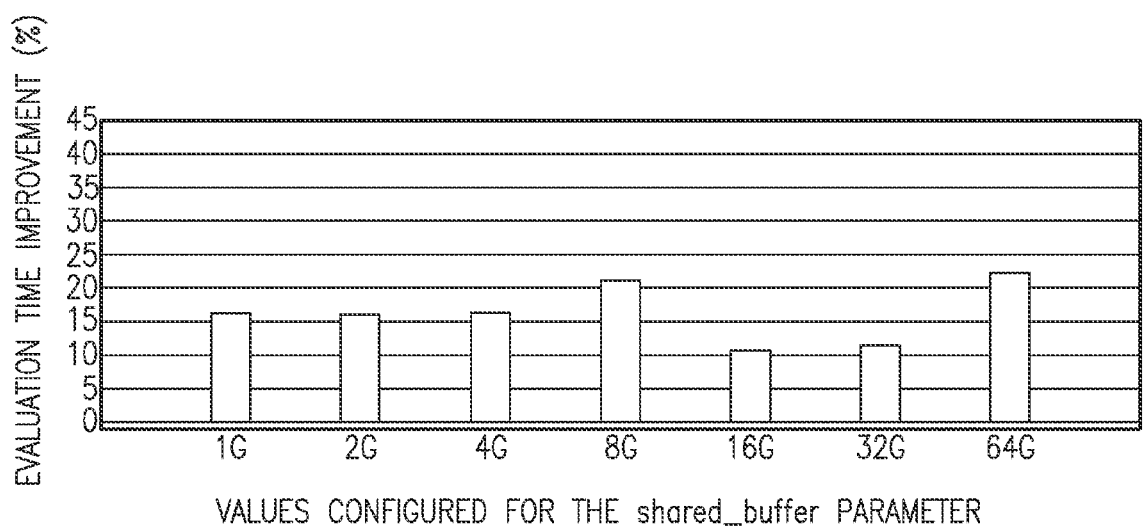
FIG. 21 is a graph depicting query7 evaluation-time improvements with various configurations for the shared_buffer parameter (scale factor=10, work_mem=8 GB).

Three interesting phenomena are shown in FIG. 21. First, there is a jump, from around 15% to over 20% in the query-evaluation time improvement at 8 G. Second, at 16 G, the query-evaluation time improvement is reduced to around 10%, which is even lower than when less memory is configured. Finally, at 64 G, the query-evaluation time improvement spikes over 22%.

Additional execution statistics were investigated to understand these phenomena. In Table 8.1, columns namely num. blocks (stock) and num. blocks (bee) report for various memory configurations, the number of blocks read from the disk during the evaluations of query7 with the stock PostgreSQL and the bee-enabled PostgreSQL, respectively. Note that when shared_buffer is configured with 1 G, the bee-enabled PostgreSQL reads around 10% less disk blocks. This is because by utilizing tuple bees, in this case, on the lineitem relation, the size of this relation is reduced by 10%. Additional details are provided in Section 8.1.5. When 8 G is configured for shared_buffer, a significant decrease in the number of disk blocks read by the bee-enabled PostgreSQL is observed. Nonetheless, no such decrease is observed on the stock PostgreSQL when shared_buffer is 8 G. This is again because the TPC-H relations created by the bee-enabled PostgreSQL are in general smaller than the relations created by the stock DBMS. 8 G is the point for this particular query when more relations can fit in memory under the bee-enabled PostgreSQL, whereas the stock DBMS requires more relations to be read from disk.

Regarding the second phenomenon, we observe that at 16 G, the stock PostgreSQL can cache more relations. Meanwhile, the bee-enabled DBMS requires the same amount of disk blocks to be read as 8 G is configured for shared_buffer. In Table 8.1, columns I/O percentage (stock) and I/O percentage (bee) report the percentage I/O time in the overall query-evaluation time for the stock PostgreSQL and the bee-enabled DBMS, respectively. As shown by the values on the row of 16 G, I/O takes 55% of overall time for evaluating query7 by the stock PostgreSQL.

TABLE 8.1

Statistics of Evaluating Query7 with Various Configurations for the shared_buffer Parameter

| configuration for shared_buffer | num. blocks (stock) | num. blocks (bee) | I/O percentage (%) (stock) | I/O percentage (%) (bee) |
|---|---|---|---|---|
| 1G | 23.8M | 21.3M | 56 | 55 |
| 8G | 23.3M | 17.2M | 53 | 55 |
| 16G | 19.0M | 17.2M | 55 | 50 |
| 64G | 0 | 0 | 0.2 | 0.3 |

For the bee-enabled PostgreSQL, 50% of query-evaluation time is taken by I/O. These two values are comparable to the values reported on the row of 8 G. Therefore, when shared_buffer becomes 16 G from 8 G, the decrease in the numbers of disk blocks read during query evaluation results in the decrease in the overall performance improvement achieved by the bee-enabled PostgreSQL.

Finally, as shown by row of 64 G, both the stock PostgreSQL and the bee-enabled Postgre-SQL require no disk blocks to be loaded during query evaluation. Thereafter, the performance improvement, which is 22%, as shown in FIG. 21, is dominated by the CPU time, which is near 100%.

To summarize, micro-specialization is able to achieve both I/O-time and CPU-time improvements simultaneously. The overall query-evaluation performance improvement is determined by a collection of factors. For instance, the size of buffer cache configured for the DBMS will determine the amount of disk I/O required during query evaluations. A small cache results in high percentage I/O time within the overall query-evaluation time. In such a case, the performance improvement achieved by micro-specialization is largely due to tuple bees. On the other hand, a large buffer ensures minimum I/O, hence the performance improvement is consistent with the reductions in the numbers of executed instruction during query evaluations. A more realistic configuration of the buffer averages the I/O-time improvements and the CPU-time improvements. As an example, if a faster disk drive is employed, such as a solid-state drive, the percentage of I/O time in the overall evaluation time can be effectively reduced, rendering more significant CPU-time improvement, and thus a higher overall performance improvement. In general, micro-specialization can achieve significant improvements with various configurations for the DBMS buffer.

8.1.4 Impact of Multiple Bee Routines

Performance improvement for each query is increased by each additional bee that is invoked. Recall that in Section 2, just the GCL routine of a relation bee achieved 9% improvement. A fundamental question is, how much improvement can be further achieved by adding more bees? More importantly, would many bees adversely impact each other?

The effect of enabling various bee routines is examined. The results are summarized in FIG. 22. As shown by this figure, the average improvement with just the GCL routine is 7.6% for Avg1 386 and 13.7% for Avg2 390. By enabling the EVP routine, the average improvement reaches up to 11.5% (Avg1) and 23.4% (Avg2).

In general, four classes of improvements are observed among the 22 queries. In the first, represented by query2, each time an additional bee routine is enabled, performance is improved significantly. This is because such queries consists of many joins and predicate evaluations, hence the query bees can significantly benefit the performance. In the second class, represented by query6, enabling the predicate-evaluation bee routines significantly improves performance, whereas enabling the evaluate join bee routines does not. This is because query6 consists four predicates without any join. In the third class, represented by query2, the relation and tuple bees are the main contributors to the performance improvement, whereas query bees have less performance impact. This is due to the fact that query12 reads two of the largest relations in the TPC-H benchmark. Since just a few predicates and a single join is involved, the overall performance improvement is contributed by the tuple bees that extract the require attribute values for all the tuples fetched from these two relations.

Finally, in the fourth class, represented by query1, the overall improvements are significantly lower than the classes discussed earlier. This is because for these queries, micro-specialization does not yet benefit the particular operations that are involved. For instance, query1 consists of complex aggregation computations, which have not yet been specialized by micro-specialization. Regarding query9 and query16, regular-expression matching, which is executed during evaluating the predicates contained in both queries, takes most of the time during the evaluation of the two queries. The code that performs regular-expression matching, again, has not been specialized. Furthermore, query18 requires sorting of tuples. The tuple-sorting code, which has not been specialized, takes the majority of the query-evaluation time at runtime. These particular queries point us to investigate more opportunities, where micro-specialization can be applied, during query evaluation.

In this last class, query11 also indicates that micro-specialization has limited performance benefit to this query. This is because query11 accesses three very small relations. Two of these relations do not have tuple bees but relation bees. Although the third relation has tuple bees, there are only 25 tuples in this particular relation. Hence the overall performance benefits that can be achieved is limited by the sizes of these relations. This particular query actually supports the discussion on the benefits of micro-specialization presented in Sections 5.5 and 6.6.

Note also that for query3 and query4, enabling the EVJ routine shows a slight decrease in the performance improvement. The execution profiles of these queries were studied and it was found that by enabling the EVJ routine, the number of executed instructions is reduced slightly. Moreover, the instruction cache misses are also decreased. Thereafter, such slight drop in the performance improvement can only be rationally explained by the variance present in the execution-time measurements.

The implication is that the micro-specialization approach can be applied over and over again. The more places micro-specialization is applied, the better efficiency that a DBMS can achieve. This property of incremental performance achievement is termed "bee additivity."

Figure 22:
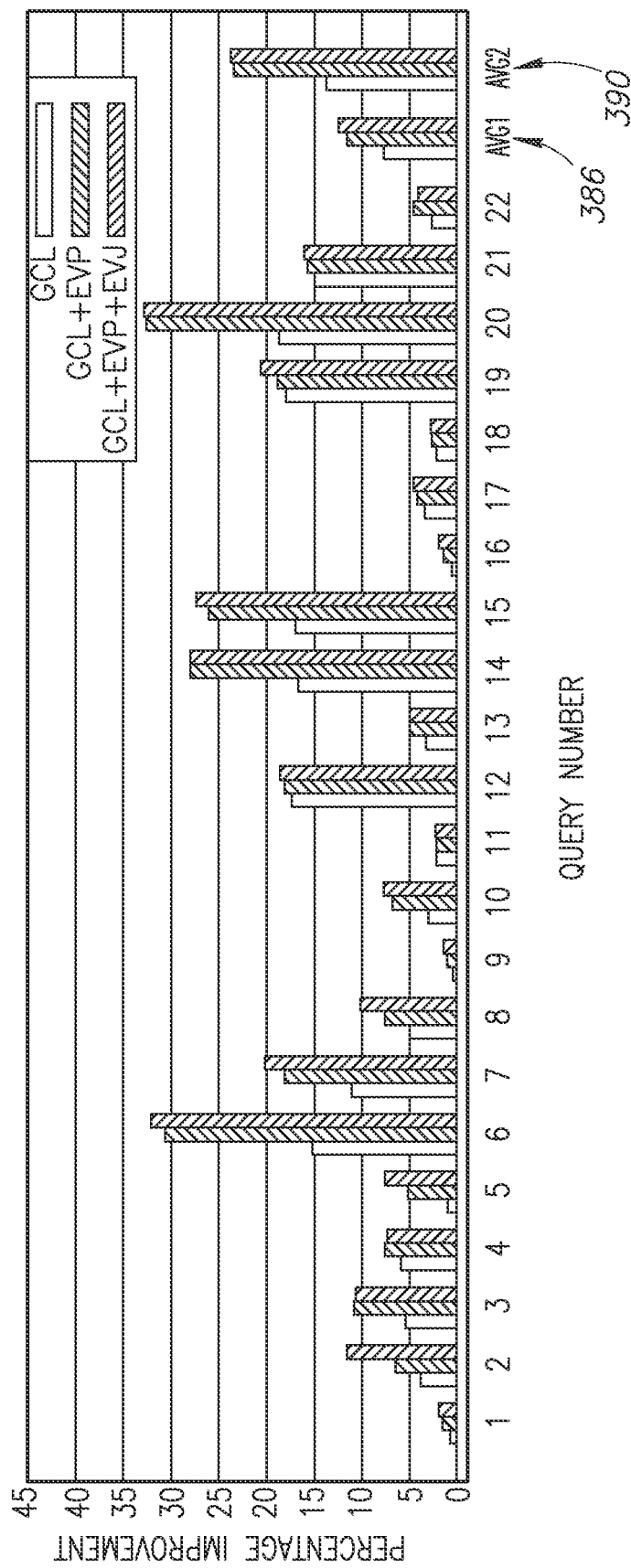
FIG. 22 is a graph depicting TPC-H run time improvement with various bee routines enabled (warm cache, scale factor=1).

Most performance optimizations in DBMSes benefit a class of queries or modifications but slow down others. For example, $B^+$-tree indexes can make joins more efficient but slow down updates. Bee routines have the nice property that they are only beneficial (with two caveats, which are tuple-bee instantiation during modification and cache pressure added by bees, to be discussed in Section 8.1.5 and Section 7, respectively). The reason is that if a bee routine is not used by a query, that query's performance will not be affected either way. On the other hand if the bee routine is used by the query, especially given that the bee routine executes in the query evaluation loop, that query's performance could be improved considerably. Note that both FIG. 11 and FIG. 22 show difference among the performance improvements. For instance, q1, q9, q16, and q18 all experience relatively lower improvements. The reason is that these queries all have complex aggregation computation, sub-query evaluation, as well as complex regular-expression matching that have not yet been micro-specialized with the implementation. These queries with low improvement point to aggregation and perhaps sub-query evaluation as other opportunities for applying micro-specialization.

8.1.5 Bulk-Loading

A concern is that tuple bee instantiation during modifications, such as populating a relation, may be expensive, in that the specialized attribute values from a newly inserted tuple need to be examined to determine if a new tuple bee is needed. Moreover, when a new tuple bee is created, new memory space needs to be allocated to store this bee. To ascertain the possible performance hit of this second caveat, bulk-loading was performed on all the relations in the TPC-H benchmark. Table 8.2 summarizes several characteristics of these relations when the scale factor is 1 and Table 8.3 summarizes the characteristics of the TPC-H relations when the scale factor is 10. Note that the number of relations and tuple bees and their sizes remain the same for these two datasets. Hence the related columns are removed from Table 8.3.

TABLE 8.2

Characteristics of the Relations in the TPC-H Benchmark (Scale Factor = 1)

| relation | num. tuples | specialized attribute(s) | num. relation and tuple bees | tuple bee size (KB) | size (MB) bee-enabled | size (MB) stock | saving (%) |
| --- | --- | --- | --- | --- | --- | --- | --- |
| region | 5 | r_name | 5 | 1.25 | 0.008 | 0.008 | 0 |
| nation | 25 | n_nation | 25 | 1.94 | 0.008 | 0.008 | 0 |
| part | 200000 | p_mfgr | 5 | 3.01 | 28.74 | 34.09 | 15.7 |
| supplier | 10000 | N/A | 1 | 2.21 | 1.84 | 1.84 | 0 |
| partsupp | 800000 | N/A | 1 | 1.08 | 145.38 | 145.38 | 0 |
| customer | 150000 | c_mktsegment | 5 | 2.63 | 27.99 | 29.66 | 5.6 |
| orders | 1500000 | o_orderstatus, o_orderpriority, o_shippriority | 15 | 2.97 | 182.90 | 219.46 | 16.7 |

TABLE 8.2-continued

Characteristics of the Relations in the TPC-H Benchmark (Scale Factor = 1)

| relation | num. tuples | specialized attribute(s) | num. relation and tuple bees | tuple bee size (KB) | size (MB) bee-enabled | size (MB) stock | saving (%) |
|---|---|---|---|---|---|---|---|
| lineitem | 6001215 | l_returnflag, l_linestatus, l_shipmode | 28 | 4.88 | 878.96 | 971.06 | 9.5 |

TABLE 8.3

Characteristics of the Relations in the TPC-H Benchmark (Scale Factor = 10)

| relation | num. tuples | size (MB) bee-enabled | size (MB) stock | saving (%) |
|---|---|---|---|---|
| region | 5 | 0.008 | 0.008 | 0 |
| nation | 25 | 0.008 | 0.008 | 0 |
| part | 2000000 | 287 | 341 | 15.8 |
| supplier | 100000 | 18 | 18 | 0 |
| partsupp | 8000000 | 1453 | 1453 | 0 |
| customer | 1500000 | 280 | 297 | 5.7 |
| orders | 15000000 | 1827 | 2194 | 16.7 |
| lineitem | 59986052 | 8786 | 9707 | 9.5 |

Figure 23:
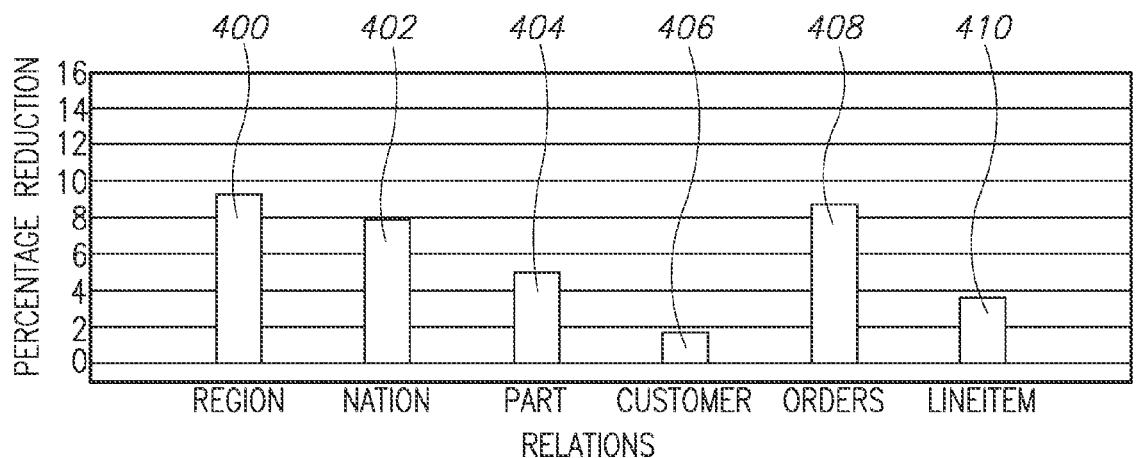
FIG. 23 is a graph depicting bulk-loading run time performance.

The bulk-loading performance of the bee-enabled PostgreSQL was compared with the stock version. Since no query evaluation is performed in bulk-loading, only the SCL bee routine is involved. FIG. 23 presents for each relation the loading time speed-up. In the TPC-H benchmark, the region 400 and nation 402 relations each occupy only two disk pages, which makes the performance impact of loading the two relations so small as to not be measurable. Therefore, a data file that contains 1 M rows was created for each relation. The performance of loading these two relations reported in FIG. 23 is based on populating these two relations each with 1 M rows. The rest of the measurements (part 404, customer 406, orders 408, and lineitem 410) comply with the original schema and data. These performance improvements should be almost identical for a scale factor of 10, in that the improvements achieved during bulk-loading are strongly correlated with the reductions in I/O. Further evidence of such a correlation is shown in FIG. 24.

Note that for bulk-loading the supplier and partsupp relations that do not utilize tuple bees, the tuple-construction relation bee routine, namely SCL, contributed most of the achieved performance improvements. For these two relations, the improvements are less significant, due to the fact that disk space is not reduced as no tuple bees are present, comparing to the rest of the relations discussed earlier.

Figure 24:
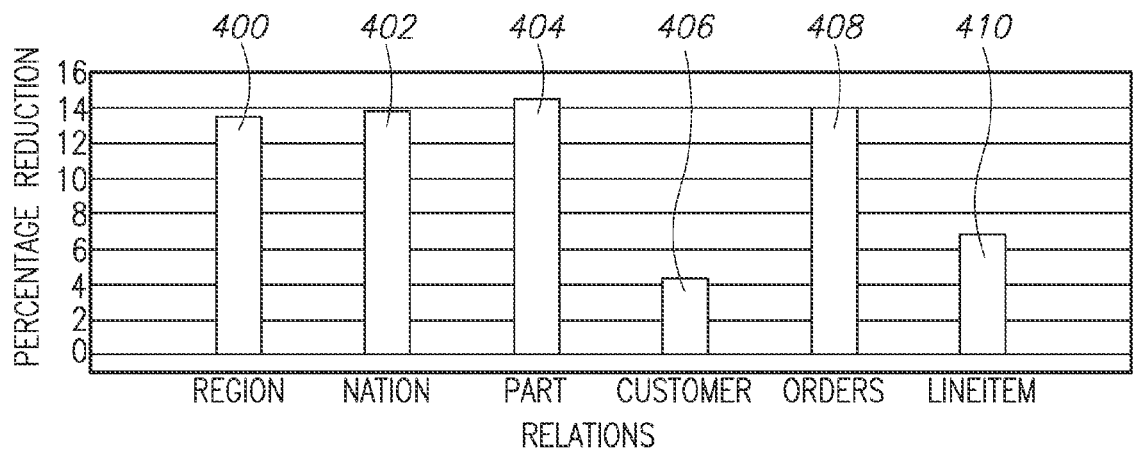
FIG. 24 is a graph depicting space reduction by specializing on attributes.

FIG. 24 presents the disk-space reduction introduced by attribute_specialization, for each of the relations 400, 402, 404, 406, 408, and 410. The reduction is computed based on the tuple length defined by the DDL statement. Taking the orders relation as an example, the tuple size by definition is 143 bytes by the schema definition. The three hardcoded attributes, of types CHAR(1), CHAR(15), and INT, respectively, add up to 20 bytes. So the space reduction is 14%.

The bulk-load performance improvement presented in FIG. 23 suggests that the overhead of creating tuple bees during bulk-loading is in fact compensated by the benefit of micro-specialization, such that the overall bulk-load performance is improved.

These two figures in concert suggest that the bulk-loading performance improvement is strongly correlated with the I/O time improvement. To further understand the performance improvement in terms of runtime instructions, the profile of bulk-loading the orders relation was studied. The profile results of the stock PostgreSQL and the bee-enabled PostgreSQL are presented in Listings 14 and 15, respectively.

| Listing 14 Profile of Bulk-Loading with the Stock PostgreSQL | |
|---|---|
| Ir | function |
| 147,654,557,447 | TOTAL |
| 17,765,166,338 | CopyReadLine |
| 16,493,210,547 | CopyFrom |
| 4,626,937,351 | heap_fill_tuple |
| 1,686,341,865 | heap_form_tuple |

| Listing 15 Profile of Bulk-Loading with the Bee-Enabled PostgreSQL | |
|---|---|
| Ir | function |
| 146,107,220,439 | TOTAL |
| 17,765,166,338 | CopyReadLine |
| 16,427,197,148 | CopyFrom |
| 2,424,490,860 | 0x000000000425e400 (SetColumnsFromLongs) |
| 1,968,398,980 | heap_form_tuple |
| 1,243,303,804 | InsertDataSectionToBeeCache |

As shown by Listing 14, in bulk-loading this relation, the stock PostgreSQL executed 148 B instructions. Whereas the bee-enabled PostgreSQL executed 146 B instructions, shown by Listing 15. As discussed earlier, tuple bees are created during bulk-loading. In particular, the tuple bee creation introduces the overhead of checking the values of the specialized attributes in the currently inserted tuple against all the existing data sections (in the existing tuple bees). This checking is carried out by the InsertDataSectionToBeeCachefunction, shown in Listing 15. In addition, it is observed that the heap form tuple function in the bee-enabled PostgreSQL executed 1.97 B instructions while the in the stock version this function executed 1.69 B instructions. This near 300 M instruction increase was introduced by the code that stores the beeID for each tuple in the bee-enabled PostgreSQL. Although these two functions in concert incurred an additional 1.3 B instructions, given that in the stock PostgreSQL, the heap_fill_tuple function, which constructs physical tuples, executed 4.6 B instructions, whereas the bee-enabled PostgreSQL, as indicated by Listing 15, utilized the SCLbee routine instead, which executed 2.4 B instructions, effecting an over 2.2 B reduction in the number of executed instructions, the overall performance was still improved for bulk-loading the orders relation.

In summary, the performance improvement in bulk-loading is the result of both the reduction in the number of executed instructions as well as the reduction in disk space, and thus input time. Both benefits are achieved simultaneously by utilizing tuple bees, which specialize on attribute values by effectively storing (distinct) attribute values within the bees rather than in the relations, such that these values can be directly accessed by tuple bee routines as if these values are hardcoded into the object code.

When distinct attribute values need to be stored in a tuple bee, the slab-allocation technique is employed to pre-allocate the necessary memory, therefore avoiding expensive small and frequent memory allocation during tuple bee creation. To determine whether a new tuple bee is needed, we check the few (maximally 256) possible values with memcmp. FIG. 23 indicates that this step is efficient.

In summary, bee creation does not adversely impact the performance of DBMS operations; rather, the performance is improved due to the benefit of even a single bee routine.

8.2 The TPC-C Benchmark

The TPC-C benchmark focuses on throughput. This benchmark involves five types of transactions executing in parallel. The throughput is measured as the number of "New-Order" transactions processed per minute (tpmC). Note that for this study, a higher tpmC value indicates better performance (throughput). The other four types of transactions produce a mix of random queries and modifications, which altogether intensively invoke the bee routines.

This benchmark contains nine relations. Due to the specifications on attribute values, no attribute can be specialized. Thereafter, for the TPC-C benchmark, only relation bees are available. The overall size of the relation bees is 26 KB. All the query bees in concert require 59 KB of storage.

The experiments compared the bee-enabled PostgreSQL with the stock DBMS. Each DBMS was run for one hour, to reduce the variance introduced by the experimental system as well as the DBMS, e.g., the auto vacuum processes.

Performing modifications with micro-specialization was actually faster: the former completed 1898 transactions per minute while the stock DBMS could execute 1760 transactions per minute, an improvement of 7.3%.

Beyond this tpmC metric of the TPC-C benchmark, the throughput with different transaction settings was also studied. Two more quite different scenarios were addressed. Of the five defined transaction types, three of them, New-Order, Payment, and Delivery include both queries and modifications; Order-Status and Stock-Level on the other hand only contain queries. For both scenarios, the weight of the New-Order transactions was kept at 45%. The default setting resembles a modification-heavy scenario in that the weight of the Payment transaction is 43%. Regarding the newly defined scenarios, the first consists of 27% order-status and 28% stock-level transactions (that is, only queries). The second scenario has an equal mix of both modifications and queries. The weight of the Payment and the Delivery transactions is 27% whereas the other two types of transactions are weighted 28% in concert.

For the first scenario, that of only queries, the bee-enabled PostgreSQL and the stock DBMS handled 3699 and 3135 transactions per minute, respectively, for an improvement of 18%. Concerning the second scenario, with modifications and queries equally weighted, the bee-enabled PostgreSQL achieved 2220 transactions and the stock version finished 1998. The improvement is 11.1%.

The profile results suggest that both modifications and queries rely on the slot_deform_tuple function to extract tuple values. Since this function is micro-specialized with the GCL routine, significant performance improvement is achieved for various scenarios in the TPC-C benchmark. Moreover, since the queries in this workload involves predicates, the EVP routine has also contributed the improved throughput, particularly to the query-heavy scenarios.

8.3 Comparisons with Compiler Optimization

The performance effects of micro-specialization in query evaluation in conjunction with compiler optimizations was also studied. One essential question investigated is whether enabling aggressive optimizations at compilation (of the DBMS) will reduce the performance improvement achieved by micro-specialization. In other words, can compiler optimizations sufficiently achieve the same performance benefits to micro-specialization, hence rendering micro-specialization unnecessary?

The performance of query6 of the TPC-H benchmark was studied, with the scale factor configured at 1. Specifically, both the stock PostgreSQL and the bee-enabled PostgreSQL were compiled with the three options. These options are −O0 (no optimization), −O1 (reducing code size and execution time), and −O2 (all optimizations that do not require space-speed tradeoff) [7].

Table 8.4 summarizes the evaluation time of query6 for both DBMSes and the corresponding performance improvements achieved by micro-specialization.

TABLE 8.4

Evaluating Query6 with Various Compiler Optimization Options

| compiler option | execution time stock (ms) | execution time bee-enabled (ms) | performance improvement (%) |
|---|---|---|---|
| −O0 | 3508 | 1919 | 45% |
| −O1 | 1790 | 1048 | 41% |
| −O2 | 1611 | 1014 | 37% |

As this table indicates, as more aggressive optimization options are enabled, the overall performance improvement achieved by micro-specialization is slightly decreasing. Nonetheless, the improvements are all significant for various compiler optimizations, which indicate that performance improvements achieved merely by compiler optimization cannot sufficiently substitute the benefits achieved by micro-specialization.

Furthermore, an even more aggressive optimization was investigated, feedback-driven optimization (FDO). One might argue that certain optimizations realized by micro-specialization, such as eliminating branch-condition checking, can be equivalently achieved by branch prediction and instruction pipelining, which are employed by FDO and modern CPUs, respectively. To produce a PostgreSQL executable with an ideal FDO optimization, just query6 was executed as the sample run for the compiler. Query6 was again run on both DBMSes with the FDO optimization applied. On the stock PostgreSQL, query6 executed for 1359 milliseconds. The bee-enabled PostgreSQL evaluated this query for 990 milliseconds. The performance improvement is 27%.

The above study shows that even with an ideal optimization, micro-specialization is able to achieve significant improvement in addition to existing compiler optimizations. The performance advantages of micro-specialization go beyond the reduction of runtime instructions. The reduction in the size of the executed code presents less instruction-cache pressure during query evaluation.

Section 9: Automated Application of Micro-Specialization

Micro-specialization requires complex tasks including static and dynamic program analyses. Various micro-specialization tasks can be carried out in an automated fashion.

A collection of tools is provided to execute the following steps. These tools are termed in concert the Highly-Integrated deVelopment Environment (HIVE). The implementation of HIVE is briefly discussed in Section 9.2. HIVE consists of a functional backend and an Eclipse plugin-based frontend user-interface.

9.1 Steps for Applying Micro-Specialization

Figure 27:
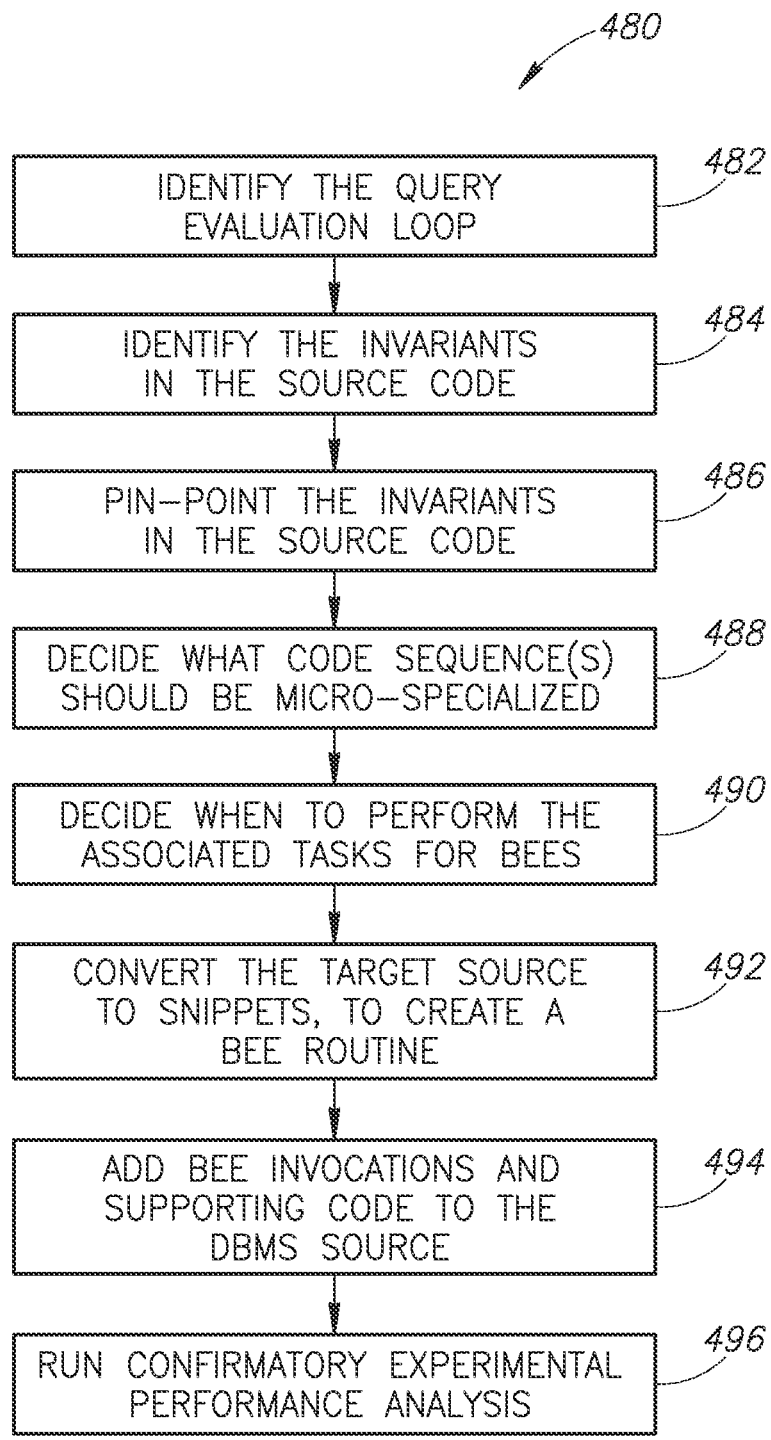
FIG. 27 is a flowchart depicting steps for applying micro-specialization in DBMSes.

FIG. 27 illustrates a flowchart 480 for a process comprising a sequence of steps that each correspond to a particular task for automating the application of micro-specialization.

Step 1 (block 482). Identify the query evaluation loop. To accurately extract the portion of the code that represents the query evaluation loop from the rather large and complex executable code of a DBMS, a static call graph of the basic blocks inside the DBMS may be constructed. Then strongly connected components from this graph may be computed. The strongly connected components provide the set of basic blocks that represent just the query evaluation loop.

For example, with this static call-graph analysis, the slot_deform_tuple function shown in Listing 1, is identified as being within the query evaluation loop.

Step 2 (block 484). Identify the invariants. To spot the invariants, dynamic analysis is required. Profile tools such as VALGRIND are invoked along with query evaluation to produce accurate runtime memory access traces. The traces, containing a list of triples in the form of (address, opcode, operand), are combined with the previously computed query evaluation loop basic block set and the dynamic data flow graph to identify those variables whose values are invariant in query evaluation. During query evaluation, if certain variable, represented by a particular memory location, is written once (perhaps by an assignment during initialization) and then read many times (during the query-evaluation loop), such a variable can be considered as a possible runtime invariant. Such a memory-access pattern can be revealed by analyzing the execution traces.

Note that collecting such an extensive execution trace can be inefficient in that the trace records are collected on a per-instruction basis. Hence, analyzing such traces is a time-consuming task. One characteristic of runtime invariants, on which micro-specialization can be applied, is that these invariants normally are involved in branch-condition checking statements. Thereafter, all the cmp instructions can just be collected during query evaluations, which can significantly reduce the overhead of collecting execution traces. This step requires an extension to VALGRIND. Alternative profiling tools can also be utilized (and extended) to realize execution-trace generation.

Step 3 (block 486). Pin-point the invariants in the source code. The invariant variables are then mapped back to data structures defined in the source code. The identified invariants are memory locations, represented in the object code as operands in instructions. The .debug_line section is utilized to trace the instruction back to the source code to identify the actual references and declarations of these invariants.

To pin-point the runtime invariant variables, such as natts and attalign within the slot_deform_tuple function shown in Listing 1, the profile analysis should be combined with the static program analysis.

Step 4 (block 488). Decide which code sequence(s) should be micro-specialized. Next each target code sequence to be specialized is examined, specifically to determine the exact boundary for each sequence. To do so, static data flow analysis is relied on to locate the code sequences over which the value is invariant. These code sequences can either be early in the call graph or near its leaves. The ideal specialization targets contain a relatively large number of uses within a short code sequence.

For the case study discussed in Section 2, the attribute-value extraction loop within the slot_deform_tuple function was specialized.

Step 5 (block 490). Decide when to perform the associated tasks for bees. For different kinds of bees, the associated tasks discussed in Section 3.4 need to be carried out at different point in time. The developer needs to determine the kind of bee to be designed and created first so that each of the five tasks can be incorporated into the HRE to be executed at the appropriate times.

According to Table 3.1, code for the five tasks was implemented in the HRE.

Step 6 (block 492). The target source code is converted to snippets, to design a bee routine. Consider a relation bee routine. This routine would probably deal with all of the relation's attributes. Say it is specialized on the types of the attributes. The actual relation bee routine would have to be constructed out of snippets, one for each possible type, stitched together according to the schema. In this particular case, the snippets are extracted from the switch statement. As another example, consider the for loop over the attributes on line 11 of Listing 1. A snippet from the body of that loop is created.

If the code sequence contains a call to another function, and that call passes one of the invariant values as a parameter, that called function is also specialized as part of this bee routine after inlining the function invocation. (Otherwise, the bee just retains the function call.)

As discussed in Section 2, the code snippets were designed for relation and tuple bees by utilizing the individual code branches, with each handling certain types of attributes within the attribute-value extraction loop. At schema definition time, these code snippets are selected to form the source code for the relation and tuple bees. Creating the relation and tuple bee source-code is done by procedures implemented in the HRE. For any new kinds of bees that require source-code creation at runtime, the code that carries out this task needs to be implemented for each such kind of bee.

Step 7 (block 494). Add bee invocations and supporting code to the DBMS source. The code that was specialized is now removed from the DBMS, replaced with a call to the corresponding bee routine.

Adding a bee may impact other portions of the DBMS (hopefully in highly circumscribed ways). As discussed in Section 5, an attribute stored in a tuple bee is no longer stored in the relation itself. In the orders relation from TPC-H, three attributes are specialized on, namely o_orderstatus, o_orderpriority, and o_shippriority, which have small discrete value domains. These attributes are removed from the schema as their values are stored in the instantiated bee for each tuple. Code must be added to the DBMS to effect this change.

Necessary function calls were integrated to PostgreSQL. For instance, Listing 3 presents such a function call, which invokes tuple bees, integrated into PostgreSQL.

Step 8 (block 496). Run confirmatory experimental performance analyses. It is important to verify the performance benefits of each added bee on queries that should utilize that bee. Benchmarks are utilized to study the performance by comparing the bee-enabled DBMS and the stock version.

The detailed study include running time of queries, throughput of transactions, and profile of instruction and cache statistics, which are discussed in Section 8.

As elaborated in depth in Section 8, we performed comprehensive performance analyses to study the many benefits of micro-specialization.

These eight steps are provided to address the known challenges in applying micro-specialization based on the inventors' experience with applying micro-specialization manually. To assist developers in carrying out these steps, a set of tools aimed at simplifying and automating the process of micro-specialization is provided.

9.2 HIVE: Highly Integrated deVelopement Environment

HIVE consists of a suite of tools that in concert carry out the associated tasks needed to realize each micro-specialization.

Figure 25:
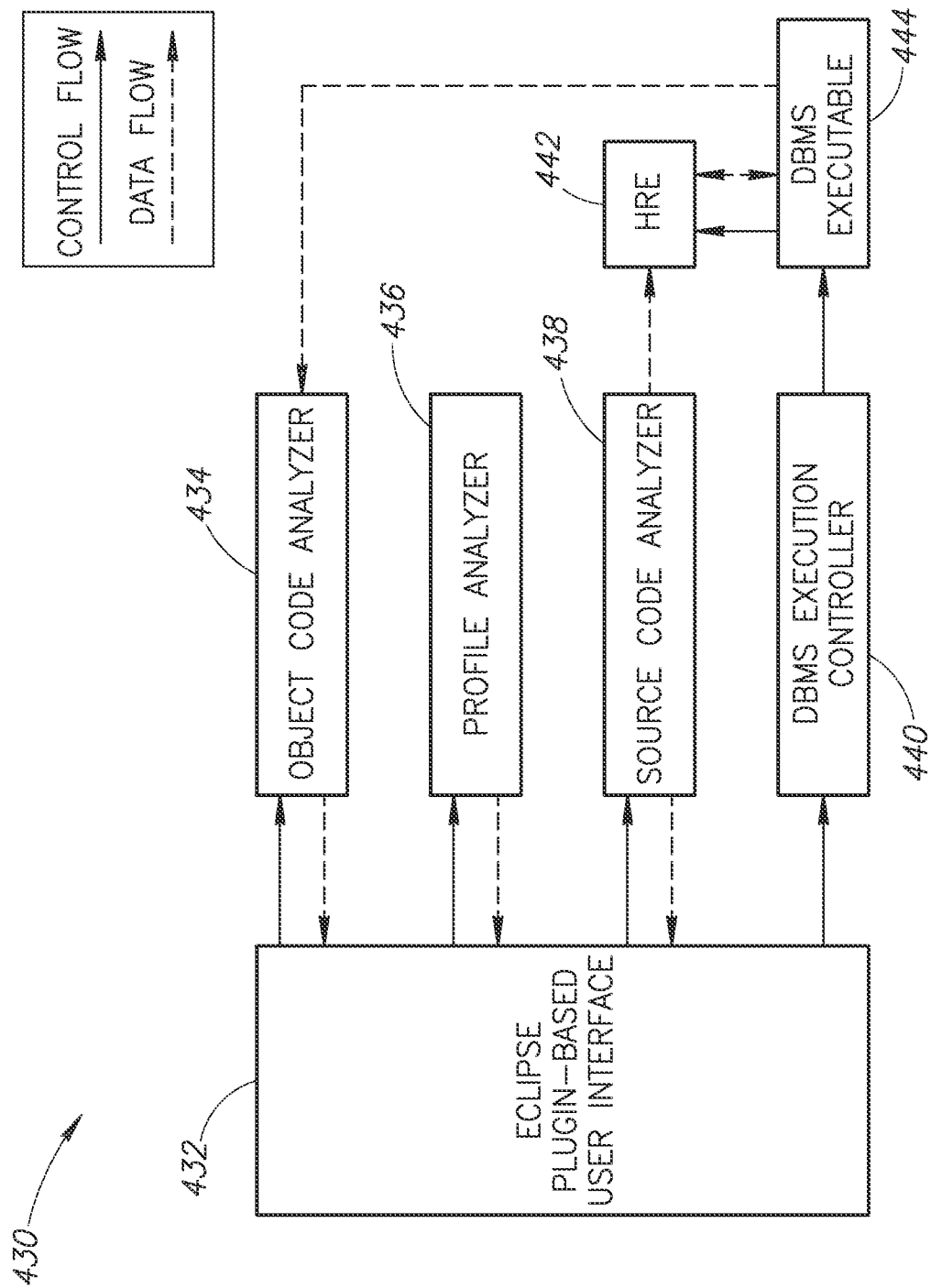
FIG. 25 illustrates a top-level architecture of HIVE.

FIG. 25 depicts a top-level architecture 430 of HIVE 442. In particular, each box shown in this figure indicates a facility that performs some tasks among the eight steps. The solid lines represent the control flow and dotted lines represent data flow. HIVE 442 provides an ECLIPSE Plugin-based User Interface 432, which enables developers to interact with the suite of tools to carry out the eight steps for applying micro-specialization. Within this user interface 432, the developer can invoke an Object Code Analyzer 434 to study the static structure of an executable program. In particular, the object code analyzer 434 analyzes the static call graph of a DBMS executable and computes the query-evaluation inner loop (Step 1). This inner loop, represented also as a call graph, can be visualized in the user interface 432. Note that the object code analyzer 434 can be invoked in concert with a Profile Analyzer 436 to perform dynamic execution analysis. Specifically, the static call graph produced by object code analyzer 434 will be augmented with execution frequencies and the functions that are not executed will be eliminated from the static call graph, allowing more accurate study of the program's runtime behavior (Step 2).

By using the user interface 432, the developer can invoke a Source Code Analyzer 438 to perform source-code study, such as identifying invariant variables in the source code. The identified variables will be visualized through the user interface 432 (Step 3). The developer can also directly utilize the source code analyzer 438 to design bees by specifying bee source code-snippets into the HRE 442 and adding bee-invocation statements to the DBMS (Steps 4 through 7).

Finally, a DBMS Execution Controller 440 allows the DBMS to be run from within the user interface 432 and allows the necessary configuration parameters to be able to customized, for experimental purposes (Step 8). The DBMS execution controller 440 invokes a DBMS Executable 444, which can be the same executable file analyzed by the object code analyzer 434. Moreover, the profile analyzer 436 also provides facilities to let the developer compare multiple profile results to investigate the number of executed instructions and various cache miss-rates during query evaluation.

These suite of tools are integrated in HIVE with a model-view-controller (MVC) [4] architecture such that the tools are independent of the user interface 432. In fact, the API of these tools is generically defined hence other kinds of user interfaces can be developed other than an ECLIPSE plugin.

Figure 26:
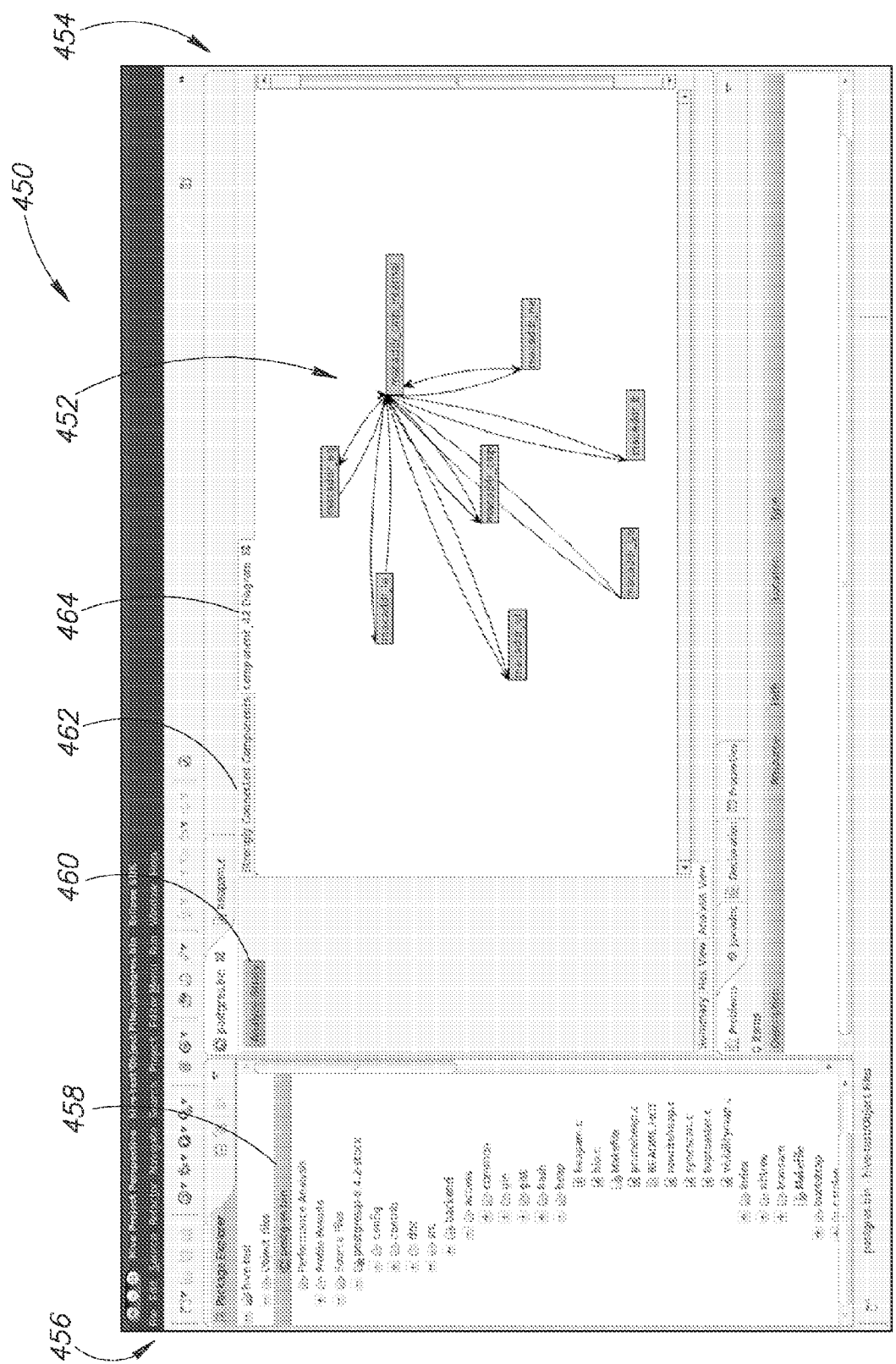
FIG. 26 illustrates an Eclipse plugin-based HIVE user interface with a call-graph view.

FIG. 26 is a screenshot 450 of the HIVE main user interface with a call graph 452 shown on the right-hand side 454 (RHS). In particular, HIVE is integrated into ECLIPSE as a plugin. HIVE's user interface consists of a left hand side 456 (LHS) resource list and the RHS 454 display area. Specifically in this screenshot 450, a HIVE project namely postgres-stock is displayed with the LHS list 456. Each such project is created by users. Each project is associated with a distinct project-directory, stored on disk.

Under each such project, four nodes, each represented as a directory within the project's directory, are associated. They are Object Files, Performance Analysis, Profile Results, and Source Files. The developer can right-click on each individual node to see the context-oriented popup-menu options. For instance, one of the menu options for the Object Files node is Load Object File. By selecting this option, a file browser will be displayed and the developer can choose to load an binary object file. As FIG. 26 shows, an executable file namely postgres.bin 458 has been loaded. When an object file is loaded, an identical copy of the loaded file is created and stored within the Object Files directory. This is an installed binary file is not directly manipulated. Instead, any investigations of the binary object code should be conducted on an identical copy of the original file.

Note that for the source files, in this case the postgresql-8.4.2-stock source directory, when loaded, this directory is not physically cloned. Rather, the loaded files are the original copy and can be directly modified.

Under the performance analysis node, a bee-enabled.perf file is shown. This file contains configuration information, such as JDBC connect string, experiment-database name, and result-directory name for running the DBMS and performing experiments.

The profile results node can contain profile results collected by VALGRIND. These profiles can be selected in combination with particular object file to study the associated runtime callgraph and instruction counts. In this example, we do not provide existing profiles.

The RHS 454 view shown in FIG. 26 corresponds to the first step in applying micro-specialization. As illustrated, HIVE consists of a left-hand-side (LHS) 456 tree view and a RHS 454 panel view. The RHS usually consists of a main display region for visualizing the associated information and an operation panel containing buttons to trigger various tasks. The LHS tree nodes correspond to subjects for analysis, such as source code, executable, profile results, and performance measurements. The content shown on the RHS depends on the selected node on the LHS. For instance, the executable file postgres.bin 458 is selected in FIG. 26. The RHS 454 then displays object-code analysis-related options. In this particular case, an Analyze Binary button 460 is shown. By clicking this button 460, HIVE analyzes the selected object file and computes the static call graph 452. HIVE organizes function calls by identifying the strongly connected components from the call graph, which is particularly helpful to reveal the query-evaluation inner loop from a DBMS executable. All the strongly connected components are enumerated in an HTML tab 462 titled Strongly Connected Components, as shown in FIG. 26. By selecting a particular strongly connected component within that tab 462, the visualized call graph 452 is created in a new tab 464, in this case, namely the component_42 Diagram.

9.3 Utilizing HIVE to Apply Micro-Specialization

The eight steps in which micro-specialization is applied are discussed above with reference to FIG. 27. An emphasis on the interaction between HIVE and the developers who are applying micro-specialization is made with reference to the eight steps below.

Step 1 (block 482). Identify the query evaluation loop. A developer loads the DBMS executable binary into the Object Files node on the LHS. Once the newly added object file is selected, the RHS view will display general information about the executable. Moreover, a button captioned Analyze Binary will appear on the top of the RHS view, as shown in FIG. 26. Clicking this button will invoke the object code analyzer to construct the static call graph and identify the strongly connected component that represents the query evaluation loop. Note that for visualization purposes, FIG. 26 shows a single strongly connected component, which contains eight functions, that does not represent the query evaluation loop.

Step 2 (block 484). Identify the invariants with execution trace. Invariants are identified with dynamic analysis, which relies on runtime profiles, produced by utilizing VALGRIND.

Figure 28:
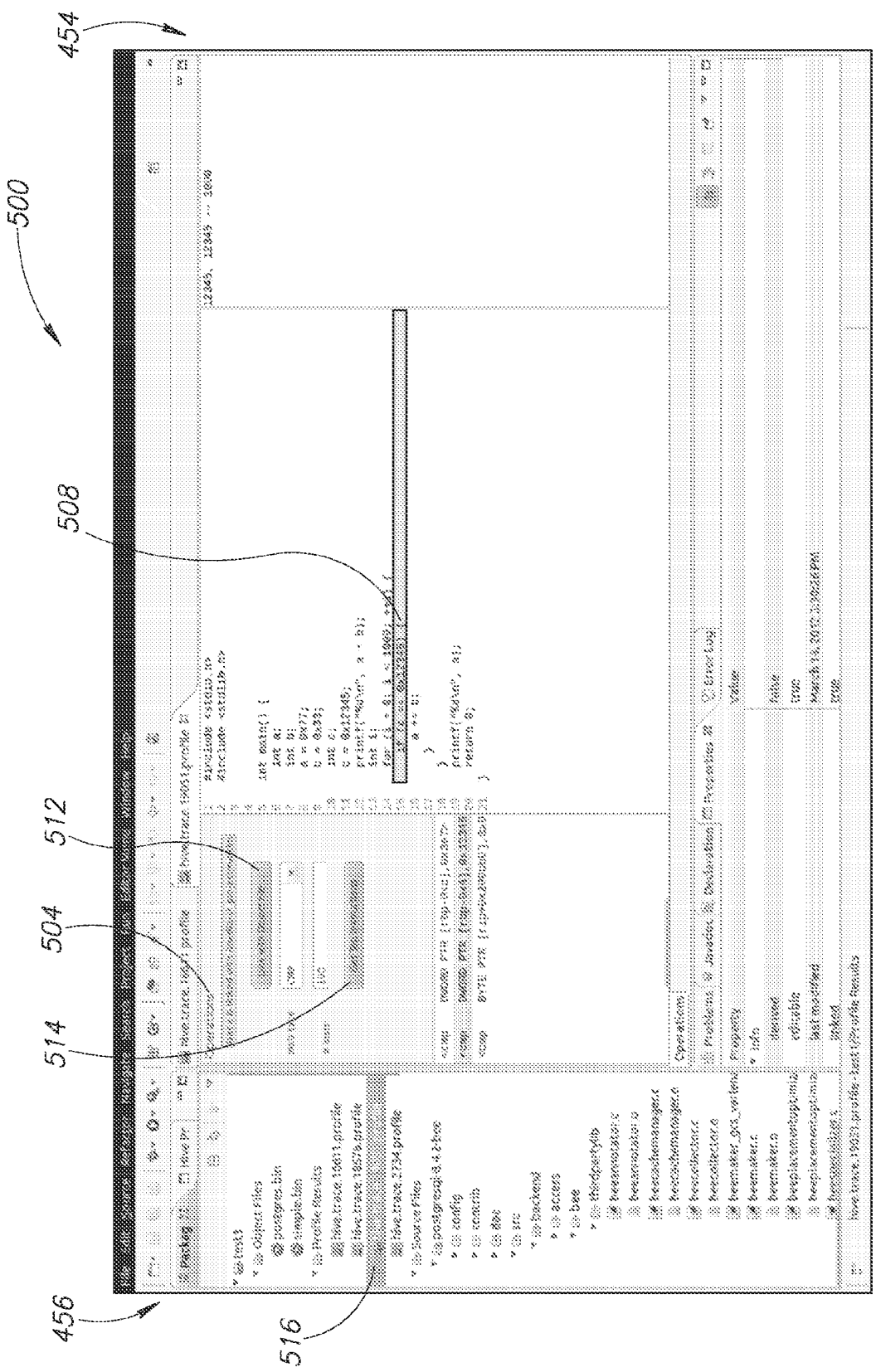
FIG. 28 is a screenshot of HIVE in the invariant variable-highlighting mode.

Step 3 (block 486). Pin-point the invariants in the source code. The goal of this step is to highlight the declarations in the source code that represent the runtime invariants. Therefore, the developer needs to load in the DBMS source code directory, which is represented as a node under the Source Files node on the LHS. The options for identifying and highlighting the invariants will be displayed when the developer multi-selects an object-file node (such as postgres.bin) and the associated profile node(s) (in this case the hive.trace.19051.profile file). The RHS display will show several tabs, each representing a source code file in which the invariants have been highlighted. FIG. 28 displays a screenshot 500 of HIVE with an invariant variable 508 selected by the developer and thus highlighted in the source code view on the RHS 454. In this figure, a very simple program is shown containing an obvious invariant variable 508 that is int c with a constant value 0x12345 assigned on line 11. This variable 508 is then utilized in the if statement shown on line 15. Note that step 3 is an intermediate step. Highlighting the invariants is merely for verification purposes. In production, correctly identifying invariants should be entirely managed by HIVE. Hence, there is no need to explicitly annotate the source code for successive steps.

How this particular invariant is identified is now explained. On the LHS, a profile file 516 is selected, namely hive.trace.19051.profile. This profile is produced by VALGRIND. Specifically, this file contains a sequence of instructions and the register values right before each instruction is executed during the execution of the program. In this case, the program is named simple.bin, as shown under the Object Files node.

Once a profile file 516 is selected on the LHS 456, the RHS 454 will show an interface consisting of three columns. As shown by FIG. 28. In an Operations column 504, the developer needs to first click the Link with Object File button 512 to indicate that the currently selected profile file 516 is produced by running the executable program, which will be selected in the file browser shown after clicking this button. HIVE analyzes the profile data against the executable file and categorizes instructions by their types. Given that micro-specialization focuses on identifying runtime invariants present in branching statements, CMP (compare) instructions are currently supported. By clicking the Get Top Instructions button 514, the 100 most frequently executed CMP instructions (as specified by the # instr box) will be displayed within the list at the bottom. For this simple program, only three CMP instructions in total are identified. By selecting the second CMP instruction in the list, the source-code (middle) column on the RHS 454 shows the source code containing the selected instruction. Moreover, the statement(s) corresponding to the selected instruction is highlighted. In the right-most column, the values of the operands of the selected CMP instruction are displayed.

Since variable c is assigned with a constant 0x12345 and the other comparison operand is also 0x12345, we can see both values displayed in the right-most column are 0x12345. The value 1000 appended at the end indicates how many times a particular operand-value combination occurs, as can be seen in the source code that the if statement is executed within a for loop that iterates for 1000 times.

A more intuitive alternative for visualizing the source files in which the identified invariants reside would be to assign each individual invariant variable with a distinct color and annotate on the LHS for each source file, a combination of color bands indicating all the contained invariant variables.

Note that HIVE will not normally require manual action by the developers to identify invariants, which are simply represented by runtime memory addresses. Rather, these two steps will be automated entirely by HIVE using dynamic and static binary code analysis.

Step 4 (block 488). Decide what code sequence(s) should be micro-specialized. HIVE utilizes data flow analysis to identify the references of the invariants. When this analysis is complete, HIVE will suggest candidate code sequences to be specialized. The developer will then be able to adjust the boundaries of a pre-chosen code sequence. Note that choosing the boundaries depends on two considerations. First of all, the code sequence should be small in that large bees, especially when many are invoked, will introduce significant cache pressure. Second, the code segments to be specialized should contain as few function calls as possible because function calls present complexity during bee instantiation. In fact, given that the selection of code segment to be specialized is branch-oriented, one intuitive selection criteria would be to bound the code segments by branching statements.

This step is performed within the source code view in the frontend.

Step 5 (block 490). Decide when to perform the associated tasks for bees. As discussed in Section 3.3, the five tasks for different kinds of bees are performed at various times. For instance, all versions of the join algorithms and the predicate-evaluation query proto-bees can be generated when databases are being created. On the other hand, a relation proto-bee can be generated only at schema definition time. Relation bees are instantiated at schema definition time, whereas a query bee can be instantiated only after the query has been received by the DBMS. The developer first designs the bee routines and then states to HIVE in what kind of bee the designed specialized code should reside and when the bee routine should be created, generated, and instantiated. Note that source-code annotations can be employed to state the above described tasks in the source code. Nonetheless, the above tasks should be automatically performed by HIVE without involving the developers.

Step 6 (block 492). The target source code is converted to snippets, to create a bee routine. From within a designated code sequence, HIVE may automatically extract code snippets according to the presented branches. The developer can manually modify the generated code snippets. Moreover, the developer will implement the associated functions to create bee source code from the code snippets, such as for relation and tuple bees.

Step 7 (block 494). Add bee invocations and supporting code to the DBMS source. With the above steps accomplished, the current application of micro-specialization needs to be finalized by embedding proper invocation statements into the DBMS to create the bee source code, to generate the proto-bee(s), and to instantiate the bees, all as calls to the HRE. Also, when a code sequence is decided to be specialized, the developer needs to, according to Step 5, incorporate associated code that performs bee creation, generation and instantiation into the bee-maker component in the HRE. This step should be carried out in the source code view.

Step 8 (block 496). Run confirmatory experimental performance analysis. Once the bees are in-place and the DBMS is recompiled, the developer can start experiments to measure and study the performance. Two options are provided, that of profiling and of measuring running time. The developer can run a benchmark with both the specialization-applied DBMS and the stock version.

Figure 29:
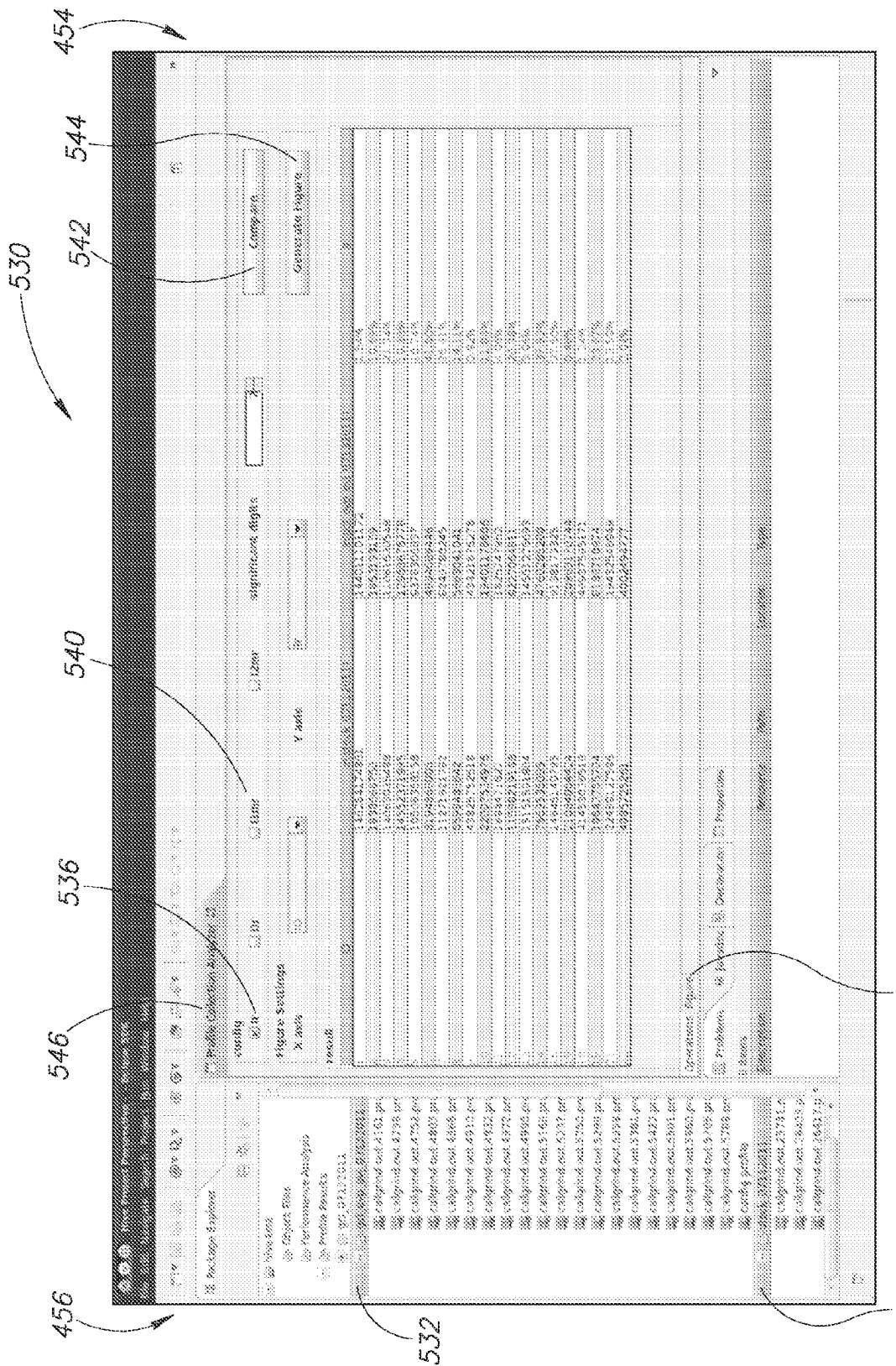
FIG. 29 is a screenshot of HIVE with a performance study view of profiled results.

FIG. 29 provides a screenshot 530 illustrating a profile-result comparison view. In this example, two sets of profiles 532 and 534, namely gcl_evp_evj_07132011 and stock_07112011, respectively, are selected, shown as the highlighted profile nodes on the LHS 456. With the dual-profile selection, the RHS 454 presents the runtime data comparison view, which allows the developer to perform comparisons. As this particular screenshot shows, the number of executed instructions (indicated by selecting an Ir checkbox 536 in a config pane 540) is studied during the evaluations of the TPC-H queries. Two sets of profiles are compared. One set of profiles was collected with the stock PostgreSQL. The other set was collected with the bee-enabled PostgreSQL, which had the GCL, EVP, and EVJ bee routines enabled. By clicking the Compare button 542, the result table will be populated with the detailed statistics.

Figure 30:
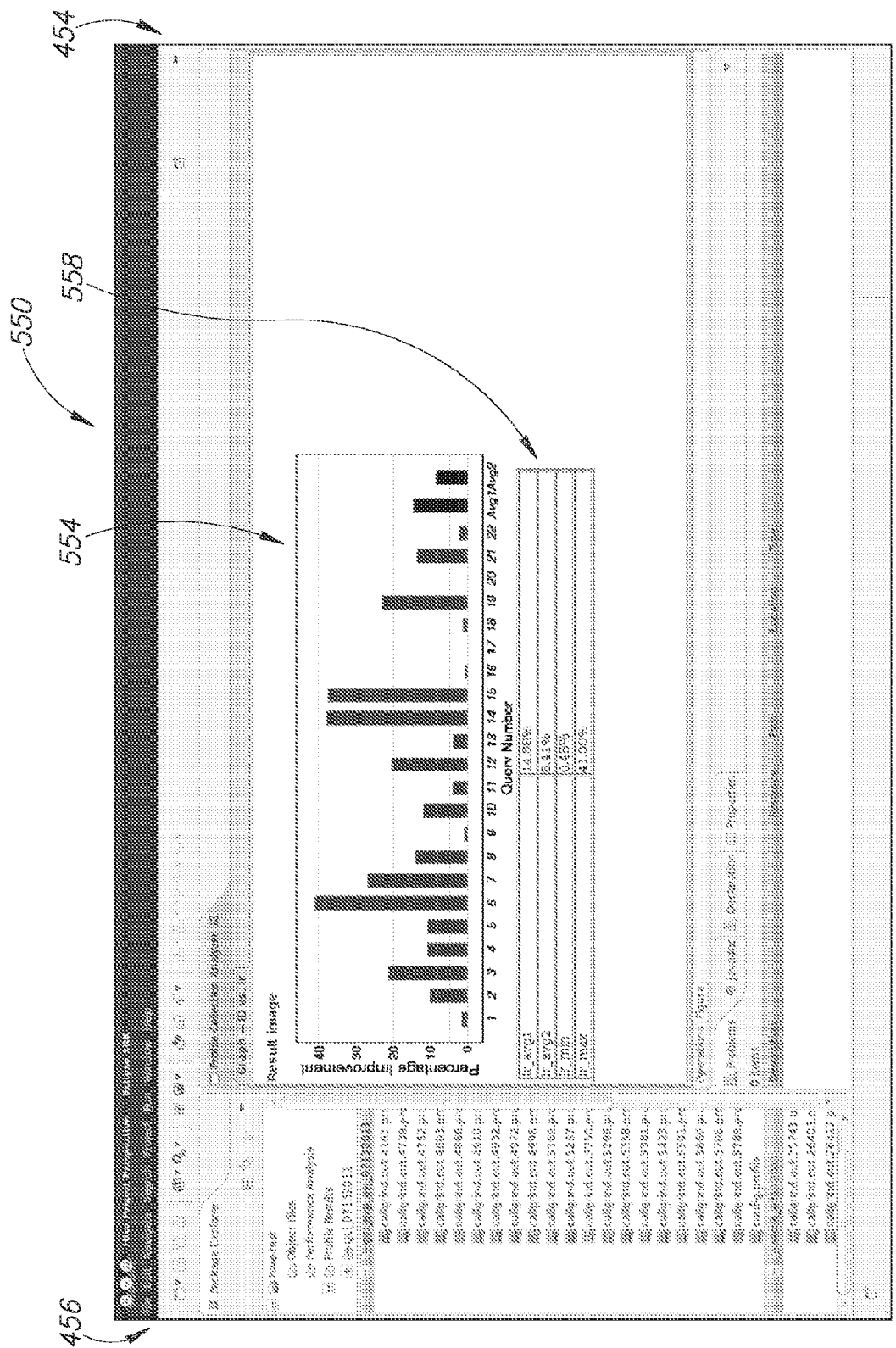
FIG. 30 is a screenshot of HIVE depicting a performance study within HIVE.

HIVE provides graphical visualization of the data being analyzed. In this particular example, the developer specifies the X axis to be ID, which is the TPC-H query number, and the Y axis to be Ir. Then the developer clicks the Generate Figure button to generate a bar chart that visualizes the selected columns of this table. Specifically, the developer clicks the Figure tab 548 at the bottom left of the Profile Collection Analyzer 546. The produced bar chart 554 is shown in this tab, as shown by FIG. 30. In addition, statistical summaries 558 are displayed along with the generated chart. Note that this bar chart 554 displayed in FIG. 30 corresponds to FIG. 12 in Section 8.

9.4 Applying Micro-Specialization in Practice

In this research, the focus is on applying micro-specialization to a particular DBMS, actually, to a specific version (PostgreSQL 8.4.2). Nevertheless, in reality, a DBMS code repository evolves frequently, with minor and major releases constantly being rolled out. Such frequent change in the DBMS code inevitably affects micro-specialization. Essentially, once the source code of the DBMS is changed, the existing bees may need to be regenerated, as the invariants on which bees have originally been applied may have been changed. This means that the eight steps discussed in Section 9.1 need to be performed again to update the affected bees. Given the complexity of these eight steps, in this section a discussion is provided concerning for each step whether rerunning the entire step is required, or whether the rerunning can be simplified. Note that for all eight steps, HIVE needs to record the results produced by that step. For instance, the query evaluation loop produced by the first step needs to be stored. These results can then be used to speed up or eliminate performing that step after the DBMS has been changed.

For the first step, that of identifying the query-evaluation loop, once the DBMS source code changes, whether the changes affect the query-evaluation loop needs to be determined. This analysis relies on the previously computed query-evaluation loop, which provides all the functions that are invoked during query evaluations. If the source code of any functions within this loop is changed, this step needs to be rerun and then we can proceed to the next step. Note that the changes may affect the query-evaluation loop to various degrees. For instance, changing the architecture of the loop, such as moving functions in and out of the loop, should result in rerunning all the subsequent seven steps entirely. On the other hand, if changes are limited to a few functions that do not invalidate the previous structure of the inner loop, then the second step should be considered immediately without enforcing all the rest of the steps to be rerun. After this step, a new query-evaluation loop is computed and stored.

The second step, which identifies the invariants, may not need to be rerun completely, in that the changes in the source code may not necessarily affect all the invariants previously identified. This step requires execution profiles to be collected, which can be time-consuming. HIVE should determine whether the changes to the DBMS source code can affect certain execution samples, which will cause the profile result to differ from the previous profiles. Only those execution samples that are affected need to be rerun. Moreover, when incorporating new functions to the query-evaluation loop, new invariants might be discovered. The developer of the DBMS in this case should provide execution samples that cover the newly introduced code, so that the newly added code can be analyzed for existence of invariants.

The third step identifies the invariants found in the execution profiles to variables or data structures in the source code. Only those invariants that are affected by the changes to the DBMS source code, as well as new invariants that appear, need to be identified within this third step.

Similarly, in the fourth step, where code sequences are selected for micro-specialization, only the code sequences that reference the variables and data structures that have been re-identified in the third step need to be reconsidered.

Steps five through seven, which perform assignment for the various bee-associated tasks, converting generic source code to bee code snippets and designing bee routines, and adding bee invocations to the DBMS, respectively, will also be partially rerun on those affected invariants only.

The eighth step, which evaluates the performance of applied bees, should be rerun in general to study the performance benefits of the newly modified bees, particularly on their effects to other existing bees.

Generally, HIVE should contain user interfaces to indicate and predict the effort required for each step. In particular, a comparison between the estimated effort and time on rerunning an entire step and the effort and time for partially rerunning the step is desired, such that the developer can make choices according to the time and budget constraints.

Section 10: Extending the Template Mechanism to Allow Runtime Values

Micro-specialization has been introduced as an approach to improving DBMS performance by utilizing the runtime code-specialization technique. In particular, the instantiation of bees, which is a critical step in selecting and producing executable code at runtime, closely resembles the instantiation mechanism introduced by templates (as used in C++ or generics in Java). The template-instantiation mechanism enables the capability of dynamically selecting code, such as a function that is specific to the type of input arguments, to be incorporated into the generated executable code. Nevertheless, conventional templates trigger instantiation at compile time. Hence, variable value-based instantiation, which is essentially the core technique utilized at runtime by micro-specialization, cannot be directly effected by conventional templates.

10.1 Dynamic Template

An extension to the template mechanism is discussed which allows value-based code specialization to be applicable at runtime. In Section 10.2 a discussion of how dynamic templates can be used in micro-specialization is provided. The ExecEvalScalarVar function implemented in PostgreSQL is utilized as an example, presented in Listing 16, to discuss how the template mechanism can be enhanced in the context of runtime code specialization.

As shown by Listing 16, the ExecEvalScalarVar function, expressed in conventional C, contains three branches. This function is taken directly from PostgreSQL's source code. The branching statement (switch) on line 9 examines the source of the input tuple, which is stored in the variable->varno variable, and decides which branch to execute accordingly.

The ExecEvalScalarVar function is converted into a function template. To illustrate dynamic template-based specialization, an example of the corresponding template definition and instantiation is presented in Listing 17. As shown in this function template definition, a template argument, that of int varno shown on line 1, is introduced. The code will use this template argument to determine the particular branch to execute. Given that there are just three distinct code branches, the ExecEvalScalarVarfunction can be compiled into three versions, each corresponding specifically to a particular branch.

Listing 16 The ExecEvalScalarVar Function

```
1   Datum ExecEvalScalarVar(
2       ExprState* exprstate, ExprContext* econtext, bool* isNull,
        ExprDoneCond* isDone) {
3       Var* variable = (Var*)exprstate->expr;
4       TupleTableSlot* slot;
5       AttrNumber attnum;
6       if (isDone)
7           *isDone = ExprSingleResult; // a global variable utilized by
            Postgres
8       switch (variable->varno) {
9           case INNER:
10              slot = econtext->ecxt_innertuple;
11              break;
12          case OUTER:
13              slot = econtext->ecxt_outertuple;
14              break;
15          default:
16              slot = econtext->ecxt_scantuple;
17              break;
18      }
19      attnum = variable->varattno;
20      return slot_getattr(slot, attnum, isNull);
21  }
22
23  // invoking ExecEvalScalarVar
24  ...
25  Datum attribute_value = ExecEvalScalarVar(exprstate, econtext,
        isNull, isDone);
26  ...
```

Listing 17 Defining ExecEvalScalarVar as a Function Templates

```
1   template<int varno> Datum ExecEvalScalarVar(
2       ExprState* exprstate, ExprContext* econtext, bool* isNull,
        ExprDoneCond*
isDone) {
3       Var* variable = (Var*)exprstate->expr;
4       TupleTableSlot* slot;
5       AttrNumber attnum;
6       if (isDone)
7           *isDone = ExprSingleResult;
8       switch (varno) {
9           case INNER:
10              slot = econtext->ecxt_innertuple;
11              break;
12          case OUTER:
13              slot = econtext->ecxt_outertuple;
14              break;
15          default:
16              slot = econtext->ecxt_scantuple;
17              break;
18      }
19      attnum = variable->varattno;
20      return slot_getattr(slot, attnum, isNull);
21  }
22
23  // invoking ExecEvalScalarVar
24  ...
25  Datum attribute_value =
        ExecEvalScalarVar<((Var*)(exprstate->expr))->varno>(
26              exprstate, econtext, isNull, isDone);
27  ...
```

Listing 18 shows the specialized source code of the ExecEvalScalarVar function, with the varno template variable assigned the INNER (branch) value. Note that when the function-call statement on line 25 shown in Listing 17 is invoked with INNER as the value of the template variable, the specialized function shown in Listing 18 will be invoked.

Listing 18 Specialized ExecEvalScalarVar when varno is INNER

```
1   Datum ExecEvalScalarVar(
2       ExprState* exprstate, ExprContext* econtext, bool*
        isNull, ExprDoneCond* isDone) {
3       if (isDone)
4           *isDone = ExprSingleResult;
5       return slot_getattr(econtext->ecxt_innertuple,
            ((Var*)exprstate->expr)->varattno, isNull);
6   }
```

In prior work, the value of varno is required to be a compile-time constant. Within micro-specialization however, a variable is allowed to be specified as the template parameter. Dynamic template-based specialization generalizes templates such as in the C++ language to permit invocation of routines that are specialized by a runtime value.

At runtime, the function-invocation statement, as shown on line 25 in Listing 17, provides a variable namely varno, which represents the source of the input tuple, as the function template parameter. As described in Section 6.2, the value of the varno variable, in this case a template parameter, is mapped to the target proto-bee version. Hence the correct branch (version) of the bee can be invoked.

By adopting this dynamic template-based specialization mechanism, runtime code specialization can be realized in a well-structured fashion. The specialized source code creation, object code generation, invocation, and other manipulation are completely managed by the compiler.

Moreover, such generalization of the template mechanism introduces optimization opportunities. For instance, the compiler can choose to generate multiple versions for a stretch of code, such as a function, in a static, dynamic, or hybrid fashion.

When just a few code branches are present, the compiler can generate all possible versions at compile time. The statically-generated code can then be invoked directly at runtime. Nevertheless, when many branches are present, generating all the versions can significantly increase the space complexity of managing the resulting code. The function call on line 25 in Listing 17 can dynamically invoke the compiler to compile the template function given the value of the varno template parameter.

The compiler hence can decide to only dynamically compile the code at runtime if a particular branch is executed. For the hybrid approach, profile-guided analyses can help to identify certain frequently-executed code branches. The compiler can statically generate object code for only these frequently executed branches at compile time. The other branches should thus be compiled dynamically at runtime. The dynamic code generation, invocation, and the necessary management discussed here can be realized using an implementation similar to the micro-specialization approach. Specifically, the implementation of proto-bees management can be directly utilized here to realize this dynamic template mechanism. The only difference is that syntactical annotations are required for dynamic templates to indicate the variable-based template parameters.

10.2 Employing Dynamic Templates in Micro-Specialization

One task during the application of micro-specialization is to convert generic source code into specialized code snippets. The conversion is currently carried out manually on a per-case basis. In other words, for each kind of bee, different approaches are utilized for creating the bee source code. While this case-specific approach ensures that each kind of bee can be properly created, the complexity of this approach makes automation of this task difficult. Hence, techniques may be employed to leverage the sophistication involved in automating bee creation and generation.

In Section 10.1, a discussion is provided regarding how the template mechanism can be extended by utilizing HRE, resulting in dynamic templates. Now a discussion is provided regarding how dynamic templates, which inherit the elegance of the static template, can be applied as a programming-language construct, in applying micro-specialization, particularly in the steps of bee creation and generation.

As the example shown in Listing 17 indicates, dynamic templates can be utilized to perform the creation and generation tasks for query bees. In particular, given that query proto-bees, which are essentially distinct code branches within generic code segments, are designed and created along with DBMS development, the dynamic templates can be incorporated into the DBMS source code to effect query bees without manually converting the generic code into specialized query-bee code. During the compilation of dynamic templates, the compiler will generate all the versions of the dynamic templates, with each version being a proto-bee. Moreover, regarding query bees that can perform hot-swaps, dynamic templates can also be employed to create and generate such bees. The compiler can determine all the versions of the bees required by a sequence of values for the variable that controls the flow of the execution and thus generate the bees with the hot-swapping statements in the bee code accordingly. Given that query bees are created at DBMS-development time and generated during DBMS compilation, dynamic templates can be applied to realize these tasks in that the creation and generation of the templates are aligned with the tasks for query bees.

In fact, for a regular query bee that does not require hot-swapping, the inline facility can be utilized by bee invocations such that the bee code can be embedded into the caller code at compile time. The drawback of the inline mechanism is that all the code branches, such as exemplified in Listing 16, will be compiled into a bee and be embedded into the caller. This will increase the size of the produced DBMS executable code. Furthermore, all the branch conditions are still evaluated even just a particular branch is actually executed.

For relation bees and tuple bees, due to the fact that their creation and generation are at DBMS runtime, which is after DBMS compilation, dynamic templates cannot be employed to perform these tasks for either kind of bee. In other words, code generation for dynamic templates is required at compilation time. However, code generation for relation and tuple bees is required at runtime.

Section 11: Other Embodiments

Executing Bees in Parallel.

A key characteristic of micro-specialization is the runtime-invocation of specialized executable code, or bees. Bees normally carry out their tasks independently from each other. For instance, all the tuple bees for a particular relation can execute independently and in parallel when extracting values from tuples and evaluating predicates on these tuples. Therefore, instead of employing the tuple-at-a-time query-evaluation model, attribute-value extraction and predicate evaluation can be parallelized by fetching many tuples and invoke the associated tuple bees all at once to significantly improve the efficiency of such operations.

The advantage of micro-specialization is that it is applied at a very low level inside DBMSes. While it is difficult to parallelize the entire query evaluation within a conventional DBMS, parallelism can be achieved with the flexibility and the fine application granularity of micro-specialization.

Modern CPUs usually are equipped with multiple cores that can operate independently. Such architectural advances provide opportunities for the application of micro-specialization utilizing parallel execution of bees. Furthermore, present GPUs can facilitate very aggressive parallel code executions. Given that bees are small, GPUs may provide an ideal platform to let many bees to be executed in parallel.

Incorporating Bee Effects into Query Optimizer's Cost Model.

DBMSes employ query optimizers to generate optimal query-execution plans for efficient query evaluation. Query optimizers normally rely on a cost model which can estimate the overall costs of particular plans. Hence by comparing such costs among various candidate plans, an optimal plan can be selected to execute.

A cost model is usually based on certain known constants, such as the overhead of performing a sequential scan, a hash computation, or a sort operation.

Given that the utilization of bees has direct effects on the efficiency of the affected plan operators, the cost model in a bee-enabled DBMS can be adjusted to the presence of bees. In some cases, instead of replacing an old constant value with a new one in which the associated bee's effects are taken into account, bees may introduce further complications. For instance, hot-swapping bees will have different performance impact to the operator each time a particular bee is swapped in for execution. To contend with this dynamic nature of bees, opportunities in improving query-plan generation with bees may be exploited within the cost model to handle fine-grained analysis, such as how many times will each bee, during a hot-swapping involved query evaluation, be executed?

Aggressively Applying Micro-Specialization.

Tuple bees are created by specializing on attribute values in relations. Essentially the entire columns are removed from a specialized relation. In some embodiments tuple bees are utilized only when the specialized attributes have limited value domain. To more aggressively apply micro-specialization, this restriction can be relaxed and tuple bees on a portion of those attributes can be allowed. Specifically, the distribution of the values of an attribute can be utilized and we can only specialize on those values with high occurrences.

In addition, other kinds of bees may be incorporated into the HRE, such as modification and page bees. Such extension may introduce additional functions to the HRE API.

Moreover, micro-specialization may be applied to other kinds of DBMSes. For instance, MonetDB and VoltDB are very different from conventional relational DBMSes in terms of architectures.

Generating Bees from Binary Code.

Currently micro-specialization relies on the source code of the DBMS to create bee source code. In some embodiments it may be advantageous to directly utilize the binary executable code of DBMSes to generate bees and effect the invocation of bees by directly modifying the object code of the DBMSes. The apparent advantage of generating bees from binary code is that expensive compilation of the source code can be avoided and compiling all possible versions of the proto-bees can be avoided, reducing the cost of compilation and the space requirement for storing many versions of the proto-bees.

Automating the Application of Micro-Specialization with HIVE.

In some embodiments the HIVE toolset allows DBMS developers perform necessary static code analysis, dynamic profile collection and analysis, and runtime-performance analysis to design and implement bees in DBMSes. In some embodiments, such a semi-automated process, as structured by the eight steps described in Section 9, can be fully automated without any user involvement. Such automation is useful for aggressively applying micro-specialization within many types of DBMSes. The fully automated micro-specialization should also provide correctness analysis and justification for the introduced bees. Finally, as discussed in Sections 5 and 6, the costs of creating, generating, and instantiating bees, especially if these tasks are required at DBMS runtime, need to be taken into account when applying micro-specialization. HIVE may incorporate a cost model that can automatically decide whether micro-specialization is beneficial given certain scenarios.

CITED REFERENCES INCORPORATED BY REFERENCE HEREIN

[1] J. Bonwick. The Slab Allocator: An Object-Caching Kernel Memory Allocator. In *Proceedings Usenix Technical Conference*, pages 87-98, June 1994.
[2] B. Calder, P. Feller, and A. Eustace. Value Profiling and Optimization. *Journal of Instruction Level Parallelism*, vol. 1, March 1999.
[3] Valgrind Developers. Callgrind: A Call-Graph Generating Cache and Branch Prediction Profiler.
[4] R. Eckstein. Java SE Application Design with MVC.
[5] R. Elmasri and S. Navathe. Fundamentals of Database Systems. Addison Wesley Publishing Company, sixth edition, April 2010.
[6] Linux Foundation. ELF and ABI standards.
[7] Inc. Free Software Foundation. Optimization Options—Using the GNU Compiler Collection (GCC).
[8] K. Krikellas, S. Viglas, and M. Cintra. Generating Code for Holistic Query Evaluation. In *Proceedings of the IEEE International Conference on Data Engineering (ICDE)*, pages 613-624, 2010.
[9] D. Lussier. BenchmarkSQL.
[10] R. Muth, S. Watterson, and S. K. Debray. Code Specialization Based on Value Profiles. In *Proceedings International Static Analysis Symposium (SAS)*, pages 340-359, June 2000.
[11] PostgresSQL Global Development Group. PostgresSQL: Documentation 8.4: Resource Consumption.
[12] TPC. TPC Transaction Processing Performance Council—TPC-C.
[13] TPC. TPC Transaction Processing Performance Council—TPC-H.

All of the above U.S. patents, U.S. patent application publications, U.S. patent applications, foreign patents, foreign patent applications, and non-patent publications referred to in this specification and/or listed in the Application Data Sheet are incorporated herein by reference in their entirety.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

While particular embodiments of the present invention have been shown and described, it will be obvious to those skilled in the art that, based upon the disclosure herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method for a database management system (DBMS), the method comprising:
   identifying a locally invariant variable in general DBMS code that executes a portion of a query whose value is invariant or takes on a deterministic sequence of values within a query evaluation loop;
   identifying DBMS code that is rendered unnecessary due to the variable being locally invariant;
   generating micro-specialized DBMS code to replace the DBMS code identified as being unnecessary due to the locally invariant variable, wherein when executed, the micro-specialized DBMS code performs the same function as the unnecessary DBMS code with fewer instructions;
   modifying the general DBMS code such that the generated micro-specialized DBMS code is executed instead of the unnecessary DBMS code during execution of the query evaluation loop, and
   further comprising, prior to identifying the locally invariant variable, identifying frequency executed code paths of the general DBMS code by static analysis including constructing a static call graph and dynamic analysis configured to identify a strongly connected component representative of the query evaluation group.

2. The computer-implemented method of claim 1, wherein modifying the general DBMS code comprises removing the unnecessary DBMS code from the general DBMS code and replacing the unnecessary DBMS code with a call to the micro-specialized DBMS code.

3. The computer-implemented method of claim 1, wherein the locally invariant variable comprises a stored data variable or an internal data structure variable.

4. The computer-implemented method of claim 1, wherein the micro-specialized DBMS code comprises multiple copies of specialized code, each copy being particular to a single value of the locally invariant variable.

5. The computer-implemented method of claim 1, wherein the micro-specialized DBMS code is based on data associated with an individual relation or stored within an individual tuple.

6. The computer-implemented method of claim 1, wherein the micro-specialized DBMS code is based on data associated with a schema.

7. The computer-implemented method of claim 6, wherein identifying a locally invariant variable comprises analyzing the schema to identify an attribute having a small number of possible attribute values.

8. The computer-implemented method of claim 1, wherein the locally invariant variable comprises aspects specified in a schema.

9. The computer-implemented method of claim 8, wherein the aspects comprise one or more of the following: the number of attributes; the type of an attribute; the length of each fixed-length attribute; the offset of an attribute; whether an entire tuple or one or more attributes of a tuple are compressed or encrypted; and the manner in which an entire tuple or one or more attributes of a tuple are compressed or encrypted.

10. The computer-implemented method of claim 1, wherein, during execution of the query evaluation loop of the general DBMS code, the locally invariant variable is evaluated by branch-condition checking, wherein generating the micro-specialized DBMS code comprises removing the branch-condition checking on the locally invariant variable.

11. The computer-implemented method of claim 1, wherein the locally invariant variable comprises information stored within particular pages, including whether a page is full or empty and the number of tuples within a page.

12. The computer-implemented method of claim 1, wherein the locally invariant variable comprises information stored within a particular page of an index, including the type of index key value, the number of characters of the prefix shared by all keys in a page, whether the index page is full, and whether the index page has an overflow page.

13. The computer-implemented method of claim 1, wherein the locally invariant variable comprises information about a current transaction, including whether the current transaction is a read-only transaction, whether the current transaction is blocked on any pages, and whether the current transaction has been committed.

14. The computer-implemented method of claim 1, wherein the locally invariant variable comprises information about a type of modification, including whether the modification is an insertion, a deletion, or an update, and for an update, which specific columns are being updated.

15. The computer-implemented method of claim 1, further comprising: compiling the micro-specialization DBMS code to form intermediate executable code; updating the intermediate executable code with runtime information to form final executable code; and invoking the final executable code by the DBMS at runtime.

16. The computer-implemented method of claim 1, wherein identifying the locally invariant variable comprises performing static data flow analysis to locate portions of the general DBMS code over which the locally invariant variable is locally invariant.

17. The computer-implemented method of claim 1, further comprising placing the micro-specialized DBMS code at designated locations in memory such that instruction-cache misses caused by executing the micro-specialized DBMS code are minimized.

18. The computer-implemented method of claim 17, wherein modifying the general DBMS code comprises removing the unnecessary DBMS code from the general DBMS code and replacing the unnecessary DBMS code with a call to the micro-specialized DBMS code, and wherein placing the micro-specialized DBMS code at designated locations in memory such that instruction-cache misses caused by executing the micro-specialized DBMS code are minimized comprises placing the micro-specialized DBMS code next to the function that invokes the micro-specialized DBMS code in virtual space.

19. The computer-implemented method of claim 17, wherein modifying the general DBMS code comprises removing the unnecessary DBMS code from the general DBMS code and replacing the unnecessary DBMS code with a call to the micro-specialized DBMS code, and wherein placing the micro-specialized DBMS code at designated locations in memory such that instruction-cache misses caused by executing the micro-specialized DBMS code are minimized comprises mapping all the instructions of the functions of the general DBMS to available instruction cache slots, and placing the micro-specialized DBMS code at cache regions that contain the least number of instructions.

20. The computer-implemented method of claim 1, further comprising compiling the generated micro-specialized DBMS code to form intermediate executable code.

21. The computer-implemented method of claim 20, further comprising updating the executable code with runtime information to produce final executable code.

22. The computer-implemented method of claim 21, further comprising: invoking the final executable code by the DBMS at runtime.

23. The computer-implemented method of claim 22, wherein the timing of performing the steps of the method is dependent on the information associated with the locally invariant variable.

24. A system configured for a database management system (DBMS) having a hardware processor, the system comprising:
  a database management system (DBMS) comprising existing DBMS code stored in one or more data stores, the existing DBMS code being executable to perform query evaluation loops;
  a DBMS micro-specialization module executed by the hardware processor communicatively coupled with the DBMS, the DBMS micro-specialization module being configured to:
  determine a variable in the existing DBMS code that executes a portion of a query whose value is locally invariant within a query evaluation loop;
  determine DBMS code that is rendered unnecessary due to the locally invariant variable;
  generate micro-specialized DBMS code to replace the DBMS code determined to be unnecessary due to the locally invariant variable, wherein when executed, the micro-specialized DBMS code performs the same function as the unnecessary DBMS code with fewer instructions;
    modify the existing DBMS code such that the generated micro-specialized DBMS code is executed instead of the unnecessary DBMS code during execution of the query evaluation loop by the DBMS, and
  further comprising, prior to identifying the locally invariant variable, identifying the query evaluation loop of the existing DBMS code by dynamic analysis and static analysis including constructing a static call graph configured to identify a strongly connected component representative of the query evaluation group.

25. The system of claim 24, wherein the DBMS micro-specialization module is configured to remove the unnecessary DBMS code from the existing DBMS code and to replace the unnecessary DBMS code with a call to the micro-specialized DBMS code.

26. The system of claim 24, wherein the locally invariant variable comprises a stored data variable or an internal data structure variable.

27. The system of claim 24, wherein the micro-specialized DBMS code comprises multiple copies of specialized code, each copy being particular to a single value of the locally invariant variable.

28. The system of claim 24, wherein the micro-specialized DBMS code is based on data associated with an individual relation or stored within an individual tuple.

29. The system of claim 24, wherein the micro-specialized DBMS code is based on data associated with a schema.

30. The system of claim 24, wherein the locally invariant variable comprises aspects specified in a schema.

31. The system of claim 30, wherein the aspect comprises at least one of the following: the number of attributes; the type of an attribute; the length of each fixed-length attribute; and the offset of an attribute.

32. The system of claim 24, wherein, during execution of the query evaluation loop of the existing DBMS code, the locally invariant variable is evaluated by branch-condition checking, wherein the DBMS micro-specialization module is configured to remove the branch-condition checking on the locally invariant variable.

33. The system of claim 24, wherein the DBMS micro-specialization module is further configured to compile the micro-specialization DBMS code to form intermediate executable code, and update the intermediate executable code with runtime information to form final executable code, and wherein the DBMS is configured to invoke the final executable code at runtime.

34. The system of claim 24, wherein the DBMS micro-specialization module is further configured to identify the locally invariant variable by performing static data flow analysis to locate portions of the existing DBMS code over which the locally invariant variable is locally invariant.

35. The system of claim 24, wherein the locally invariant variable comprises information stored within particular pages, including whether a page is full or empty and the number of tuples within a page.

36. The system of claim 24, wherein the locally invariant variable comprises information stored within a particular page of an index, including the type of index key value, the number of characters of the prefix shared by all keys in a page, whether the index page is full, and whether the index page has an overflow page.

37. The system of claim 24, wherein the locally invariant variable comprises information about a current transaction, including whether the current transaction is a read-only transaction, whether the current transaction is blocked on any pages, and whether the current transaction has been committed.

38. The system of claim 24, wherein the locally invariant variable comprises information about a type of modification, including whether the modification is an insertion, a deletion, or an update, and for an update, which specific columns are being updated.

39. The system of claim 24, wherein the DBMS micro-specialization module is configured to place the micro-specialized DBMS code at designated locations in memory such that instruction-cache misses caused by executing the micro-specialized DBMS code are minimized.

40. The system of claim 39, wherein the DBMS micro-specialization module is further configured to remove the unnecessary DBMS code from the existing DBMS code and replace the unnecessary DBMS code with a call to the micro-specialized DBMS code, and wherein placing the micro-specialized DBMS code at designated locations in memory such that instruction-cache misses caused by executing the micro-specialized DBMS code are minimized comprises placing the micro-specialized DBMS code next to the function that invokes the micro-specialized DBMS code in virtual space.

41. The system of claim 39, wherein the DBMS micro-specialization module is further configured to remove the unnecessary DBMS code from the existing DBMS code and replace the unnecessary DBMS code with a call to the micro-specialized DBMS code, and wherein placing the micro-specialized DBMS code at designated locations in memory such that instruction-cache misses caused by executing the micro-specialized DBMS code are minimized comprises mapping all the instructions of the functions of the existing DBMS to available instruction cache slots, and placing the micro-specialized DBMS code at cache regions that contain the least number of instructions.

42. The system of claim 24, wherein the DBMS micro-specialization module is further configured to compile the generated micro-specialized DBMS code to form intermediate executable code.

43. The system of claim 42, wherein the DBMS micro-specialization module is further configured to update the executable code with runtime information to produce final executable code.

44. The system of claim 43, wherein the DBMS micro-specialization module is further configured to invoke the final executable code by the DBMS at runtime.

45. The system of claim 44, wherein the DBMS micro-specialization module is further configured to perform the steps at times dependent on the information associated with the locally invariant variable.

46. A non-transitory computer readable medium comprising computer executable instructions that, when executed by a processor of a computing device, cause the computing device to:
  determine a variable in existing DBMS code that executes a portion of a query whose value is locally invariant within a query evaluation loop;
  determine DBMS code that is rendered unnecessary due to the locally invariant variable;
  generate micro-specialized DBMS code to replace the DBMS code determined to be unnecessary due to the locally invariant variable, wherein when executed, the micro-specialized DBMS code performs the same function as the unnecessary DMS code with fewer instructions;
  modify the existing DBMS code such that the generated micro-specialized DBMS code is executed instead of the unnecessary DBMS code during execution of the query evaluation loop by the DBMS, and
  prior to identifying the locally invariant variable, identify frequency executed code paths of the general DBMS code by static analysis including constructing a static call graph and dynamic analysis configured to identify a strongly connected component representative of the query evaluation group.

47. A computer-implemented method for implementing dynamic template-based specialization, the method comprising:
  providing a function that examines the source of an input tuple and decides which branch of a plurality of branches to execute;
  converting the function into a function template, the instantiation of the template requiring a variable to be specified as the template parameter;
  compiling the function template into a plurality of versions of the function, each corresponding to a particular one of the plurality of branches;
  during runtime, providing a variable via a function invocation statement that contains the source of the input tuple as the template parameter;
  mapping the variable to a correct version of the function;
  placing the correct version of the function into memory at an offset, such that the placed function do not overlap with other frequently-executed DBMS function within the instruction caches; and
  wherein when the function calls another function, these two functions are placed sequentially such that these two functions are mapped to consecutive cache lines that do not overlap with each other;
  invoking the correct version of the function during runtime.

* * * * *